US006809941B2

(12) United States Patent
Elek et al.

(10) Patent No.: US 6,809,941 B2
(45) Date of Patent: Oct. 26, 2004

(54) POWER SYSTEM HAVING A POWER FACTOR CORRECTION CIRCUIT

(75) Inventors: Joseph F. Elek, Elyria, OH (US); Jeffrey G. Felty, Elyria, OH (US); Neil A. Kammiller, Lorain, OH (US); Dennis F. Knurek, Lakewood, OH (US)

(73) Assignee: Marconi Intellectual Property (Ringfence) Inc., Warrendale, PA (US)

(*) Notice: Subject to any disclaimer, the term of this patent is extended or adjusted under 35 U.S.C. 154(b) by 0 days.

(21) Appl. No.: 10/646,849

(22) Filed: Aug. 22, 2003

(65) Prior Publication Data

US 2004/0150377 A1 Aug. 5, 2004

Related U.S. Application Data

(63) Continuation of application No. 10/152,883, filed on May 21, 2002, now Pat. No. 6,731,524.
(60) Provisional application No. 60/292,350, filed on May 21, 2001.

(51) Int. Cl.$^7$ ............................................. G05F 1/70
(52) U.S. Cl. ................................. 363/70; 323/207
(58) Field of Search ............................. 323/207, 267; 363/67, 69, 70, 89, 86

(56) References Cited

U.S. PATENT DOCUMENTS

| | | |
|---|---|---|
| 4,054,855 A | 10/1977 | Schlotterbeck |
| 4,303,902 A | 12/1981 | Lesster et al. |
| 4,347,489 A | 8/1982 | Bambozzi |
| 4,392,045 A | 7/1983 | Gilliland |
| 4,689,548 A | 8/1987 | Mechlenburg |
| 4,703,197 A | 10/1987 | Fleischer |
| 4,791,545 A | 12/1988 | Hinckley |
| 4,855,890 A | 8/1989 | Kammiller |
| 4,970,405 A | 11/1990 | Hagiwara |
| 4,992,921 A * | 2/1991 | Albach et al. .............. 363/44 |
| 5,003,453 A | 3/1991 | Tighe et al. |
| 5,045,991 A | 9/1991 | Dhyanchand et al. |
| 5,345,209 A | 9/1994 | Saitoh et al. |
| 5,347,255 A | 9/1994 | Saitoh et al. |
| 5,363,020 A | 11/1994 | Chen et al. |
| 5,379,021 A | 1/1995 | Ito et al. |
| 5,383,109 A | 1/1995 | Maksimovic et al. |

(List continued on next page.)

FOREIGN PATENT DOCUMENTS

| | | |
|---|---|---|
| JP | 09009626 | 1/1997 |
| JP | 11235040 | 8/1999 |

OTHER PUBLICATIONS

Balogh, Laszlo; The Current–Doubler Rectifier: An Alternative Rectification Technique for Push–Pull and Bridge Converters; Unitrode Design Note, 12/94; DN–63, pp 1–3.

(List continued on next page.)

Primary Examiner—Shawn Riley
(74) Attorney, Agent, or Firm—Jones Day

(57) ABSTRACT

A power system having a power factor correction circuit includes a power circuit. The power circuit includes first and second input capacitors, first and second coupled inductors, first and second switches, and an output circuit. The first and second input capacitors form a bank node. The first and second switches are connected to the first and second inductors and the bank node. Likewise, the first an second input capacitors are connected to the first and second inductors. The output circuit is operable to produce an output voltage. A control circuit is operable to monitor the output voltage and produce a switch signal. A drive circuit is coupled to the control circuit and the first and second switches and is operable to operate the first and second switches based on the switch signal.

33 Claims, 43 Drawing Sheets

U.S. PATENT DOCUMENTS

| | | |
|---|---|---|
| 5,406,470 A | 4/1995 | Ridley et al. |
| 5,546,294 A | 8/1996 | Schutten et al. |
| 5,563,775 A | 10/1996 | Kammiller |
| 5,619,405 A | 4/1997 | Kammiller et al. |
| 5,627,455 A | 5/1997 | Jacobs et al. |
| 5,640,059 A | 6/1997 | Kammiller et al. |
| 5,684,683 A | 11/1997 | Divan et al. |
| 5,715,154 A | 2/1998 | Rault |
| 5,719,546 A | 2/1998 | Ito et al. |
| 5,731,969 A | 3/1998 | Small |
| 5,781,419 A | 7/1998 | Kutkut et al. |
| 5,784,266 A | 7/1998 | Chen |
| 5,799,177 A | 8/1998 | McKenzie et al. |
| 5,852,554 A | 12/1998 | Yamamoto |
| 5,894,414 A | 4/1999 | Jiang |
| 5,933,338 A | 8/1999 | Wallace |
| 5,943,229 A | 8/1999 | Sudhoff |
| 6,014,322 A | 1/2000 | Higashi et al. |
| 6,016,258 A | 1/2000 | Jain et al. |
| 6,069,798 A | 5/2000 | Liu |
| 6,104,172 A | 8/2000 | Josephs et al. |
| 6,188,586 B1 | 2/2001 | Farrington et al. |
| 6,215,287 B1 | 4/2001 | Matsushiro et al. |
| 6,292,377 B1 | 9/2001 | Sasaki |

OTHER PUBLICATIONS

Balogh, Laszlo; The New UC 3879 Phase Shifted PWM Controller Simplifies the Design of Zero Voltage Transition Full–Bridge Converters; Unitrode Corporation; U–154; pp1–8, Dec. 1999.

Unitrode Products from Texas Instruments; UCC2817, UCC2818, UCC3817, UCC3818 Bicmos Power Factor Pre-regulator; SLUS395E; Feb. 2000–Revised Apr. 2001; pp. 1–17.

International IR Rectifier; High and Low Side Driver; IR2110/IR2113(S); Data Sheet No. PD60147–Q; El Segundo, California; Jan. 24, 2002; pp. 1–15.

Andreycak, Bill; Designing a Phase Shifted Zero Voltage Transition (ZVT) Power Converter; Unitrode Corporation; Mar. 1993; pp 3–1 thru 3–15.

* cited by examiner

CONVERTER LOAD SHARING

CURRENT SUMMING AMPLIFIER

POWER SYSTEM HAVING A POWER FACTOR CORRECTION CIRCUIT

This application is a continuation of U.S. patent application Ser. No. 10/152,883, filed May 21, 2002, now U.S. Pat. No. 6,731,524 which claims the benefit of U.S. Provisional Application Ser. No. 60/292,350, filed on May 21, 2001. The entire disclosure of Application Ser. Nos. 10/152,883 and 60/292,350 are hereby incorporated into the present application by reference.

BACKGROUND OF THE INVENTION

1. Technical Field

The invention is generally directed to the field of power systems. More specifically, the invention is directed to power systems that generate a regulated constant output voltage. The invention is particularly applicable for use in the telecommunications industry and will be described with particular reference thereto. It will be appreciated, however, that the invention has broader aspects and can be used for other purposes and in other industries.

2. Description of the Related Art

Power systems including regulated power systems are in widespread use in a variety of environments including power systems used in the telecommunication industry. There is a general need for improvements in various power systems, power circuits, and power components.

SUMMARY

A power rectifier includes a DC/DC converter. The DC/DC converter includes first and second bridges comprising a plurality of switch elements and a plurality of coupling capacitors. Each coupling capacitor couples one of the switch elements of the first bridge to one of the switch elements of the second bridge. The first and second bridges are connected to a transformer comprising a first primary winding, a second primary winding, and a secondary winding. A coupled inductor comprises first and second inductors and is connected to the transformer so that the first and second primary windings are inductively coupled through the coupled inductor.

The power rectifier also includes a plurality of power supply units ("PSUs"). Each PSU has an output that is coupled to the output of other PSUs in the power system. Each PSU comprises a first, second, and third power train and a control assembly. Each power train comprises a power factor correction ("PFC") circuit that receives an AC input and generates a first DC output and a DC/DC converter circuit that receives the first DC output and generates a second regulated DC output. The control assembly has a signal path to the first, second, and third power trains. The control assembly monitors outputs supplied by the first, second, and third power trains and in response thereto provides control signals to each of the first, second, and third power trains.

The power rectifier also includes a plurality of control assembly input circuits, a signal processor, and a plurality of control assembly output circuits. The control assembly input circuits are operative to measure characteristics relating to each of the power trains and are operative to generate a measured characteristics output. The signal processor is operative to receive the measured characteristics output, perform computations wherein the measured characteristics output is used in the computations, and generate a signal processor output. The plurality of control assembly output circuits are operative to generate error signals based on the signal processor output.

The power rectifier also includes an inductive coupler. An inductive coupler comprises a first coil defining a first outer periphery and a second coil defining a second outer periphery. A metal member extends around the first and second outer peripheries of the first and second coils forming a conductive loop.

The power rectifier also includes a phase controlled drive circuit. The phase controlled drive circuit includes a drive circuit operable to provide gate signals to an SCR bridge circuit and a phase control circuit. The phase control circuit includes a first phase generator operable to generate a first phase signal, and a second phase generator operable to generate a second phase signal. The second phase signal is periodically reset to an initial value. A drive circuit actuator in the phase control circuit is operable to place the drive circuit in a first activation state when a sum of the first and second phase signals exceeds a threshold value, and is further operable to place the drive circuit in a second activation state when the sum of the first and second phase signals is less than the threshold value.

The power rectifier also includes a power factor correction circuit. A power factor correction circuit includes a power circuit comprising first and second input capacitors, first and second coupled inductors, first and second switches, and an output circuit. The first and second input capacitors form a bank node. The first and second switches are connected to the first and second inductors and the bank node. Likewise, the first an second input capacitors are connected to the first and second inductors. The output circuit is operable to produce an output voltage. A control circuit is operable to monitor the output voltage and produce a switch signal at a switching frequency. A drive circuit is coupled to the control circuit and the first and second switches and is operable to operate the first and second switches based on the switch signal. The drive circuit and control circuit are connected to a flying node, the flying node at a common voltage at the switching frequency.

DETAILED DESCRIPTION

Figure 1:
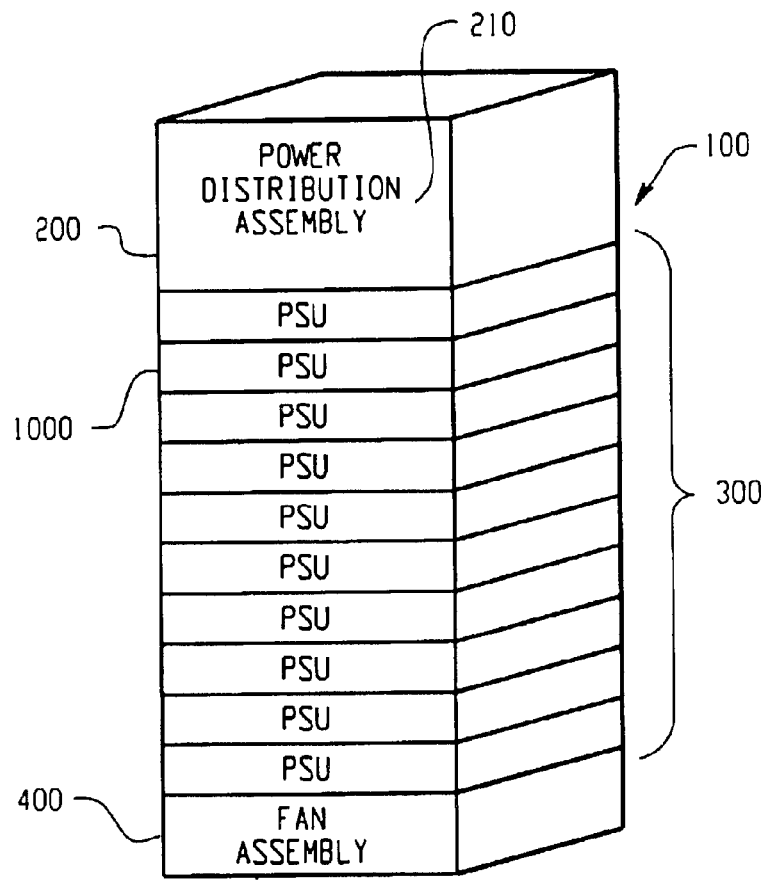
FIG. 1 is a diagram illustrating an embodiment of a power supply assembly.

FIG. 1 is a diagram illustrating an embodiment of a power supply assembly 100 that is particularly useful in the telecommunications industry. The preferred power supply assembly 100 comprises a power supply enclosure 200, a power distribution assembly 210, a power rectifier assembly 300, and a fan assembly 400. The preferred power supply assembly 100 accepts three-phase power as an input and outputs DC output power. Illustratively, the power supply assembly receives three-phase power input at 480 $V_{rms}$, and outputs 48 V DC at up to 2000 A.

The power supply enclosure 200 provides the mechanical mounting locations for the physical components within the power supply assembly 100. The power distribution assembly 210 comprises mounting hardware and devices, such as fuses and circuit breakers, for distributing power to systems that will use the regulated DC power. The rectifier 300 generates the regulated DC power from the AC input. And, the fan assembly 400 provides a mechanism for cooling components in the power supply assembly 100.

Figure 2:
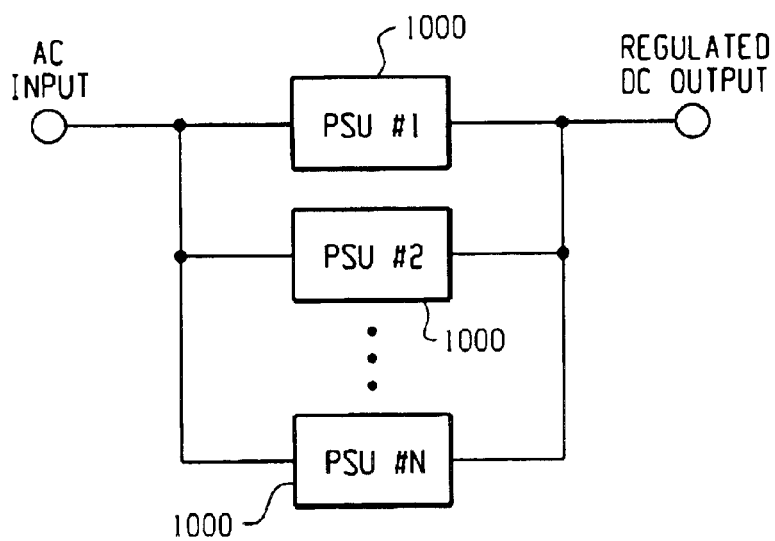
FIG. 2 is block diagram illustrating connectivity of the power supply units used in the power supply assembly.
Figure 3:
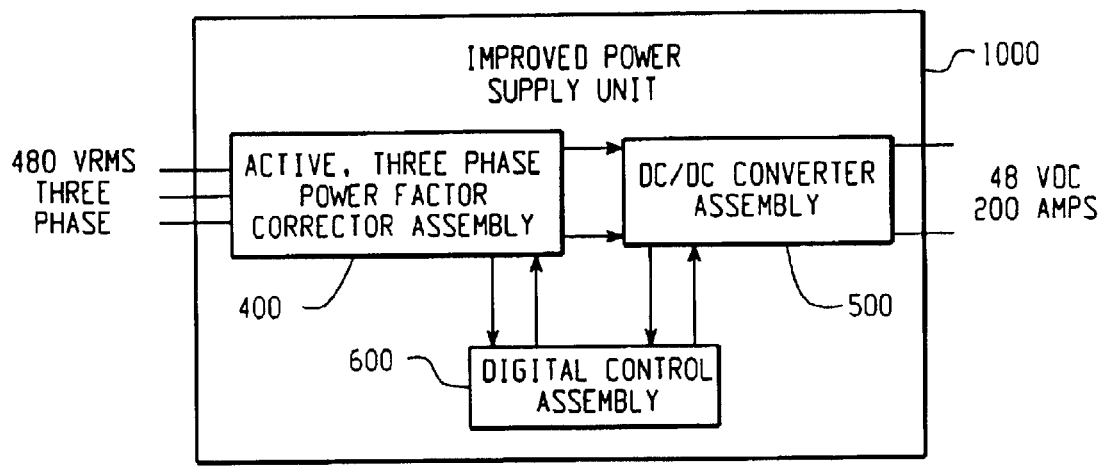
FIG. 3 is a block diagram illustrating the configuration of the power supply unit.

As shown in FIGS. 1 and 2, the rectifier assembly 300 comprises a plurality of power supply units (PSUs) 1000 that are coupled together in parallel to generate the desired output current capacity. Shown in FIG. 3 is a block diagram of a preferred PSU 1000. The preferred PSU 1000 comprises an active three phase power factor corrector assembly ("3Φ PFC assembly") 400, a DC/DC converter assembly 500, and a digital control assembly ("DCA") 600. In the embodiment illustrated, the 3Φ PFC assembly 400 accepts three phase AC input power and generates DC output power. The DC/DC converter assembly 500 receives the unregulated DC output generated by the 3Φ PFC assembly 400 and converts the unregulated DC output to a regulated DC output voltage. The DCA 600 receives inputs from the 3Φ PFC assembly 400 and the DC/DC converter assembly 500 and generates control signals for the 3Φ PFC assembly 400 and the DC/DC converter assembly 500.

Figure 4:
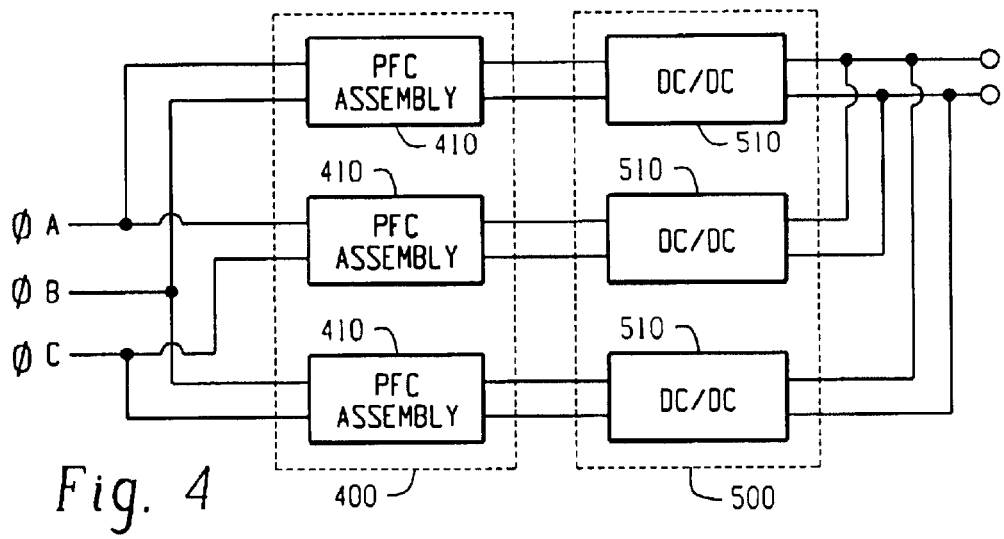
FIG. 4 is a schematic diagram of a three phase power factor correction assembly.
Figure 5:
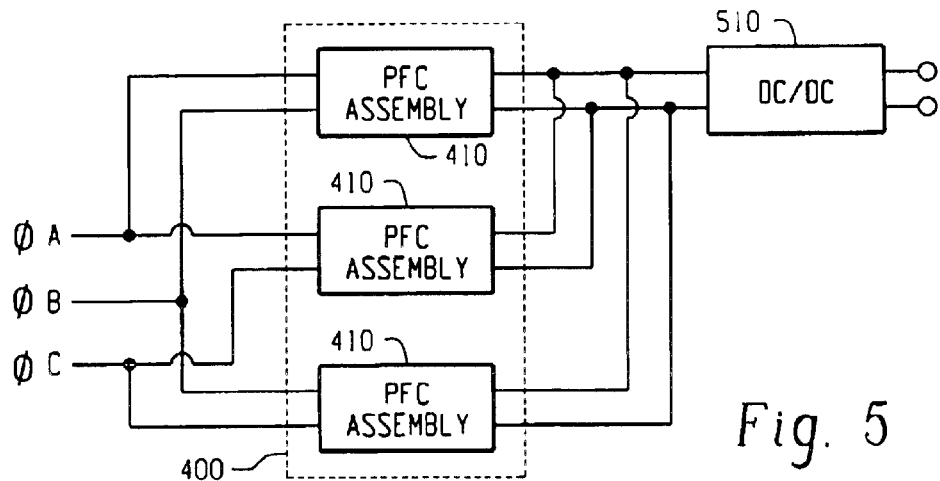
FIG. 5 is a schematic diagram of an alternate three phase power factor correction assembly.
Figure 6:
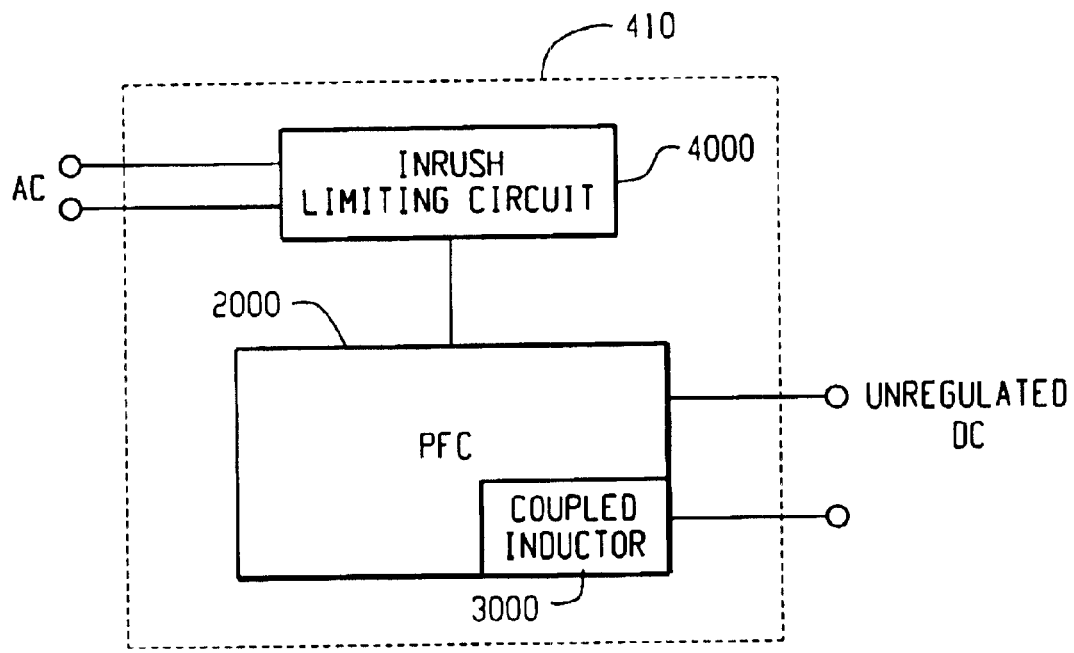
FIG. 6 is a block diagram of an embodiment of the power factor correction assembly.

With reference to FIG. 4, the preferred 3Φ PFC assembly 400 comprises three PFC assemblies 410, one for each phase of the three phase input power source. In one embodiment, the output of each PFC assembly 410 is provided to a separate DC/DC converter 510. In an alternative embodiment, as illustrated in FIG. 5, the output of all three PFC assemblies 410 within a 3Φ PFC assembly 400 are coupled together in parallel and provided to a single DC/DC converter 510. As illustrated in FIG. 6, each PFC assembly 410 preferably comprises a power factor correction circuit 2000, a coupled inductor 3000 having an adjustable coupling factor, and a phase controlled inrush limiting circuit 4000.

It is to be understood that the components, circuits, systems and methods described herein do not have to be implemented together. Many novel features that may be implemented in power systems are described herein. The novel features may be implemented separately or in combination with other novel features described herein.

Power Factor Correction Circuit 2000

Figure 7:
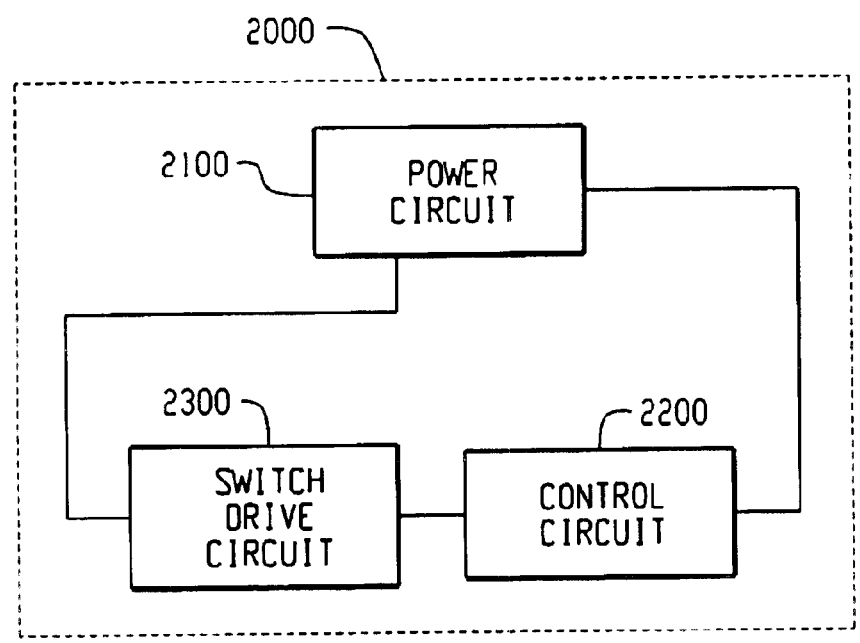
FIG. 7 is a block diagram of a power factor correction circuit.

As illustrated in FIG. 7, the preferred power factor correction circuit 2000 comprises a power circuit 2100, a control circuit 2200 and a switch drive circuit 2300. The control circuit 2200 monitors the power circuit 2100 and controls the switch drive circuit 2300 to adjust the output of the power circuit 2100.

Figure 8:
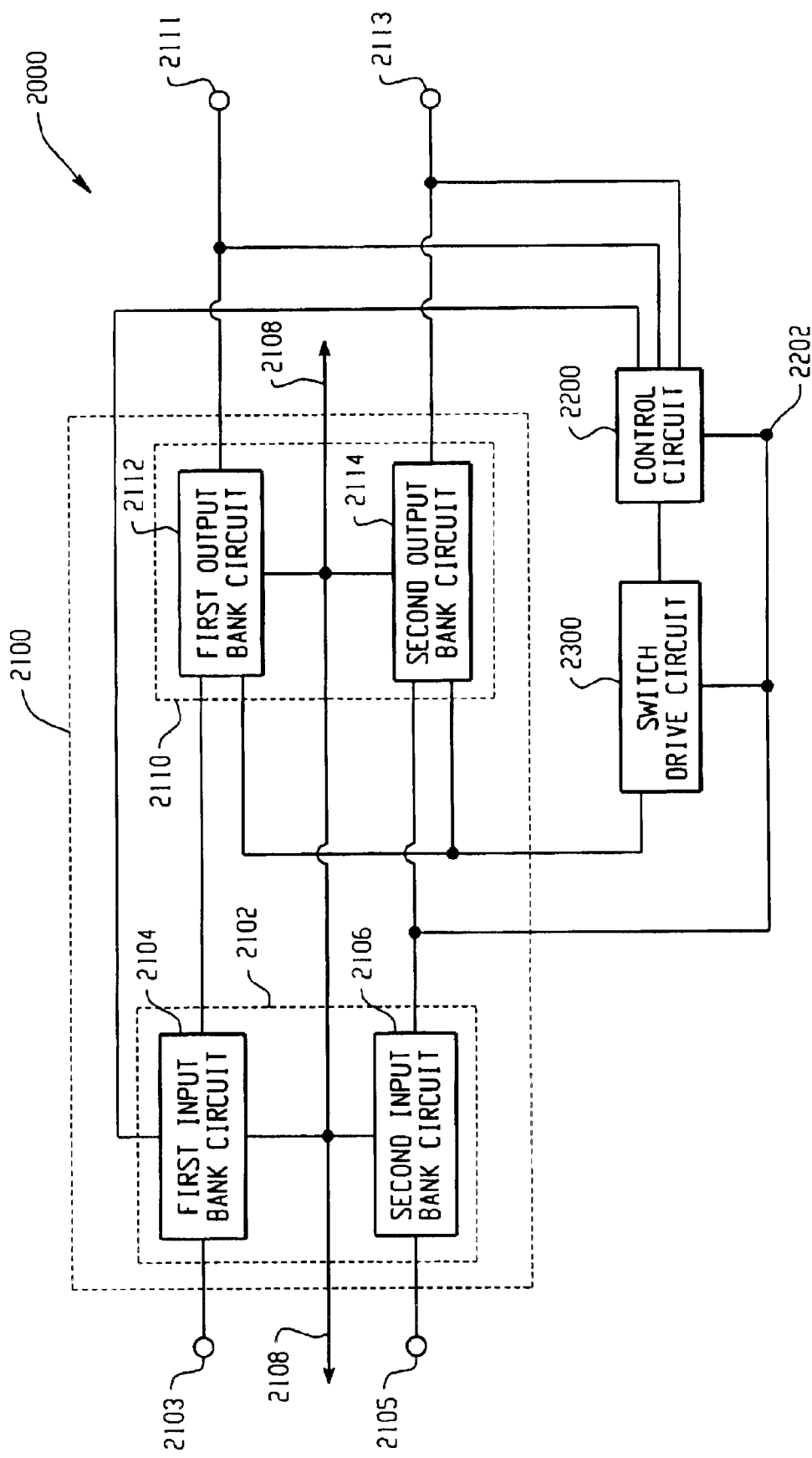
FIG. 8 is a more detailed block diagram of a power factor correction circuit.

FIG. 8 provides a more detailed block diagram of the preferred power factor correction circuit 2000. The power circuit 2100 comprises an input bank 2102 that includes a first input bank circuit 2104 and a second input bank circuit 2106. The first and second input bank circuits 2104 and 2106 are symmetric about a bank node 2108.

The input bank 2102 is connected to an output bank 2110. The output bank 2110 comprises a first output bank circuit 2112 and a second output bank circuit 2114. The first and second output bank circuits 2112 and 2114 are also symmetric about the bank node 2108.

A rectified AC input voltage is provided across input terminals 2103 and 2105 of the first and second input bank circuits 2104 and 2106, respectively. A regulated DC output voltage is generated across the output terminals 2111 and 2113 of the first and second output bank circuits 2112 and 2114, respectively. The input voltage provided across the input terminals 2103 and 2105 is substantially balanced so that the magnitude of the voltage measured from the input terminal 2103 to the bank node 2108 is substantially equal to the magnitude of the voltage measured from the bank node 2108 to the input terminal 2105. Likewise, the voltage from the output terminal 2111 to the bank node 2108 is substantially equal to the voltage from the bank node 2108 to the output terminal 2113.

At the output bank 2110, the voltage between the output terminal 2111 and bank node 2108 and between the bank node 2108 and the output terminal 2113 is referred to as the half-bank voltage. The half-bank voltage is approximately one-half the voltage between the output terminals 2111 and 2113.

The control circuit 2200 monitors the regulated DC output voltage at the output terminals 2111 and 2113, the rectified input voltage at the terminals 2103 and 2105, and a current signal in the power circuit 2100. The control circuit 2200 preferably operates from a flying node 2202. The flying node 2202 is a node that is either connected to the bank node 2108 or the output terminal 2113. Thus, the voltage on the flying node is either at the half bank voltage or the voltage at the output terminal 2113. Accordingly, the magnitude of the voltage change of the flying node 2202 is equal to the magnitude of the half bank voltage.

The switch drive circuit 2300 receives a control signal from the control circuit 2200 and provides a drive signal to drive switches in the first and second output banks 2112 and 2114. The switch drive circuit 2300 also operates from the flying node 2202.

Figure 9:
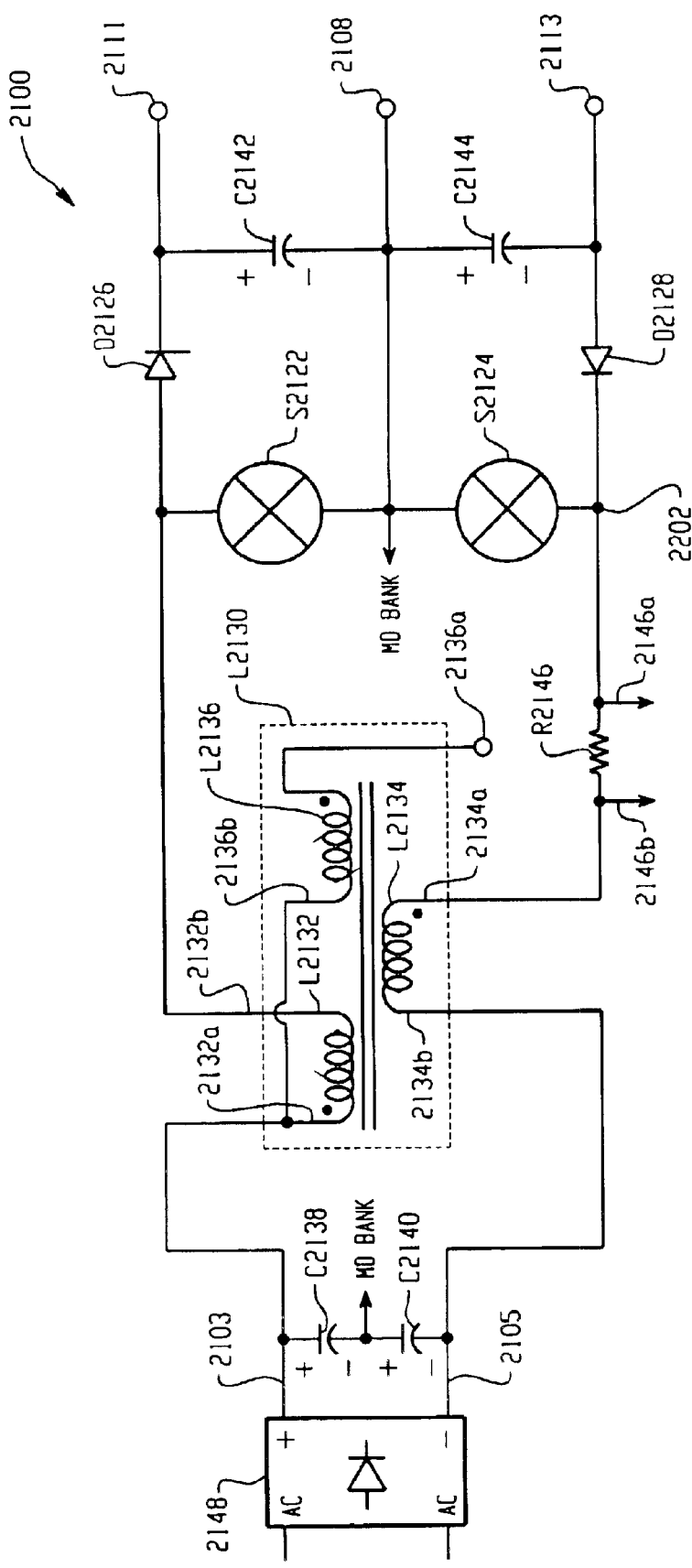
FIG. 9 is a schematic diagram of a power circuit.

A more detailed schematic diagram of the power circuit 2100 is provided in FIG. 9. The power circuit 2100 comprises a symmetrical arrangement of two switches S2122 and S2124, two free wheeling diodes D2126 and D2128, a multi-winding inductor L2130 that preferably comprises inductor coils L2132, L2134 and L2136, two input capacitors C2138 and C2140 connected in series across a rectified line, and two series connected bank capacitors C2142 and C2144. A current sensing resistor R2146 is monitored by the control circuit 2200.

The circuit of FIG. 9 is symmetric about the bank node 2108. A rectifier 2148 receives an AC input and provides a rectified voltage that is divided evenly above and below the bank node 2108. Thus, the voltages across the capacitors C2138 and C2140 are substantially equal. Balancing across the bank node is described in further detail below. The rectifier 2148 could be a standard rectifier known to those skilled in the art or alternatively the bridge circuit 4001 described herein in the Inrush Limiting Circuit 4000 Section.

Figure 9A:
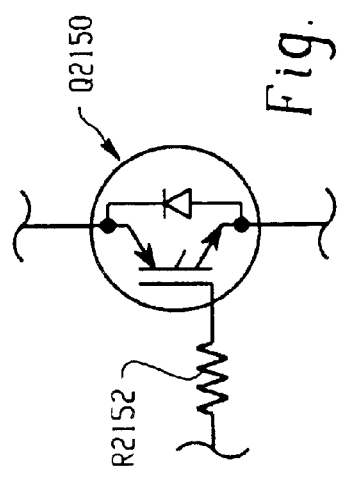
FIG. 9A is a schematic diagram of an exemplary switch.

Shown in FIG. 9A is a preferred switch that can be used as switches S2122 and S2124. The preferred switch comprises IGBT Q2150 coupled to a base resistor R2152. The preferred switch receives input signals from the switch drive circuit 2300 and changes states in response thereto. Alternative switches may be realized by using MOSFETs, BJTs, or other switching devices.

The state of the switches S2122 and S2124 determines the voltage of the flying node 2202. When the switch S2124 is in an open state, the diode D2128 conducts and thus the flying node 2202 is at a voltage equal to the voltage at the output terminal 2113. When the switch S2124 is a closed state, the diode D2128 does not conduct and the voltage at the flying node 2202 is equal to the half-bank voltage at the node 2108. Therefore, the flying node 2202 has a voltage swing at an operating frequency of the control circuit 2200. The magnitude of the voltage is approximately equal to the half-bank voltage.

Figure 10:
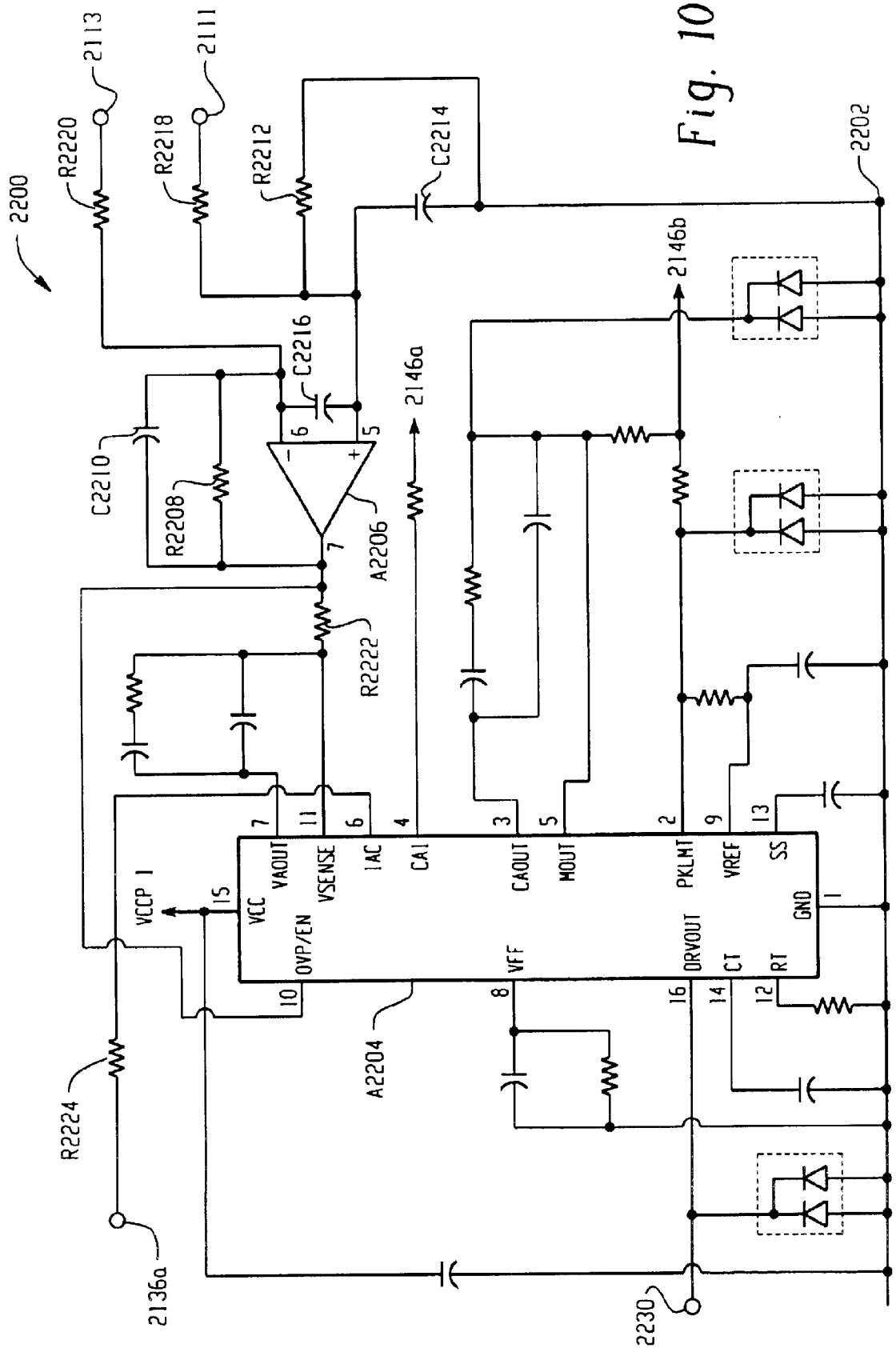
FIG. 10 is a schematic diagram of a switch control circuit.

The control circuit 2200, as illustrated in FIG. 10, utilizes a controller A2204. An exemplary controller A2204 is a Unitrode/Texas Instruments UCC28180DW BiCMOS Power Factor Preregulator. The flying node 2202 connected to Pin 1 of the controller A2204 switches at the operating frequency of the power factor correction circuit 2200 at a switched magnitude equal to the half-bank voltage. In the illustrative embodiment of FIGS. 8-11, the half-bank voltage is 400V and the operating frequency is 100 kHz. The supply voltage VCCP1 likewise flies at 400V, 100 kHz, and is referenced from the flying node 2202.

Aside from the flying node 2202, the circuitry connected to pins 1, 2, 3, 4, 5, 7, 8, 9, 10, 12, 13, 14, and 15 is substantially similar to the circuitry connected to the controller when using a ground instead of the flying node 2202, as recommended by the manufacturer of the controller A2204. Accordingly, only the circuitry connected to pins 6, 11, and 16 is discussed in detail below.

Pin 11 references a bank voltage signal measured from output terminals 2111 and 2113. Because the flying node 2202 is flying at 400V, 100 kHz, a difference amplifier A2206 is used to obtain the bank voltage signal. The difference amplifier A2206 includes a resistor R2208 and a capacitor C2210 connected in parallel between the inverting input and the output of the amplifier A2206. Similarly, a resistor R2212 and a capacitor C2214 are connected in parallel between the non-inverting input and the flying node 2202.

A bypass capacitor C2216 may also be added between the inverting and non-inverting inputs for added stability or noise rejection. A first resistor R2218 connects the output terminal 2111 of the power circuit 2100 to the non-inverting input of the difference amplifier A2206, and a second resistor R2220 connects the output terminal 2113 of the power circuit 2100 to the inverting input of the difference amplifier A2206.

The difference amplifier A2206 rejects the common mode component of the 400V, 100 kHz signal, and provides a proportional amount of the output voltage of the power circuit 2100 through resistor R2222 to Pin 11 of the controller A2204.

Pin 6 of the controller A2204 receives a current signal that is proportional to the input voltage applied to the input terminals 2103 and 2105. A resistor R2224 connects Pin 6 of the controller A2204 to the terminal L2136a of the inductor coil L2136 (shown in FIG. 9). The inductor coil L2136 bucks out the 400V, 100 kHz signal. The resistor R2224 converts the voltage signal appearing on the terminal 2136a to a current signal. The voltage to be monitored and applied to the resistor R2224 is between the inductor coil terminals L2132a and L2134b. By means of the inductor coil L2136, the voltage appearing between the inductor coil L2134 is cancelled. Thus, the voltage between the inductor coil terminals L2136a and L2134a is essentially the same as the voltage between the inductor coil terminals L2132a and L2134b.

Figure 11:
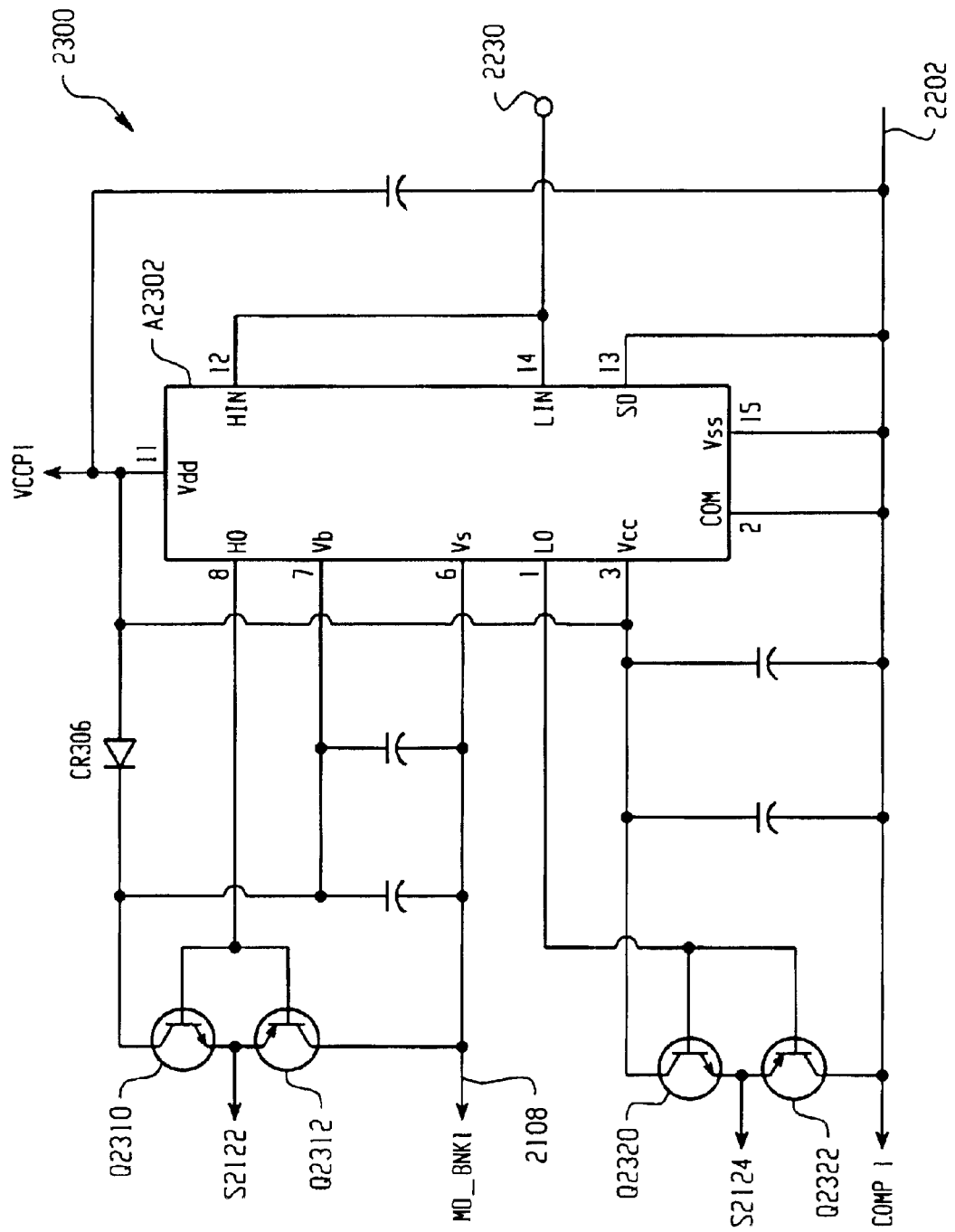
FIG. 11 is a schematic diagram of a switch driver circuit.

Pin 16 of the controller A2204 is connect to the switch drive circuit 2300 and provides a drive signal. A schematic diagram for the switch drive circuit 2300 is shown in FIG. 11. The switch drive circuit includes a driver A2302. An exemplary driver A2302 is an IR2110S High And Low Side Drive, available from International Rectifier. The drive signal from Pin 16 of the controller A2204 is provided to high side gate drive input Pin 12 and the low side gate drive input Pin 14 of the driver A2302, and thus the switches S2122 and S2124 are driven on and off in unison.

The driver A2302 operates from the flying node 2202. Pin 6 of the driver A2302 is at the half-bank voltage, as it is connected to the bank node 2108. Pin 8 provides a high side gate drive output signal to the coupled bases of the NPN-PNP paired transistors Q2310 and Q2312. The output of the paired transistors Q2310 and Q2312 drives the switch S2122. Likewise, Pin 1 provides a low side gate drive signal to the coupled bases of the NPN-PNP paired transistors Q2320 and Q2322. The output of the paired transistors Q2320 and Q2322 drives the switch S2124.

The power factor correction circuit 2200 enables power factor correction for high voltage inputs using switches S2122 and S2124, such as FETs or IGBTs, that in some embodiments are rated considerably less than the total output bank voltage. Furthermore, because the controller A2204 and the driver A2302 operate from a flying node 2202, both the controller A2204 and the driver A2302 dynamically adjust to receive the monitoring signals from the power circuit 2100 and to provide the drive signals for the switches S2122 and S2124.

During operation of the power factor correction circuit 2200, the switches S2122 and S2124 are turned on and off simultaneously. The voltage at the input terminals 2103 and 2105 and at the output terminals 2111 and 2113 is substantially balanced with respect to the bank node 2108. The balancing of the voltage across the capacitors C2138 and C2140 occurs when the switches S2122 and S2124 are closed. When these switches close, two symmetric circuits common to the bank node 2108 are created. The first symmetric circuit comprises a series connected input capacitor C2138, inductor coil L2132, and switch S2122. The second symmetric circuit comprises a series connected input capacitor C2140, inductor coil L2134, and switch S2124. In the second symmetric circuit, the impedance of current sensing resistor R2146 is negligible, and thus the voltage drop across this resistor is ignored. Thus, both symmetric circuits essentially comprise a series connected capacitor and inductor coil sharing a common node.

The coupling of the inductor coils L2132 and L2134 aids in the balancing of the input voltage across the input capacitors C2138 and C2140. The inductor coils L2132 and L2134 are preferably a moderately coupled inductor device L2130. A preferred moderately coupled inductor is the inductor device 3000 which is described in further detail below in the COUPLED INDUCTOR 3000 section. The coupling of the inductor coils L2132 and L1234 causes the currents and voltages in each symmetric circuit to substantially match when the switches are closed. As coupling between the inductor coils L2132 and L2134 is increased, the balancing of the voltage across the capacitors C2138 and C2140 is increased. However, with very tight coupling between the inductor coils L2132 and L2134, transients in each symmetric circuit tend to increase when the switches S2122 and S2124 close.

During the remaining time that the switches S2122 and S2124 are closed, energy is stored in the inductor L2130. The voltage applied across the inductor coils L2132 and L2134 is also equalized to the voltage across the capacitors C2138 and C2140, respectively. The rate of the current changes in each inductor coil L2132 and L2134 also tends to be equal.

The switches S2122 and S2124 are turned off at the same time, creating a freewheeling interval for diodes D2126 and D2128. When the switches S2122 and S2124 turn off, two symmetric circuits are created. The first symmetric circuit comprises a series connected input capacitor C2138, inductor coil L2132, diode D2126, and bank capacitor C2142. The second symmetric circuit comprises a series connected input capacitor C2140, inductor coil L2134, diode D2128, and bank capacitor C2144. In the second symmetric circuit, the impedance of current sensing resistor R2146 is negligible, and thus the voltage drop across this resistor is ignored. Both symmetric circuits are symmetric about the bank node 2108. Additionally, the currents in both symmetric circuits at the moment the switches S2122 and S2124 open are substantially equal.

In the first symmetric circuit, the voltage measured from the bank node 2108 to the input terminal 2103 is positive. Energy stored in the inductor coil L2132 is released to the bank capacitor C2142 through the diode D2126. As the energy is released, the current decreases. Thus, the magnitude of output voltage across the output terminal 2111 and to the bank node 2108 is greater than the magnitude of the input voltage across the input capacitor C2138.

In the second symmetric circuit, the voltage measured from the bank node 2108 to the input terminal 2105 is negative. Energy stored in the inductor coil L2134 is released to the bank capacitor C2144 through the diode D2128. As the energy is released, the current decreases. Thus, the magnitude of output voltage across the output terminal 2113 and the bank node 2108 is greater than the magnitude of the input voltage across the input capacitor C2140.

Accordingly, energy stored in the inductor L2130 when the switches S2122 and S2124 are closed is released to the bank capacitors C2142 and C2144 when the switches S2122 and S2124 are open. The interval that occurs while the switches are open is the "freewheeling" interval. The voltages across the input capacitors C2138 and C2140 substantially match at the beginning of the freewheeling interval, and the magnitude of the current at the beginning of the freewheeling interval matches in the two freewheeling diodes D2126 and D2128 and falls at substantially the same rate for each. Therefore the bank capacitors C2142 and C2144 receive equal amp-seconds and thereby have matching voltages.

Figure 12A:
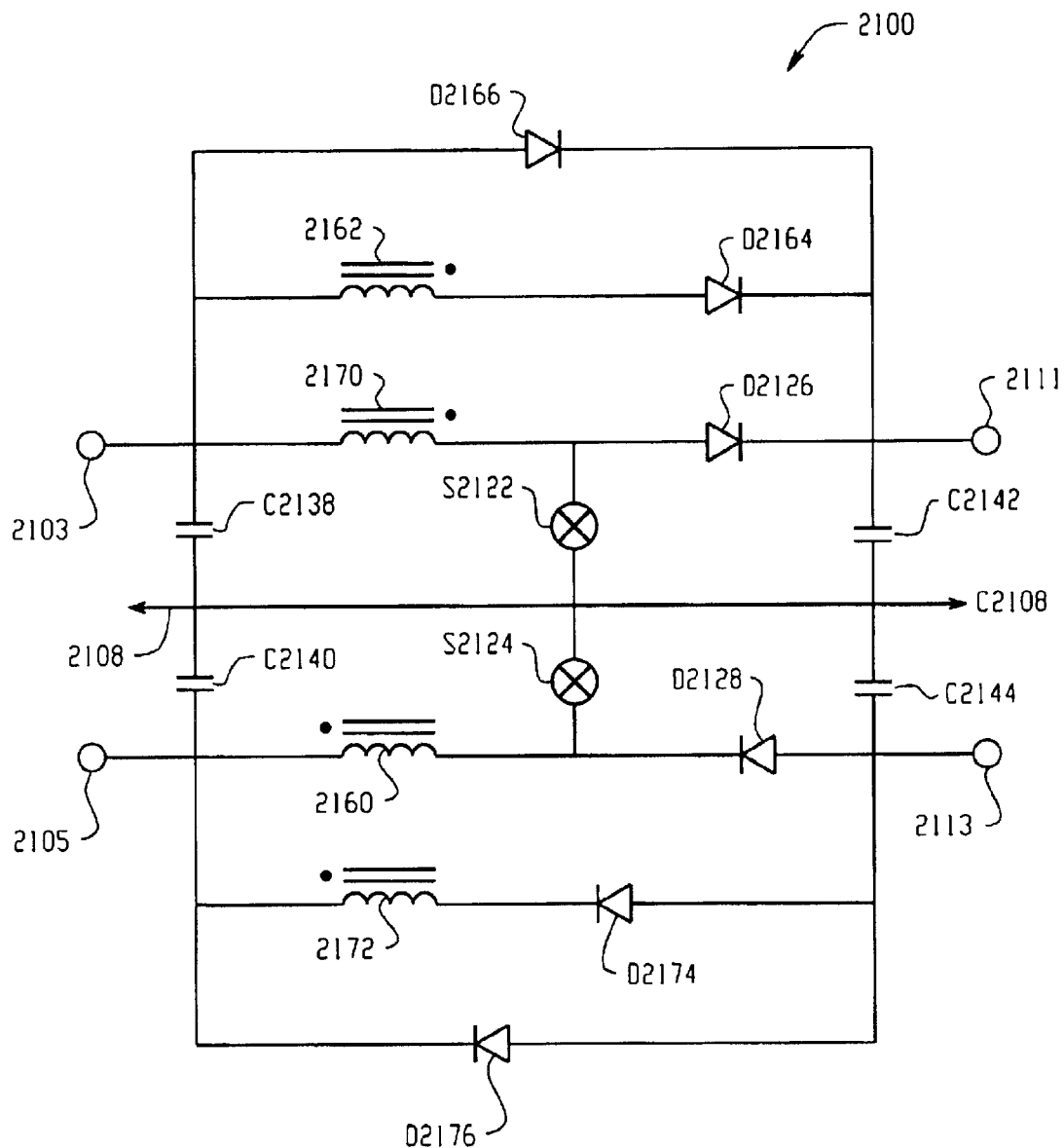
FIG. 12A is a schematic diagram of an alternative embodiment of a power circuit.

Shown in FIG. 12A is an alternative embodiment of the power circuit 2100. This power circuit comprises a first coupled inductor having inductor coils 2160 and 2162, and a second coupled inductor having inductor coils 2170 and 2172. Inductor coils 2160 and 2170 store and release energy is a similar manner as described above with respect to inductor coils L2132 and L2134. Inductor coils 2162 and 2172 flow freewheeling current through diodes D2164 and D2174, respectively, to balance the voltage on the bank capacitors C2142 and C2144. Moderately coupling the inductor coils 2160 and 2162, and moderately coupling the inductor coils 2170 and 2172 aids in achieving the balancing across the bank node 2108 substantially as described above.

With reference to FIGS. 10 and 11, in another embodiment of the power factor correction circuit 2000, the ground Pin 1 of the controller A2204 (and other circuitry in FIG. 10 coupled to Pin 1) is connected to the output terminal 2113 instead of the flying node 2202. Thus, the ground Pin 1 does not fly at the half bank voltage as previously described. However, the COM Pin 2 of the driver A2302 remains referenced from the flying node 2202 and operates as previously described.

Figure 12B:
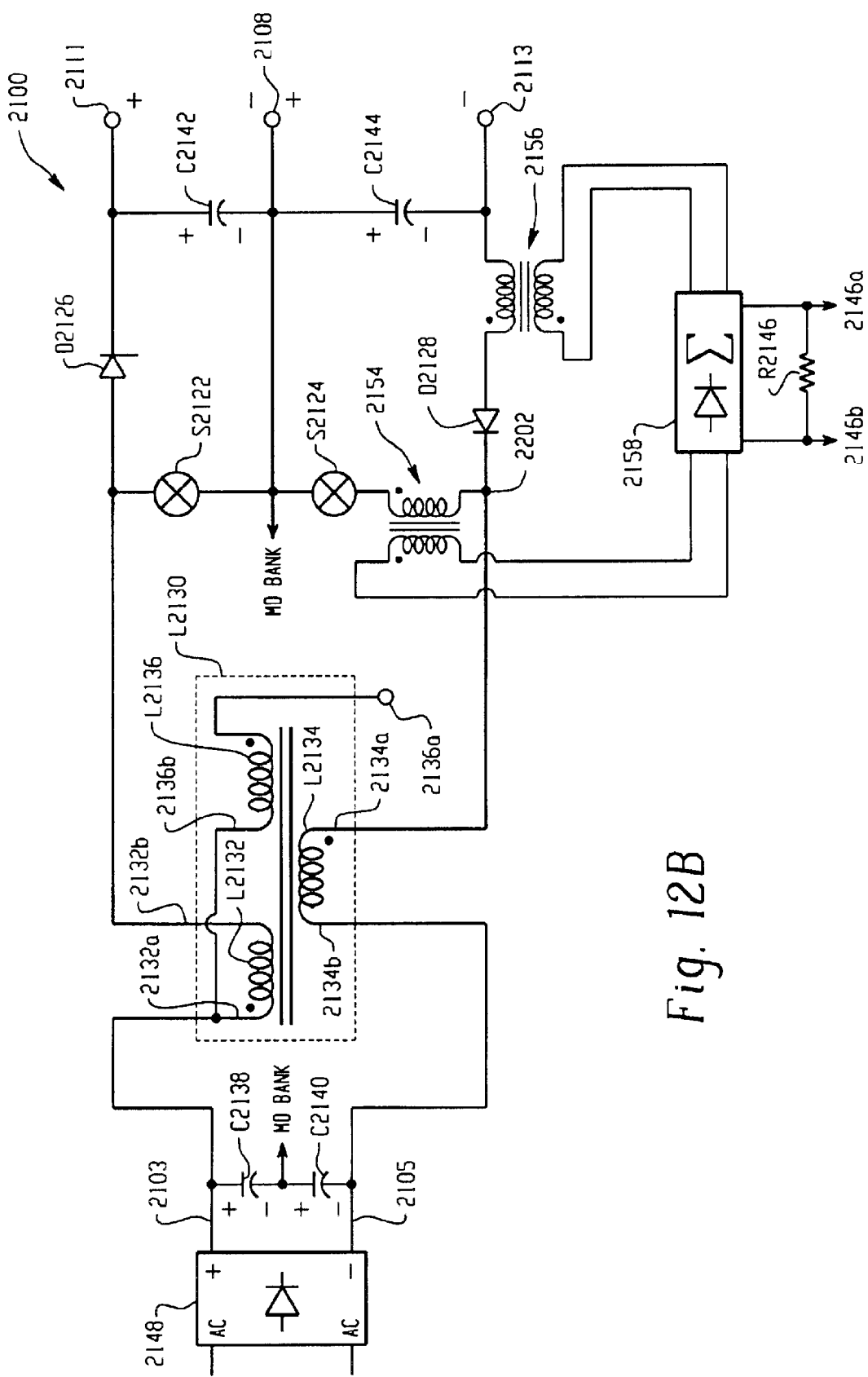
FIG. 12B is a schematic diagram of another alternative embodiment of a power circuit.

With reference to FIG. 12B, in another embodiment, the addition of current transformer 2154 between the switch 2124 and the flying node 2202 and a second current transformer 2156 in series with diode D2128 at the anode provides the current signal received by the controller A2204. The secondary windings of the current transformers are coupled to a rectifier and summing device 2158 and summed into the resistor R2146, which is added is series between pins 4 and 2 of the controller A2204. Thus, the current sense resistor R2146 may be eliminated from the direct path in the power circuit 2100, and the controller A2204 may be referenced from a ground rather than the flying node 2202. The switches S2122 and S2124 may then be driven from gate transformers or optical couplers.

It is also to be appreciated that the switches S2122 and S2124 need not be directly coupled to the switch drive circuit 2300. For example, gate transformers or optical couplers may be used to drive the switches S2122 and S2124. If gate transformers are utilized, the gate transformer for the switch S2122 is referenced from the bank node 2108 and the gate transformer for the switch S2124 is referenced from the flying node 2202. If the switches S2122 and S2124 are switching devices actuated by an optical signal, the drive circuit may only be optically coupled to the switches S2122 and S2124.

The power factor correction circuit 2100 thus may utilize semiconductor devices rated at one-half the output voltage across the output terminals 2111 and 2113. Furthermore, the topology of the power circuit 2200 inherently balances without a separate balancing control system. Finally, the power factor correction circuit 2100 may be combined with other power factor correction circuits 2100, thus providing for three single phase circuits to be combined to share a bank capacitor and a single dc—dc converter load, as illustrated in FIG. 5.

Coupled Inductor 3000

Figure 13:
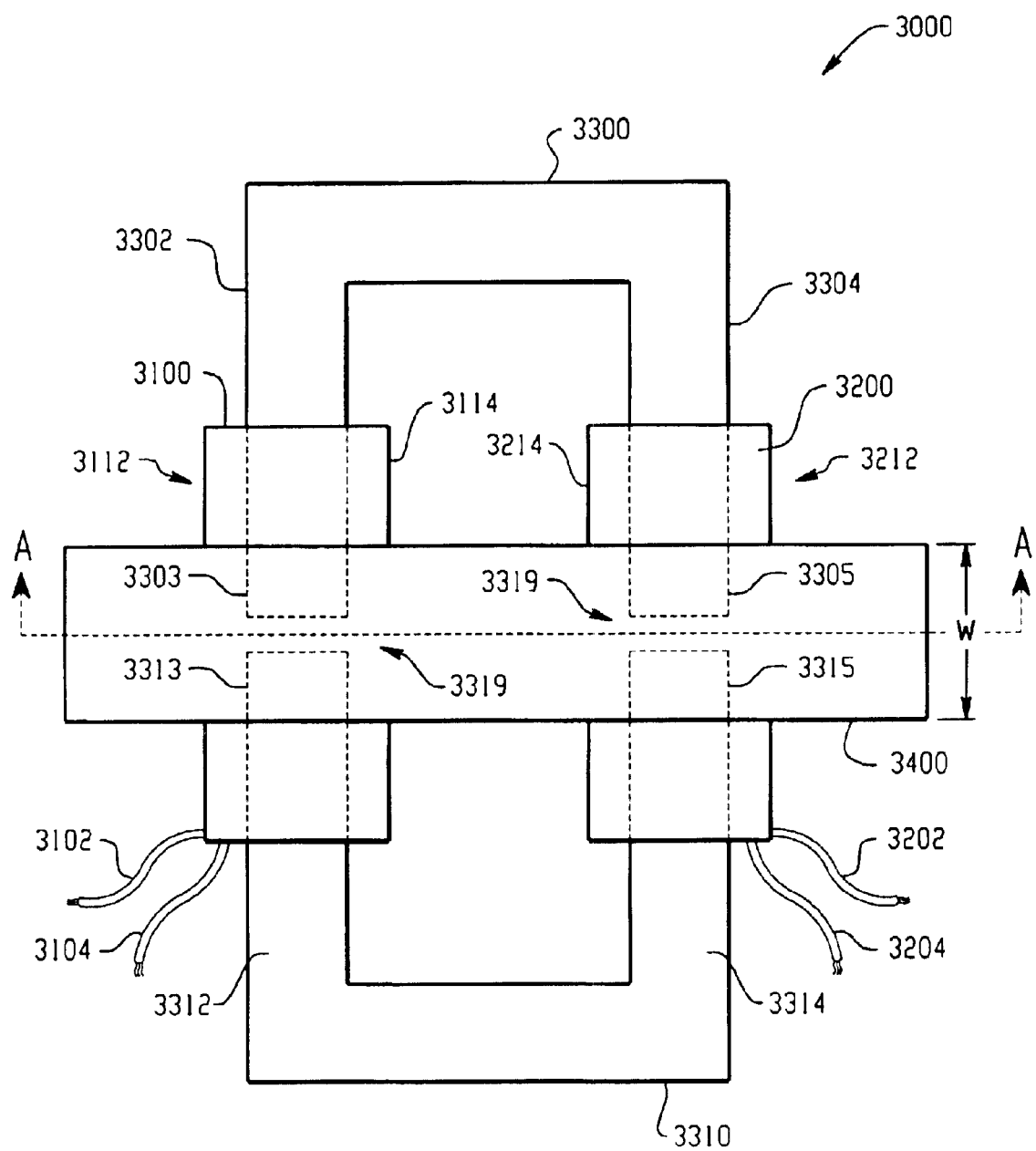
FIG. 13 is a schematic diagram illustrating a top view of an inductor device having adjustable coupling between first and second coils.

The moderately coupled inductor device as previously described may be better understood with reference to FIGS. 13-18B. In particular, FIG. 13 provides a schematic diagram illustrating a top view of an inductor device 3000 having adjustable coupling between a first coil 3100 and a second coil 3200. A first pair of inductor leads 3102 and 3104 is connected to the first coil 3100, and a second pair of inductor leads 3202 and 3204 is connected to the second coil 3200. The first coil 3100 defines an outer periphery 3112 and an inner periphery 3114. Similarly, the second coil 3200 defines an outer periphery 3212 and an inner periphery 3214.

A first C core 3300 includes legs 3302 and 3304, and a second C core 3310 includes legs 3312 and 3314. Distal portions 3303, 3305, 3313 and 3315 of the legs 3302, 3304, 3312 and 3314, respectively, are separated by an air gap 3319. The air gap controls the reluctance of the magnetic path through the C core. An alternate method of controlling the reluctance is to use a lower permeability material for the C core and reducing or eliminating the air gap. The first coil 3100 is disposed over the C core legs 3302 and 3312, and the second core 3200 is disposed over C core legs 3304 and 3314. The first and second coils 3100 and 3200 may be directly wrapped around the cores legs 3302, 3304, 3312 and 3314, or may be wrapped around plastic bobbins that slidably receive the core legs 3302, 3304, 3312 and 3314.

Normally, in parallel disposition the first coil 3100 and the second coil 3200 on the opposite legs of the C cores 3300 and 3310 have very loose coupling. However, the coupling between the first coil 3100 and the second coil 3200 may be increased by adding a metal member 3400 that extends around the outer periphery 3112 of the first coil 3100 and the outer periphery 3212 of the second coil 3200 to form a conductive loop. The metal member 3400 increases the magnetic interface between the first coil 3100 and the second coil 3200 to increase the resultant coupling between them. The first coil 3100 and the second coil 3200 are essentially coupled by transformer action through the metal member 3400.

The amount of coupling between the first coil 3100 and the second coil 3200 for a given inductor structure with a fixed core size, fixed aspect ratio, and fixed turns may be varied by changing the width, position, shape, the number metal members or the number of turns of metal members extending around the outer peripheries 3112 and 3212. A wide range of coupling can be attained.

The metal member 3400 may comprise a single metal band extending around the first and second outer peripheries 3112 and 3212 of the first and second coils 3100 and 3200. Alternatively, the metal member 3400 may comprise metal sections connected by conductive wires, or may even comprise a plurality of shorted conductor loops.

Figure 14A:
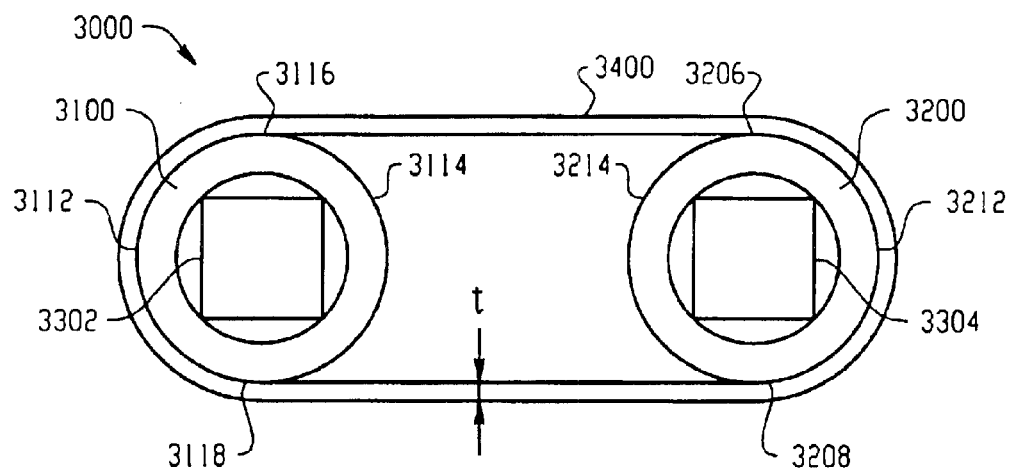
FIG. 14A is a cross section view of the inductor device of FIG. 13.

FIG. 14A provides a cross-sectional view of the inductor device 3000 of FIG. 13. The first and second coils 3100 and 3200 are disposed over the first and second core legs 3302 and 3304 as previously described. The cross-sectional view of FIG. 14A also shows that the first coil 3100 defines top and bottom peripheries 3116 and 3118, and that the second coil defines top and bottom peripheries 3216 and 3218. The metal member 3400 extends around the outer peripheries 3112 and 3212 and portions of the top and bottom peripheries 3116, 3118, 3216 and 3218 to form a conductive loop and thus couple the first and second coils 3100 and 3200 by transformer action. The metal member 3400 may further follow the contour of the first and second coils 3100 and 3200 closely around essentially the entire circumferences of the first and second coils 3100 and 3200 to obtain maximum coupling.

Note that the thickness t of the metal member 3400 shown in FIG. 14A is exaggerated. Illustratively, if the metal member 3400 comprises a metal band, the thickness t of the metal member will be less than the thickness depicted in FIG. 14A.

Figure 14B:
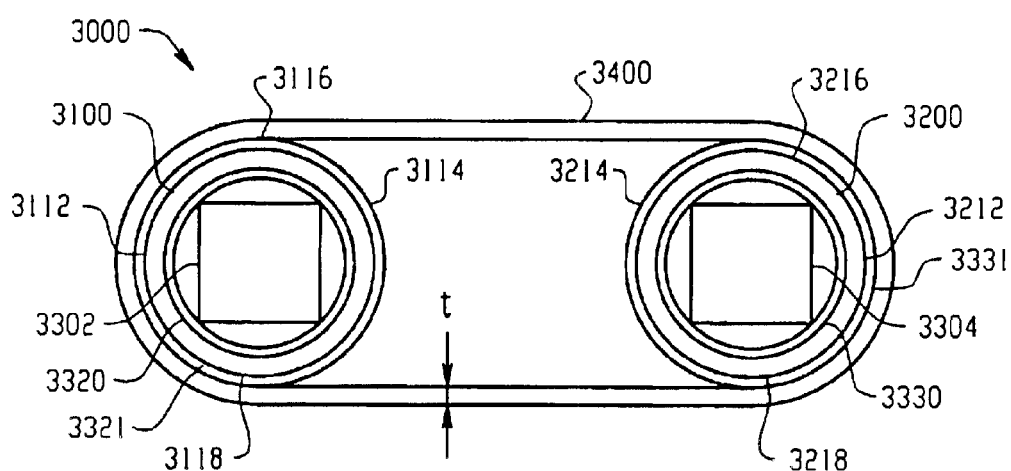
FIG. 14B is a cross section view of the inductor device of FIG. 13, and further including an insulating material.

FIG. 14B provides a cross-sectional view of the inductor device of FIG. 13, in which the inductor device 3000 further includes insulation material 3320 interposed between the first coil 3100 and core leg 3302, and insulation material 3330 interposed between the second coil 3200 and core leg 3304. Furthermore, insulation material 3321 is interposed between the first coil 3100 and the metal member 3400, and likewise insulation material 3331 is interposed between the second coil 3200 and the metal member 3400. The insulation material 3320, 3321, 3330 and 3331 is provided to prevent shorting of the coils 3100 and 3200 to the core legs 3302 and 3304, and to the metal member 3400. Furthermore, the thickness d of insulation material 3321 and 3331 may be selected to adjust the coupling of the first coil 3100 and the second coil 3200 through the metal member 3400. Generally, as the thickness d of the insulating material 3321 and 3331 increases, the coupling between the first and second coils 3100 and 3200 through the metal member 3400 will decrease.

Figure 14C:
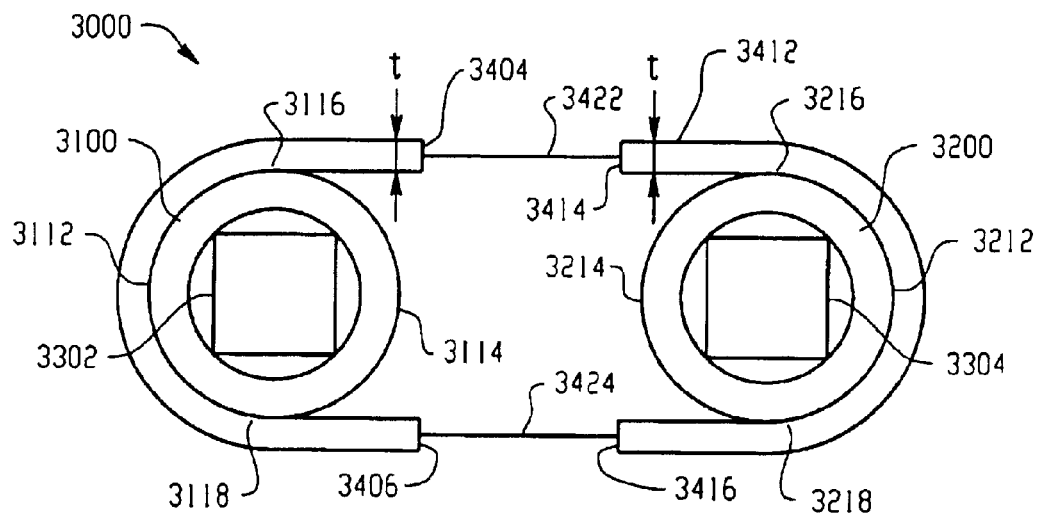
FIG. 14C is a cross section view of another embodiment of an inductor device having adjustable coupling between first and second coils.

FIG. 14C is another embodiment of an inductor device 3000 having adjustable coupling between the first coil 3100 and the second coil 3200. The inductor device 3000 is substantially as described with respect to FIG. 14A, except that the metal member 3400 comprises first and second sections 3402 and 3412. The first section 3402 has distal regions 3404 and 3406 and is disposed around the outer periphery 3112 and portions of the top and bottom peripheries 3116 and 3118 of the first coil 3100. The second section 3412 has distal regions 3414 and 3416 and is disposed around the outer periphery 3212 and portions of the top and bottom peripheries 3216 and 3218 of the second coil 3200. The first and second sections 3402 and 3412 are connected by one or more conductive wires 3422 and 3424 to form a conductive loop. The coupling between the first coil 3100 and the second coil 3200 when using the first and second sections 3402 and 3412 will be less than the coupling when using a continuous metal member 3400 as described with reference to FIG. 14A.

Figure 14D:
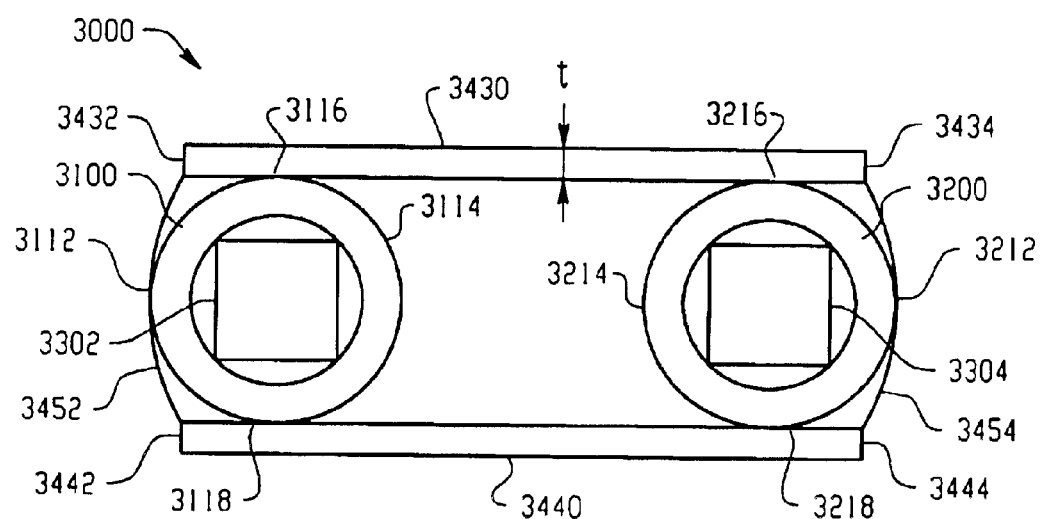
FIG. 14D is a cross section view of another embodiment of an inductor device having adjustable coupling between first and second coils.

FIG. 14D provides another embodiment of an inductor device 3000 having adjustable coupling between the first coil 3100 and the second coil 3200. The embodiment of FIG. 14D is similar to the embodiment of FIG. 14C, except that additional coupling is provided by a top metal member 3430 that extends across portions of the top peripheries 3116 and 3216 of the first and second coils 3100 and 3200, and a bottom metal member 3440 that extends across portions of the bottom peripheries 3118 and 3218 of the first and second coils 3100 and 3200. The distal regions 3432 and 3442 of the first and second metal members 3430 and 3440 are connected by one or more conductive wires 3452 adjacent the outer periphery 3112 of the first coil 3100. Likewise, the distal regions 3434 and 3444 of the first and second metal members 3430 and 3440 are connected by one or more conductive wires 3454 located adjacent the outer periphery 3212.

While the embodiments of FIGS. 14C and 14D use conductive wires to connect the sections of the metal member 3400 and thus form a conductive loop, other conductive elements may be used, such as one or more metal bands.

Figure 14E:
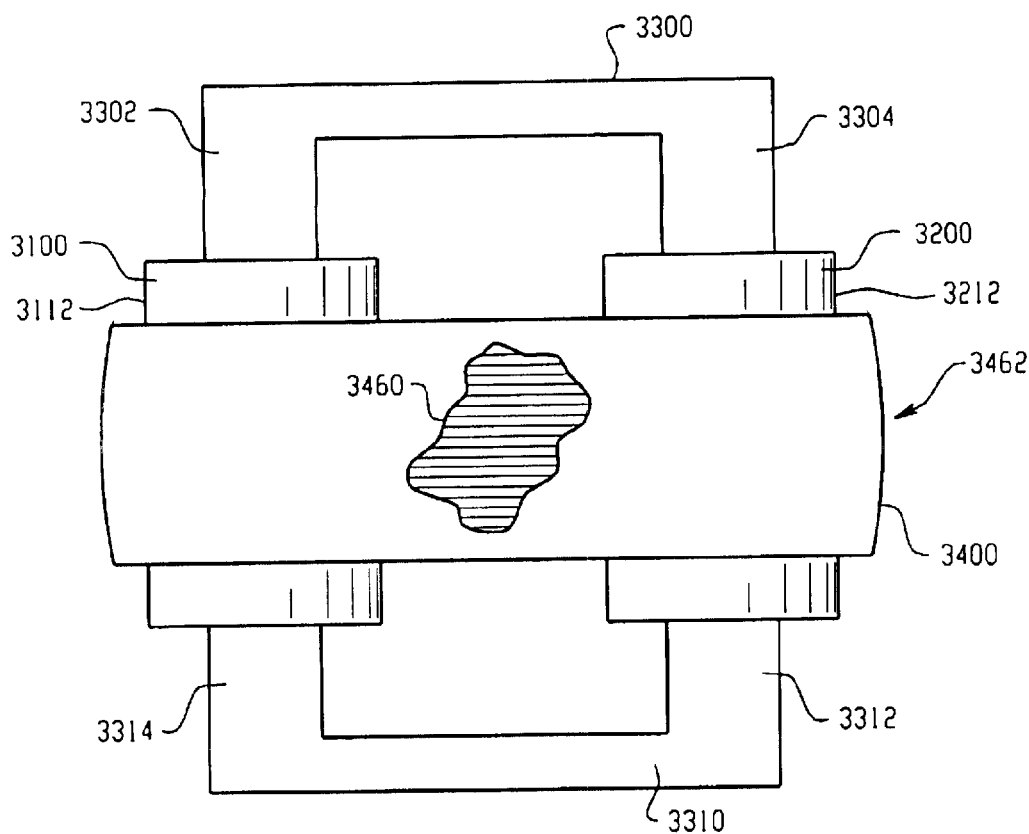
FIG. 14E is top view of another embodiment of an inductor device having adjusting coupling between first and second coils.

FIG. 14E provides a top view of another embodiment of an inductor device 3000 having adjustable coupling between a first coil 3100 and a second coil 3200. The embodiment of FIG. 14E is similar to the embodiment of FIG. 14A, except that the metal member 3400 comprises a plurality of shorted conductors 3460 extending around the outer peripheries 3112 and 3212 and portions of the top and bottom peripheries 3116, 3118, 3216 and 3218. The shorted conductors 3460 may be individually insulated. The shorted conductors 3460 may also be enclosed in an insulating material 3462 for added durability.

Figure 14F:
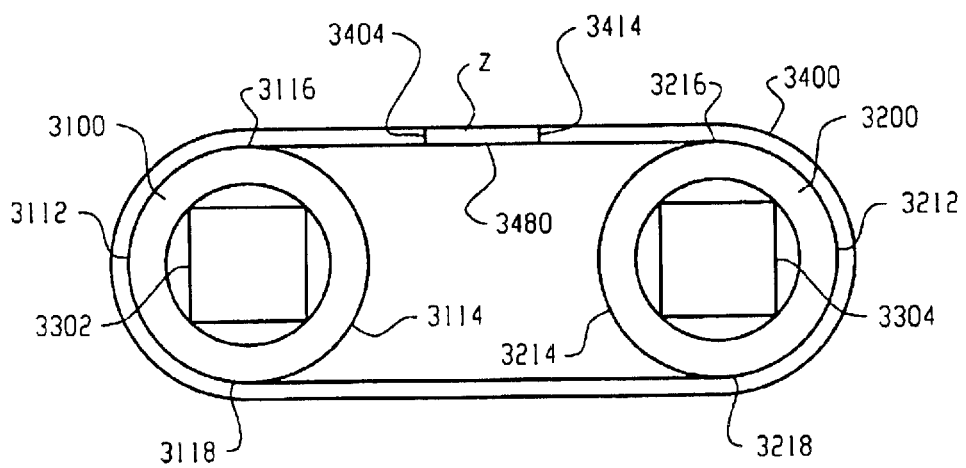
FIG. 14F is a cross section view of another embodiment of an inductor device having adjustable coupling between the first and second coils.

FIG. 14F is another embodiment of the inductor device 3000 having adjustable coupling between the first coil 3100 and the second coil 3200. The inductor device 3000 is substantially as described with respect to FIG. 14A, except that the metal member 3400 defines distal regions 3404 and 3414 between the top peripheries 3116 and 3216. An impedance element 3480 is connected between the distal regions 3404 and 3414. The impedance element may have a complex impedance of the form Z=R+jX. The complex impedance may be realized by know devices, including circuits comprising capacitors, inductors, and resistors.

Figure 15:
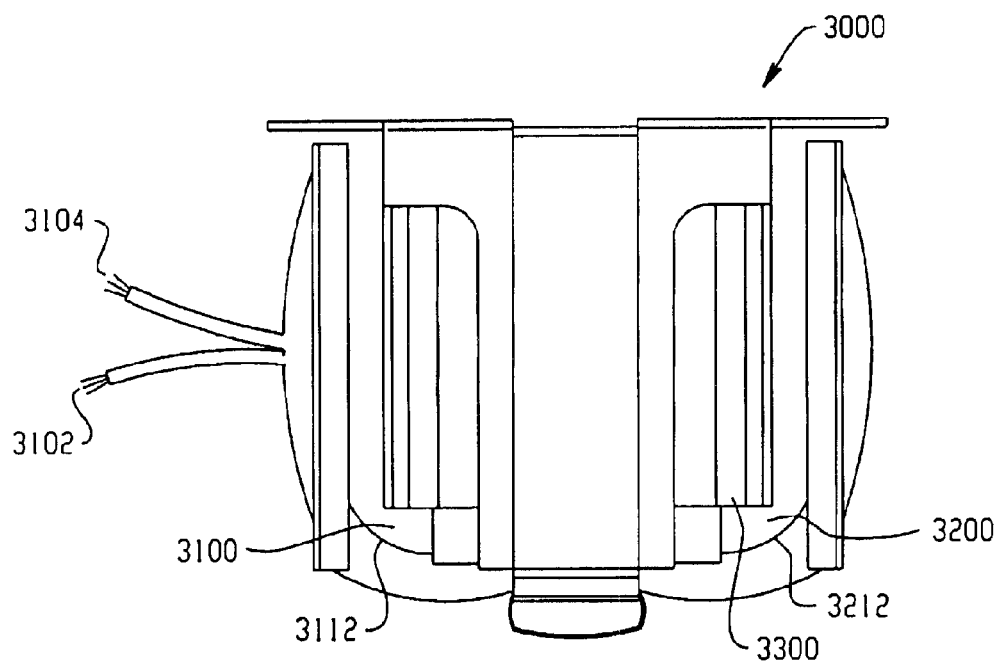
FIGS. 15-17 provides front, top and side views of an inductor device having adjustable coupling between first and second coils.
Figure 16:
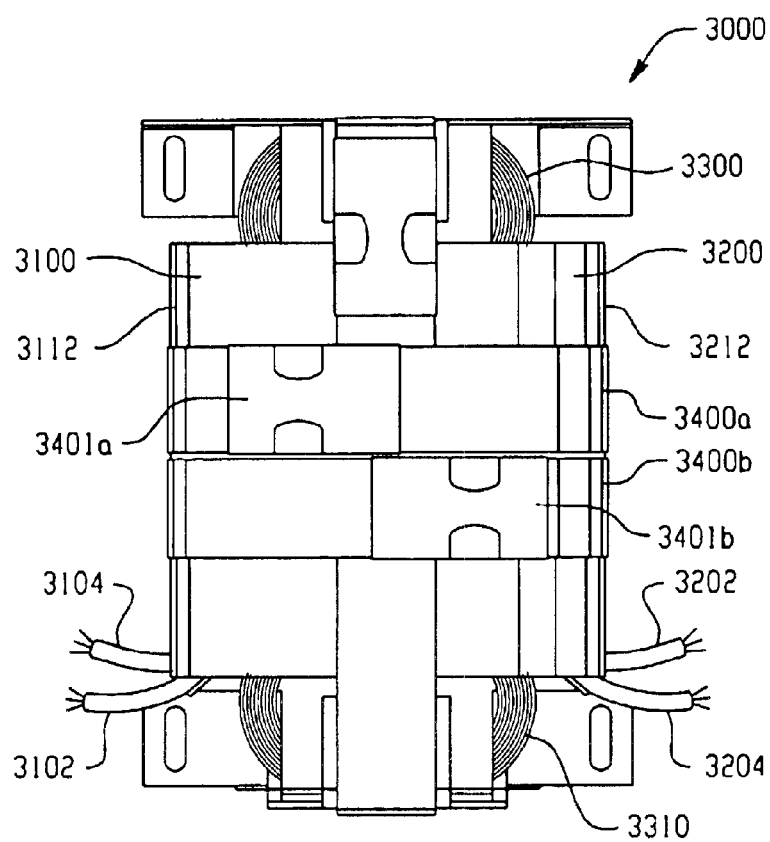
Figure 17:
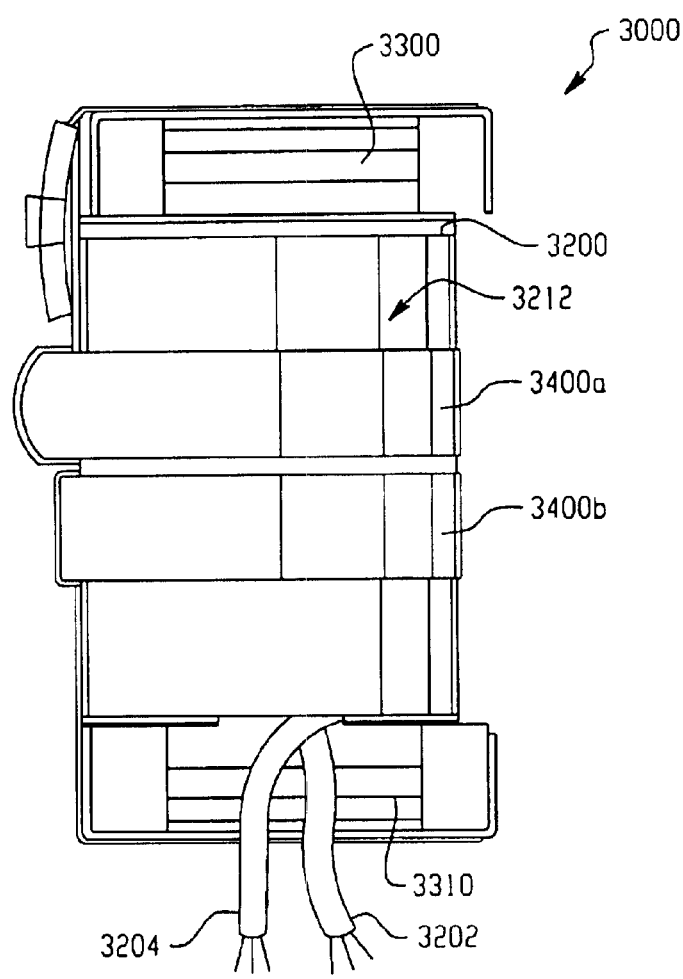

FIGS. 15, 16 and 17 provide front, top, and side views of an exemplary inductor device 3000 that is constructed in accordance with the principles of the previously described embodiments. In the embodiment shown in FIGS. 15, 16 and 17, a plurality of metal bands 3400a and 3400b extend around the first and second outer peripheries 3112 and 3212 of the first and second coils 3100 and 3200. The metal bands 3400a and 3400b comprise steel bands wrapped around the inductor device and clamped by clamps 3401a and 3401b, respectively. Inductive coupling between the first coil 3100 and the second coil 3200 can be increased by adding additional bands 3400, or can be decreased by removing one or both bands 3400a and 3400b. If additional metal bands 3400 are added to increase coupling, the metal bands 3400 may be added along the outer periphery 3112 and 3212 of the first and second coils, or may be added around the metal bands 3400a and 3400b to form layers of metal bands 3400.

In addition to manufacturing of coupled inductor devices according to the disclosed embodiments, it is to be appreciated that the coupling of an existing coupled inductor may be adjusted by the relatively easy task of adding one or more metal members 3400. Thus, the addition or removal of metal members 3400 provides for a quick and economical method and apparatus for adjusting the coupling between a first coil 3100 and a second coil 3200 of an inductor device. Accordingly, an inductor device having an initially loose coupling may be easily adjusted to have a moderate to tight coupling. This degree of coupling is preferable for circuits such as the split inductor power factor circuit correction circuit 2000 described above.

While the embodiments of FIGS. 13-17 include two C cores 3300 and 3310, it is to be appreciated that other core arrangements may also be used, such as a single C core, a toroidal core, or other such cores used in coupled inductors. The cores may be constructed of steel, powdered iron, iron, ferrite, or other known core materials having high permeability. Additionally, the cores may further comprise insulated laminations to reduce eddy current losses.

Figure 18A:
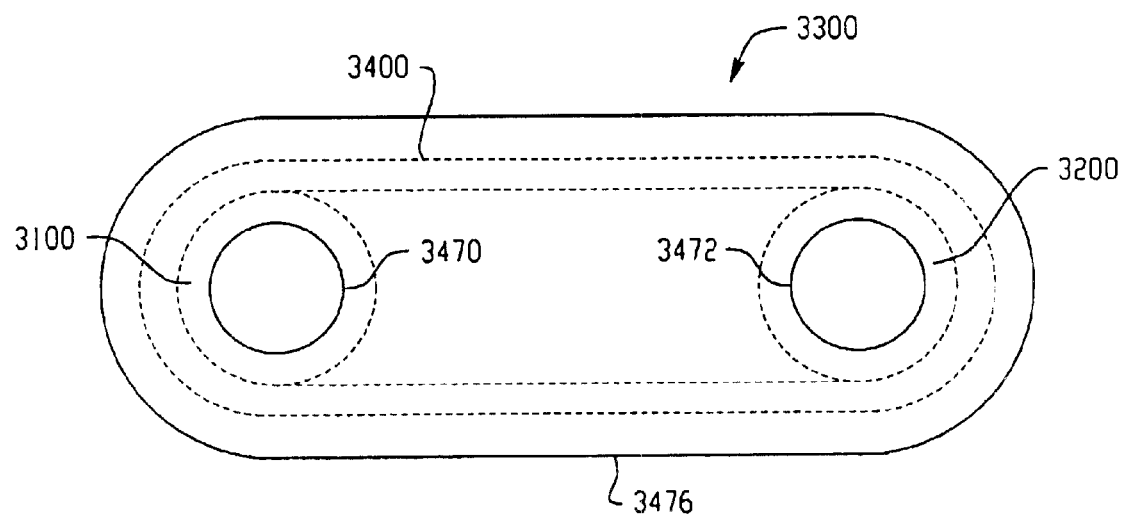
FIGS. 18A and 18B provide a front and top view of an inductor device with an air core and having adjustable coupling between first and second coils.
Figure 18B:
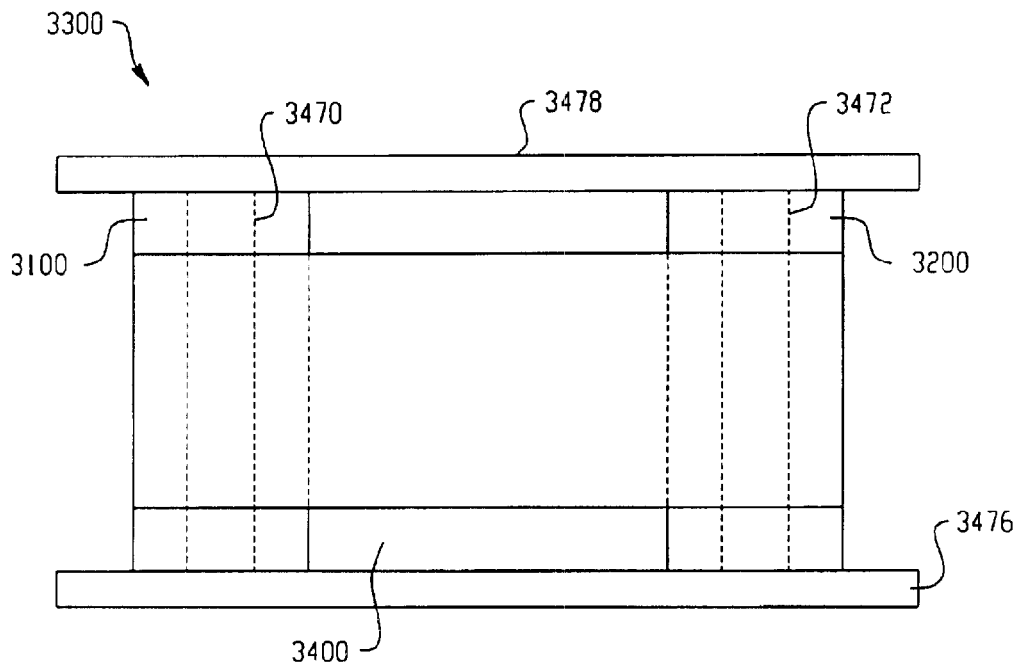

Alternatively, the core may be constructed from a material with very low permeability, such as plastic, or the core may be eliminated. FIGS. 18A and 18B provide front and top views of an inductor device 3000 with a standard air core and having adjustable coupling between the first and second coils 3100 and 3200. The first and second coils 3100 and 3200 are in parallel disposition and disposed on plastic tubular members 3470 and 3472, which are in turn supported by plastic side members 3476 and 3478. The first and second coils 3100 and 3200 are then essentially two standard air core inductors coupled only by their mutual inductance in air. Addition of a metal member 3400 increases the coupling between the first and second coils 3100 and 3200 as previously described.

Finally, while a metal member 3400 is preferred, it is to be appreciated that a synthetic member having a high permeability may also be used to increase coupling between the first coil 3100 and the second coil 3200. Illustratively, one such synthetic member is constructed from a ceramic ferrite material having a high electrical conductivity.

Figure 19:
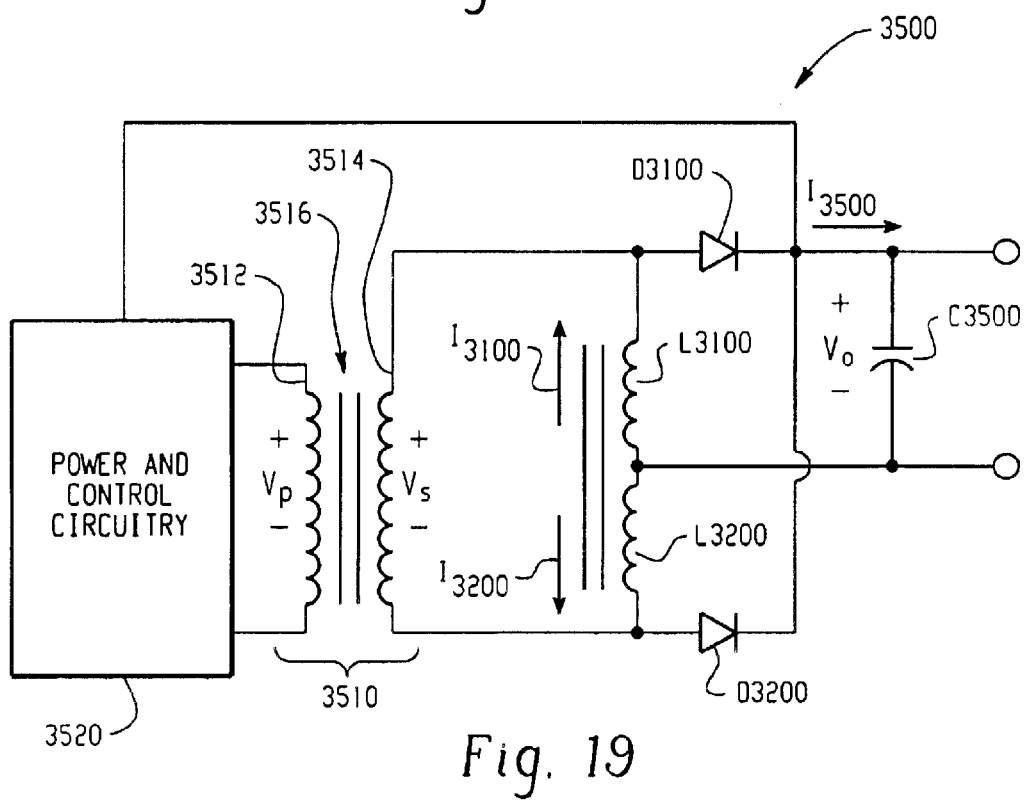
FIG. 19 is a schematic diagram of a current doubler with a coupled inductor.

Another application of the inductor device 3000 is in conjunction with a current doubler circuit 3500, as shown in FIG. 19. The current doubler circuit 3500 includes a transformer 3510 comprising a primary winding 3512 and a secondary winding 3514 wrapped around a transformer core 3516. The inductor device 3000 is connected across the secondary winding 3514, and is further connected to diodes D3100 and D3200, and to the output capacitor C3518. The power and control circuitry 3520 monitors the output of the current doubler circuit 3500 and switches the primary voltage $V_p$ to the transformer 3510 to maintain a desired output voltage $V_o$. The secondary voltage $V_s$ switches in response to the switching of the primary voltage $V_p$.

When $V_s$ is positive, D3100 is forward biased and D3200 is reversed biased. Thus, current $I_{3100}$ flows through D3100 and the output capacitor C3500, and current $I_{3200}$ flows through D3100, the output capacitor C3518, and the secondary winding 3514 of the transformer 3510. When $V_s$ is negative, D3100 is reversed biased and D3200 is forward biased. Thus, current $I_{3100}$ flows through D3200, the output capacitor C3518, and the secondary winding 3514 of the transformer 3510, and current $I_{3200}$ flows through D3200 and the output capacitor C3518. Thus, the output current $I_{3500}$ is the sum of the two currents $I_{3100}$ and $I_{3200}$ flowing through the first and second inductor coils 3100 and 3200, respectively.

The inductive device 3000 utilized in the current doubler circuit 3500 when the inductor coils are phased "bucking" provides for improved filtering of ripple on the output current $I_{3500}$ versus that achieved using individual inductors. When the inductor coils are phased "aiding" the inductive device 3000 reduces the AC inductive component of current supplied by the secondary winding 3514. Furthermore, the inductive device 3000 does not require sharing a common core with the transformer 3510 to realize this improvement.

The inductor device 3000 is also preferable for other power circuits, such as a multiple output power supply in which a core shares windings of inductors for the multiple outputs.

Inrush Limiting Circuit 4000

Figure 20B:
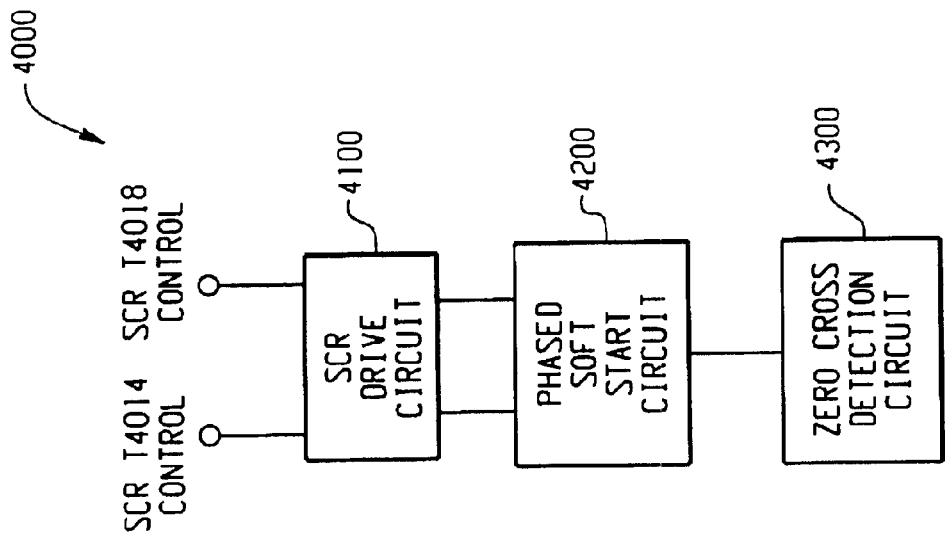
FIG. 20B is a block diagram of the inrush limiting circuit.
Figure 20A:
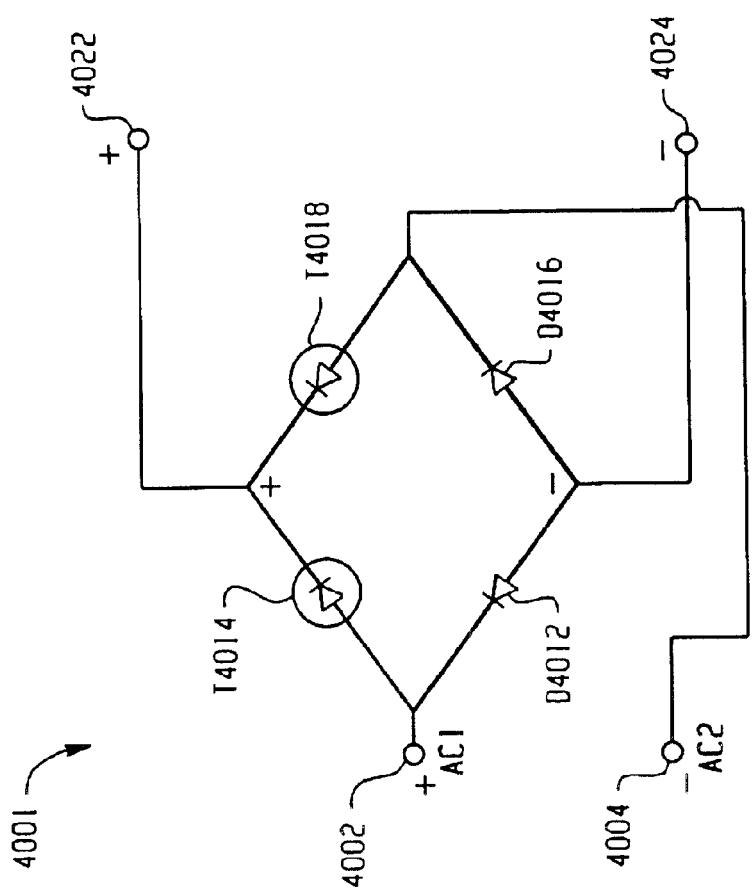
FIG. 20A is a schematic diagram of a bridge rectifier circuit used in an inrush limiting circuit.

An inrush limiting circuit 4000, as illustrated in FIGS. 20A and 20B, comprises a silicon controlled rectifier (SCR) bridge circuit 4001, an SCR drive circuit 4100, a phased soft start circuit 4200, and a zero cross detection circuit 4300.

The SCR bridge circuit 4001 comprises first and second input terminals 4002 and 4004 that receive an AC power source signal. The first input terminal 4002 is connected to a diode D4012 and an SCR device, illustratively an SCR T4014. The second input terminal is connected to the diode D4016 and SCR T4018. A first output terminal 4022 is connected to SCRs T4014 and T4018, and the second output terminal 4024 is connected to the diodes D4012 and D4016. The SCRs T4014 and T4018 are turned on and allowed to conduct by applying a short pulse to their gates when a positive voltage is applied across their anode and cathode. Each SCR T4014 and T4018 turns off when a reverse voltage is applied across its anode and cathode.

The time beginning after the voltage across the anode and cathode of an SCR goes positive and continuing until the SCR is turned on is referred to as the phase delay. Increasing the phase delay reduces the output voltage across the output terminals 4022 and 4024. By selectively decreasing the phase delay from a large phase delay during an initial loading of the SCR bridge circuit 4001, the inrush current associated with various electrical devices when power is first applied can be limited, thus preventing damage to the electrical devices and excessive inrush currents from the input power source.

The inrush limiting circuit 4000 controls the phase delay of the SCRs T4014 and T4018. The SCRs T4014 and T4018 are phase controlled during power up to limit the inrush current by introducing a large phase delay during initial loading, and gradually decreasing the phase delay until the SCRs T4014 and T4018 remain fully phased on during normal operation.

During normal steady state operation the SCR drive circuit 4100 provides gate signals for turning on SCRs T4014 and T4018 substantially at the time when the voltage across the anode and cathode of a particular SCR goes positive. When the SCR drive circuit 4100 is enabled, the SCRs T4014 and T4018 are fully conducting and maximum power is provided to the load or electrical device attached to output terminals 4022 and 4024.

The phased soft start circuit 4200 phases in the SCR drive circuit 4100 when a load or electrical device is coupled to output terminals 4022 and 4024. The SCR drive circuit 4100 is initially disabled when power is applied to the input terminals 4002 and 4004, and turned on after a large phase delay is provided for the SCRs T4014 and T4018. The phased soft start circuit 4200 phases in the SCR drive circuit 4100, steadily decreasing the phase delay until the phase delay is eliminated, at which time maximum power is provided to the load or electrical device coupled to output terminals 4022 and 4024.

The zero cross detection circuit 4300 monitors the AC input voltage applied to the input terminals 4002 and 4004 for a zero crossing event. At the occurrence of a zero crossing event, the zero cross detection circuit 4300 provides a zero cross signal to the phased soft start circuit 4200. The phased soft start circuit 4200 resets a phase delay signal upon receiving the zero cross signal, which in turn increases the instant phase delay of the SCRs T4014 and T4018.

Figure 21:
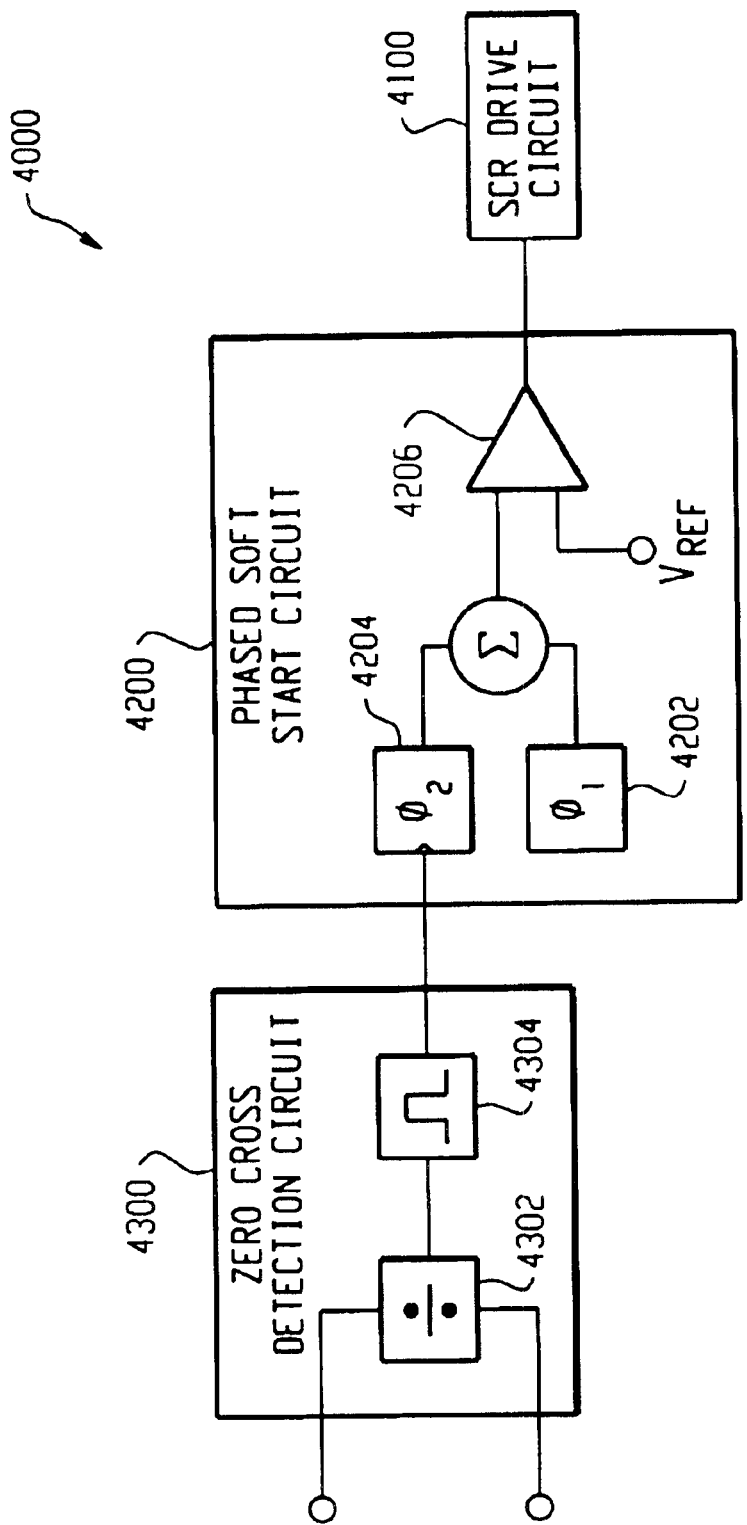
FIG. 21 is a more detailed block diagram of the inrush limiting circuit.

Shown in FIG. 21 is a more detailed block diagram of an exemplary embodiment of the inrush limiting circuit 4000. The zero cross detection circuit 4300 illustratively comprises a voltage divider 4302 and a pulse generator 4304. The voltage divider 4302 receives an AC power signal and outputs a proportional amount of the signal. The pulse generator 4304 monitors the voltage divider 4302 output and generates a pulse when the voltage divider 4302 output is at or near zero volts.

The phased soft start circuit illustratively comprises a first phase signal generator 4202 and a second phase signal generator 4204. The second phase signal generator 4202 is periodically reset with each zero crossing event detected by the zero cross detection circuit. The outputs of the first and second phase signal generators 4202 and 4204 are summed and a comparator 4206 compares the summed output signal to a reference value. Depending on the comparison, the SCR drive circuit 4300 is either enabled or disabled.

Figure 22A:
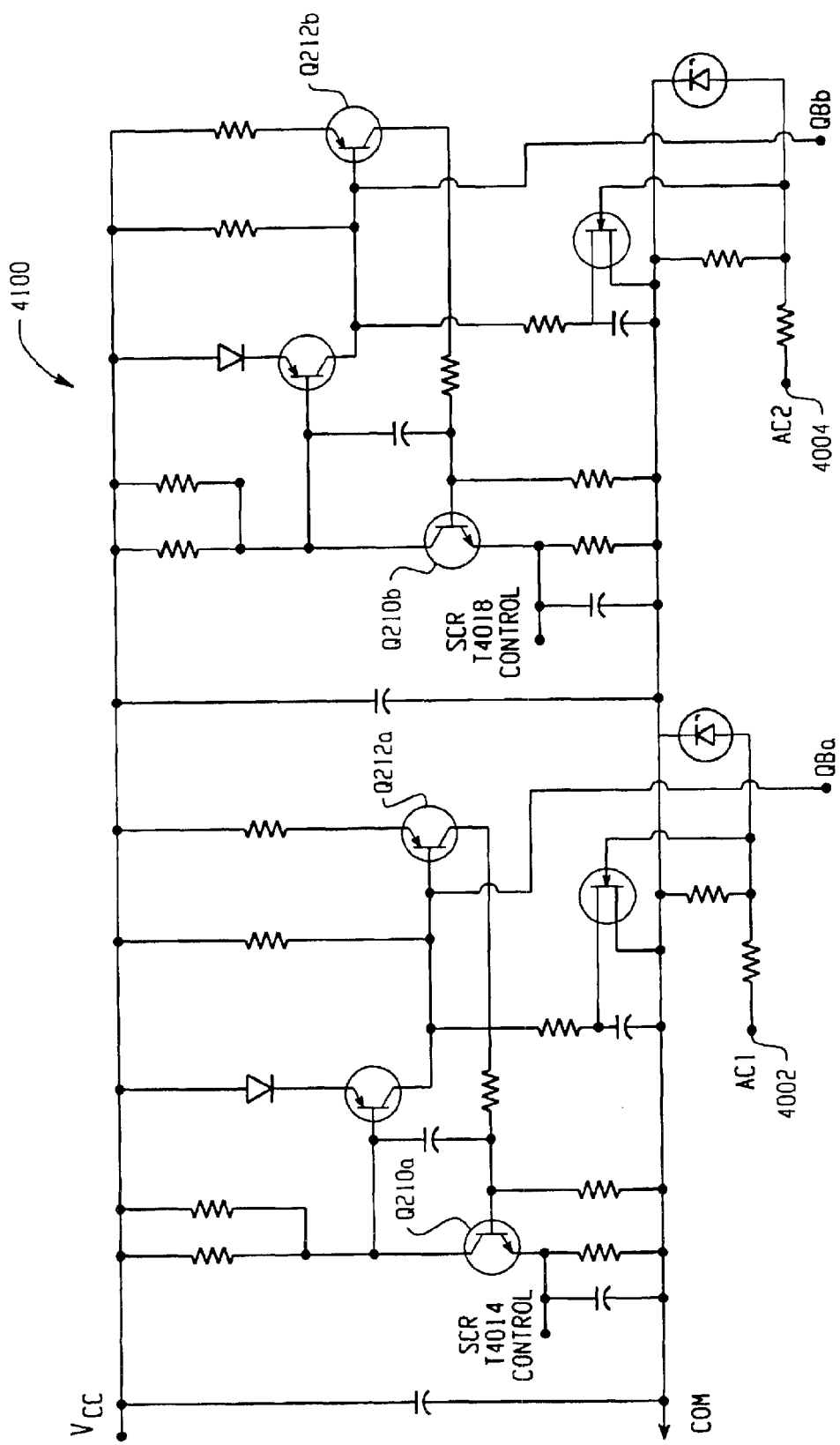
FIG. 22A is a schematic diagram of an SCR drive circuit.

Shown in FIG. 22A is a schematic diagram of a preferred SCR drive circuit 4100. Operation of the SCR drive circuit 4100 is explained in detail in U.S. Pat. No. 5,654,661, the disclosure of which is incorporated herein by reference, and to which the reader is referred to obtain a detailed understanding of the SCR drive circuit 4100. The SCRs T4014 and T4018 are driven with a current from the emitters of Q210a and Q210b, respectively. Added to the SCR drive circuit 4100 are leads QBa and QBb. Lead QBa is connected to the base of the PNP transistor Q212a, and lead QBb is connected to the base of PNP transistor Q212b. The phase soft start circuit 4200 inhibits operation of the SCR drive circuit 4100 by applying a voltage substantially equal to the supply voltage $V_{cc}$ to the bases of the PNP transistors Q212a and Q212b. The transistors Q212a and Q212b are thereby shut off. Accordingly, transistors Q210a and Q210b cannot provide gate signals to the SCRs T4014 and T4018.

Figure 22B:
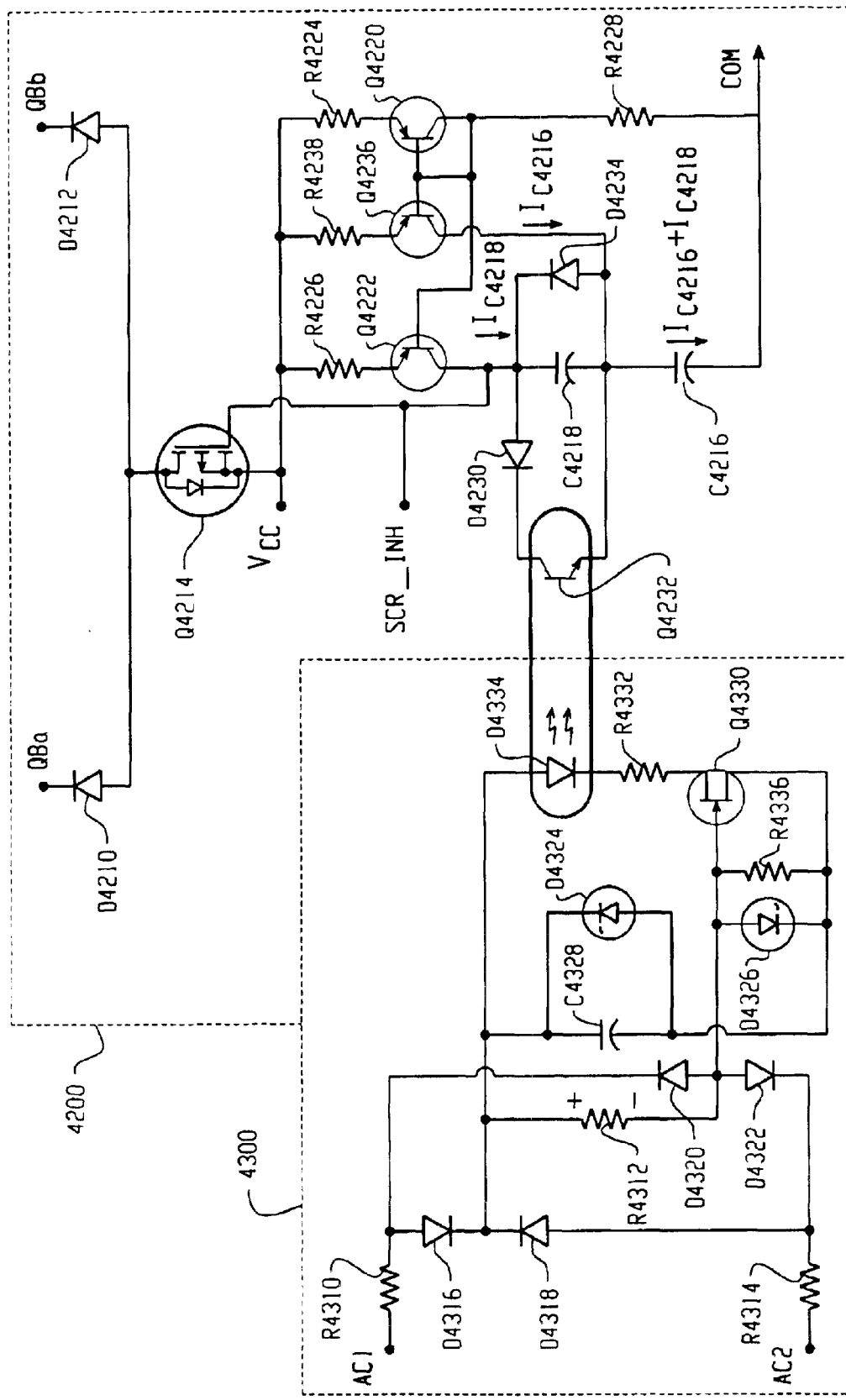
FIG. 22B is a schematic diagram of a phased soft start circuit and a zero cross detection circuit.

Shown in FIG. 22B is a schematic diagram of a preferred phased soft start circuit 4200 and the zero cross detection circuit 4300. Diodes D4210 and D4212 interface the phase control circuit 4200 to the gate drive circuit 4100.

The PMOS transistor Q4214 functions as a comparator. The source of the transistor Q4214 is at a voltage of $V_{cc}$, and the gate of the transistor Q4214 is at a voltage equal to the sum of the voltages across capacitors C4216 and C4218. Thus, when the sum of the voltages across the capacitors C4216 and C4218 and the gate threshold voltage of the Transistor Q42114 is less than $V_{cc}$ the transistor Q4214 turns on. When the transistor Q4214 is on, $V_{cc}$ is applied through the diodes D4210 and D4212 to the bases of the bases of the PNP transistors Q212$a$ and Q212$b$, and the SCR drive circuit 4100 is inhibited as described above. When the transistor Q4214 is off (i.e., the sum of the voltages across the capacitors C4216 and C4218 and the gate threshold voltage of the transistor Q4214 is equal to or greater than $V_{cc}$), the SCR drive circuit 4100 functions normally.

The voltages across the capacitors C4216 and C4218 provide first and second phase signals, respectively. The voltage across the capacitor C4218 is a periodic waveform that is reset at each zero crossing event, and is produced by injecting a first current $I_{C4218}$ into the capacitor C4218. The first current $I_{C4218}$ is provided from a current mirror formed by PNP transistors Q4220 and Q4222, and resistors R4224, R4226 and R4228. The resistor R4228 primarily determines the current value of the first current $I_{C4218}$ flowing from the collector of transistor Q4222. The magnitude of the first current $I_{C4218}$ is preferably higher than the leakage current of the capacitor C4218.

A diode D4230 connects the collector of transistor Q4222 to the collector of a phototransistor Q4232. When the phototransistor Q4232 is off, the current $I_{C4218}$ must flow through the capacitor C4218, as it is blocked by a diode D4234. When a zero crossing event occurs, the phototransistor Q4232 is turned on and the capacitor C4218 discharges, thus reducing its voltage. When the phototransistor Q4232 turns off, the voltage across the capacitor C4218 begins to increase.

The voltage across the capacitor C4216 is a steadily rising ramp voltage produced by the injection of the first current $I_{C4218}$ and a second current $I_{C4216}$. The second current $I_{C4216}$ is provided from a current mirror formed by PNP transistors Q4220 and Q4236, and resistors R4224, R4228, and R4238. The resistor R4228 primarily determines the current value of the second current $I_{C4216}$ flowing from the collector of transistor Q4236. The magnitude of the sum of the first current $I_{C4218}$ and the second current $I_{C4216}$ is preferably higher than the leakage current of the capacitor C4216.

Because the first and second currents $I_{C4218}$ and $I_{C4216}$ are dependent on $V_{cc}$, and because the sum of the voltages across the capacitors C4216 and C4218 is essentially compared to $V_{cc}$, performance of the phased soft start circuit 4200 and phase-in the SCR drive circuit 4100 is independent of the value of $V_{cc}$.

An inhibit signal, SCR_INH, may also be applied to the gate of the transistor Q4214 to inhibit the SCR drive circuit 4100. A control circuit may be configured to monitor the load or electrical device attached to the output terminals 4022 and 4024 and apply the inhibit signal SCR_INH if a high inrush current or over-voltage condition is detected.

As previously described, when the phototransistor Q4232 is turned on at the detection of a zero crossing event by the zero cross detection circuit 4300, the voltage across the capacitor C4218 is reset to an initial value and begins to increase as the capacitor begins recharging. The zero crossing detection circuit 4300 monitors the AC power signal through a voltage divider network comprising resistors R4310, R4312 and R4314. The resistor R4312 is a load resistor of a full wave rectifier comprising diodes D4316, D4318, D4320, and D4322. Thus, the voltage across the resistor R4312 is a full wave rectified voltage that is proportional to the AC power signal. Accordingly, when the voltage across the resistor R4312 is at zero volts, a zero crossing event has occurred in the AC power signal.

The voltage across the resistor R4312 is applied to the zener diodes D4324 and D4326. A capacitor C4328 is connected in parallel with the zener diode D4324, which in turn has its cathode connected to the drain of a JFET transistor Q4330 through a resistor R4332 and LED D4334. Additionally, the anode of the zener diode is connected to the source of the transistor Q4330. Thus, when the transistor Q4330 is off, current flow from the drain to the source is inhibited and the capacitor C4328 charges up to the zener voltage of the diode D4324. When the transistor Q4330 is on, the capacitor C4328 discharges through the resistor R4332 and LED 4324. Accordingly, the LED turns on the phototransistor Q4232 and the voltage across the capacitor C4218 is reset.

The zero cross detection circuit 4300 is also self powered from the voltage divider formed by resistors R4310, R4312 and R4314. Thus, a separate supply voltage is not needed for the zero cross detection circuit 4300.

A zero crossing event is detected as follows. When the voltage across the resistor R4312 is larger than a threshold voltage set by the sum of the voltage across zener diode D4324 and the threshold voltage of JFET transistor Q4330, the transistor is off and no current will flow between the drain and source. The gate of the transistor Q4330 will be reverse biased and protected by the zener diode D4326. When the voltage across the resistor R4312 is smaller than the threshold voltage set by the sum of the voltage across zener diode D4324 and the threshold voltage of JFET transistor Q4330, the transistor Q4330 turns on and begins conducting current from the capacitor C4328 through the LED D4334. The phototransistor Q4232 is thereby activated, and the voltage across the capacitor C4218 is reset.

In the illustrative embodiment of FIG. 22B, the zero cross detection circuit 4300 is configured to activate the JFET transistor Q4330, and thereby activate the phototransistor Q4232, prior to the voltage across the resistor R4312 actually reaching zero volts. Thus, the capacitor C4328 discharges slightly before the AC power signal actually reaches zero volts. By slightly anticipating the zero crossing event, the SCR drive circuit 4100 is inhibited so as to prevent an SCR gate drive signal from being present during or after the actual zero crossing of the AC power signal.

Accordingly, the zero crossing detection circuit 4300 may be configured to have a zero crossing window. The size of the zero crossing window is dependent on the zener voltage of the zener diode D4324, the dividing ratio of the voltage divider formed by resistors R4310, R4312, and R4313, and by the particular transistor Q4330. Design criteria may also include the propagation delay in the zero cross detection circuit 4300, the phased soft start circuit 4200, and the SCR drive circuit 4100. Of course, the zero crossing window may be eliminated, and the inrush limiting circuit may rely solely on line commutation of the SCRs T4014 and T4018.

From the foregoing description, it is now understood that the transistor Q4214 is initially on when the inrush limiting circuit 4000 is activated, thus inhibiting the SCR drive circuit 4100. The sum of the voltages across the capacitors C4216 and C4218 is compared to a $V_{cc}$ and the threshold voltage of the transistor Q4214. If the summed voltage across the capacitors C4216 and C4218 exceeds $V_{cc}$ minus the threshold voltage of the transistor Q4214, the transistor Q4214 is off and the SCR drive circuit 4100 functions normally.

The voltage across the capacitor C4216 steadily rises to approximately $V_{cc}$, at which time transistor Q4214 is fully off and the SCR drive circuit functions normally. While the voltage across the capacitor C4216 is rising, however, the voltage across the capacitor C4218 is periodically rising and reset at each zero crossing event. Accordingly, the transistor Q4214 switches from an on state to an off state when the summed voltage across the capacitors C4216 and C4218 exceeds $V_{cc}$ minus the threshold voltage. When the voltage across the capacitor C4218 is reset, the transistor Q4214 switches from an off state back to an on state, inhibiting the SCR drive circuit 4100. As time progresses, the duration of the off state compared to the on state of the transistor Q4214 increases, until the transistor Q4214 is fully off. Thus, the SCR drive circuit 4100 is phased in, and the inrush current associated with a load or electrical device is thereby limited.

By choosing the charging rate of the capacitors C4216 and C4218, the phase-in of the SCR drive circuit may be adjusted accordingly. The charge rate may be changed by adjusting the values of the capacitor C4216 and C4218, and also by adjusting the value of the resistors R4224, R4226, R4228, and R4238. In particular, R4228 may be made a variable resistor. Furthermore, by lengthening or decreasing the detection window of the zero cross detection circuit 4300 as described above, the phase-in of the SCR drive circuit 4100 may be further adjusted.

Series Connected Full Bridge Circuit 5000

Figure 23:
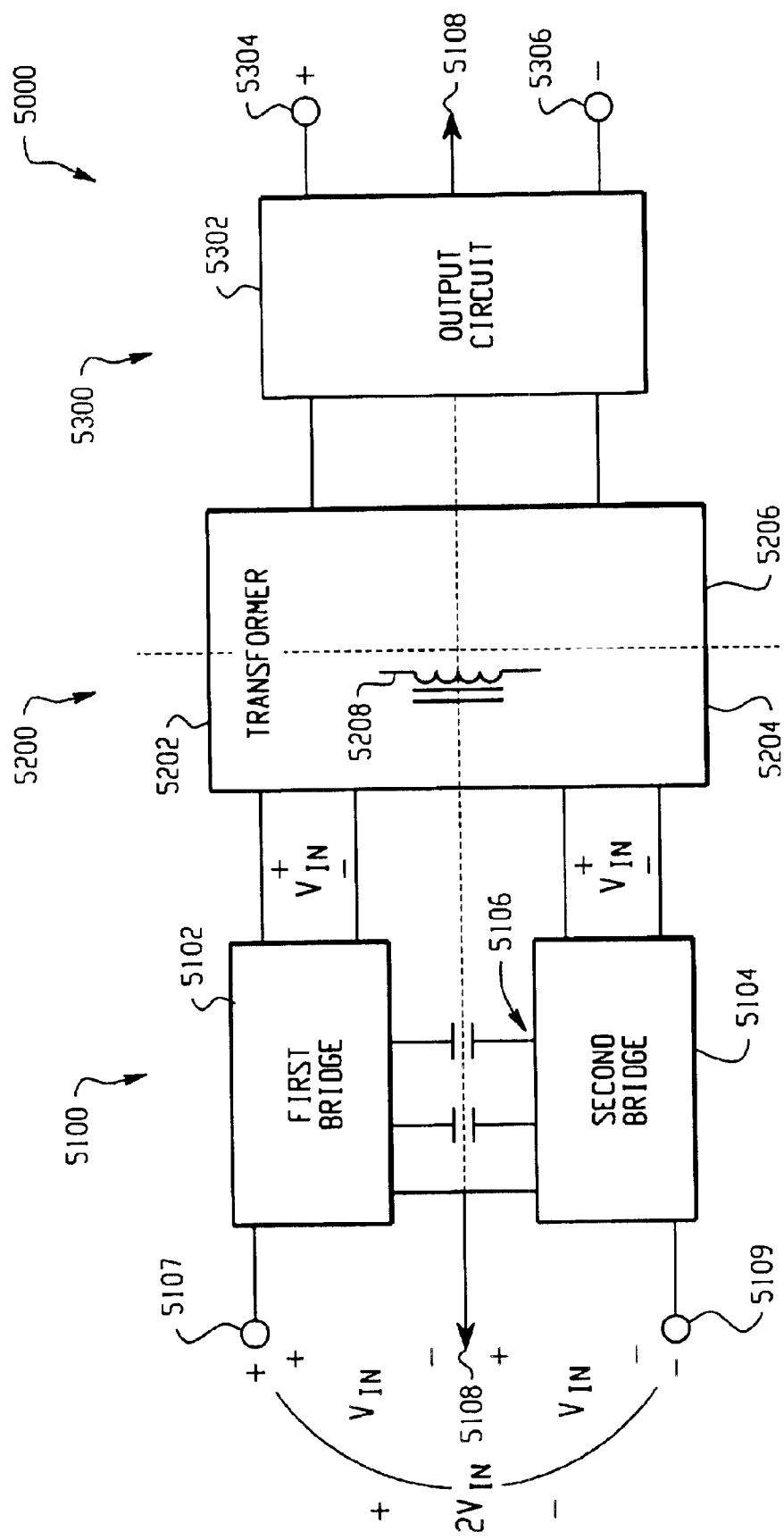
FIG. 23 is a block diagram of series connected full bridge circuit.

FIG. 23 provides a block diagram of a preferred series connected full bridge circuit 5000. The series connected full bridge circuit 5000 comprises an input stage 5100, a transformer stage 5200, and an output stage 5300.

The series connect full bridge circuit 5000 provides for resonant power conversion for soft switching. The input stage 5100 includes a first bridge circuit 5102 and a second bridge circuit 5104, each of which comprise a plurality of switching elements that are AC coupled by capacitors 5106. The first and second bridge circuits 5104 and 5106 are symmetric about a bank node 5108. Input terminals 5107 and 5109 receive a DC input voltage wherein the first and second bridge circuits 5104 and 5106 cause the bank node 5108 to be at a potential that is midway between the potentials at the input terminals 5107 and 5109. Thus, the DC voltage measured from terminal 5107 to the bank node 5108 is substantially equal to the DC voltage measured from the bank node 5108 to terminal 5109.

The output of the first bridge circuit 5102 is provided to a first primary winding 5202 of the transformer 5200, and the output of the second bridge circuit is provided to a second primary winding 5204 of the transformer 5200. The first and second primary windings 5202 and 5204 of the transformer are coupled by a coupled inductor 5208. The coupled inductor 5208 may be connected either on the primary side or the secondary side of the transformer 5200. The output of the transformer 5200 is center tapped and provided to the output circuit 5302. A DC output voltage is provided across the output terminals 5304 and 5306.

Figure 24:
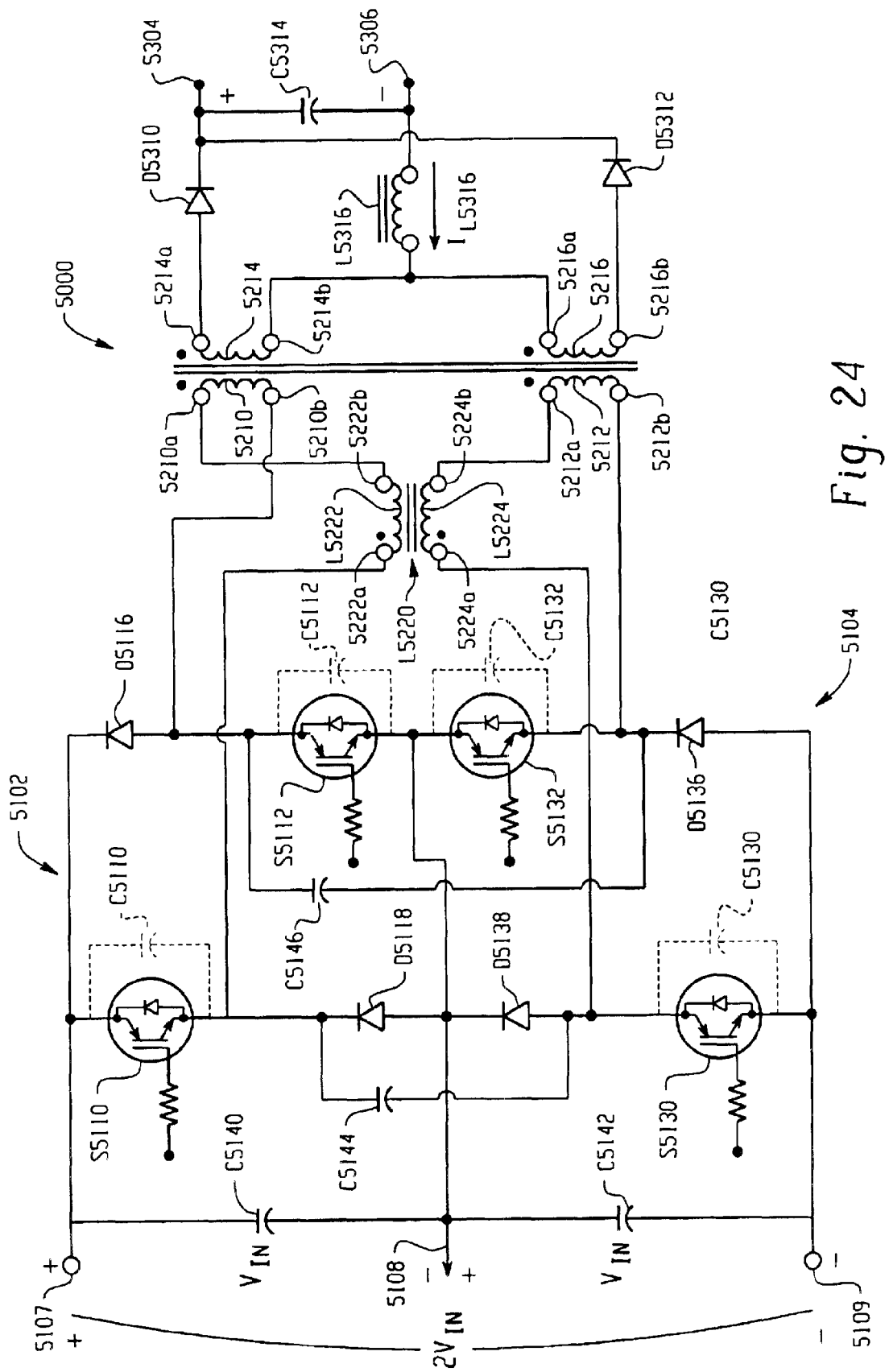
FIG. 24 is a schematic diagram of an embodiment of the series connected full bridge circuit of FIG. 23.

FIG. 24 provides a schematic diagram of a first embodiment of the series connect split full bridge circuit 5000. The first bridge circuit 5102 comprises a first switch S5110 and a second switch S5112. A diode D5116 connects the input terminal 5107 and the collector of the switch S5110 to a second terminal 5210b of the first primary winding 5210. The second terminal 5210b is also directly connected to the collector of the second switch S5112. The emitter of the switch S5112 is connected to the bank node 5108, and the emitter of the first switch S5110 is connected to the bank node 5108 through diode D5118. Furthermore, the emitter of the first switch S5110 is also connected to the first terminal 5210a of the first primary winding 5210 through a first winding L5222 of a coupled inductor L5220. When the switches S5110 and S5112 are closed, an input voltage $V_{IN}$ is applied across the terminals 5210a to 5210b of the first primary winding 5210.

The second bridge circuit 5104 is symmetric about the bank node 5108 to the first bridge circuit 5102. The second bridge circuit 5104 comprises a third switch S5130 and a fourth switch S5132. A diode D5136 connects the input terminal 5109 and the emitter of the third switch S5130 to a second terminal 5212b of the second primary winding 5212. The second terminal 5212b is also directly connected to the emitter of the fourth switch S5132. The collector of the switch S5132 is connected to the bank node 5108, and the collector of the third switch S5130 is connected to the bank node 5108 through diode D5138.

Furthermore, the collector of the third switch S5130 is also connected to the first terminal 5212a of the second primary winding 5212 through a second winding L5224 of the coupled inductor L5220. When the switches S5130 and S5132 are closed, an input voltage $V_{IN}$ is applied across the terminals 5212b to 5212a of the second primary winding 5210.

The input capacitors C5140 and C5142 couple the bank node 5108 to the input terminals 5107 and 5109, respectively. The DC input voltage applied across the terminals 5107 and 5109 is evenly divided across the input capacitors C5140 and C5142. The input capacitors C5140 and C5142 are sufficiently large so that the DC voltage components do not appreciably change during a transition of the switches S5110, S5112, S5130 and S5132.

A first coupling capacitor C5144 bypasses the diodes D5118 and D5138 and provides AC coupling of the emitter of the first switch S5110 to the collector of the third switch S5130. Likewise, a second coupling capacitor C5146 provides AC coupling of the collector of the second switch S5112 to the emitter of the third switch S5132. The coupling capacitors C5144 and C5146 provide for tight AC coupling between the switches S5110, S5112, S5130 and S5132 that occurs naturally in a conventional full bridge converter. The coupling capacitor C5144 is coupled to the first terminals 5210a and 5212a through the coupled inductor L5220, and thus is charged to a DC voltage substantially equal to $V_{IN}$. Similarly, the coupling capacitor C5146 is coupled to the second terminal 5210b and 5212b, and thus is charged to a DC voltage substantially equal to $V_{IN}$. Preferably the coupling capacitors C5144 and C5146 have capacitances that are greater than the capacitance of the switches S5110, S5112, S5130 and S5132 so that the DC voltage component of the coupling capacitors C5144 and C5146 does not appreciably change during transition of the switches S5110, S5112, S5130 and S5132. The DC blocking of the capacitors C5144 and C5146 thus enables the switches to be split in separate bridges across the first and second primary windings 5210 and 5212, and the AC coupling allows the switches to function as if they were directly connected in a full bridge.

The output circuit 5302 illustratively comprises diodes D5310 and D5312, an output capacitor C5314 and an output inductor L5316 configured as a buck converter output stage while a buck converter output stage is shown, other converter stages may be used, such as in boost converter stage. The first terminal 5214 of a first secondary winding 5214 is connected to the output terminal 5304 and the output capacitor C5314 through the diode D5310, and a second terminal 5216b of a second secondary winding 5216 is connected to the output terminal 5304 and the output capacitor C5314 through the diode D5312. The second terminal 5214b of the first secondary winding 5214 is connected to the first terminal 5216a of the second secondary winding 5216. The output terminal 5306 is connected to the second terminal 5214b and the first terminal 5216a through the output inductor L5316.

Thus, when the switches S5110 and S5112 are closed and the switches S5130 and S5132 are open, the diode D5310 is forward biased and current flows from the first terminal 5214a, through the diode D5310, through the output load and capacitor C5314, and returns through the inductor L5316. D5312 is reversed biased and does not conduct. Likewise, when the switches S5130 and S5132 are closed, diode D5312 is forward biased and current flows from the second terminal 5216b, through the diode D5312, through the output load and capacitor C5314, and returns through the inductor L5316. D5310 is reversed biased and does not conduct. Therefore, current flow alternates between the two primary windings 5210 and 5212, with current flowing in one of the primaries each half cycle.

While the switches S5110, S5112, S5130 and S5132 are illustratively IGBT devices coupled to base resistors, alternative switches may be realized by using MOSFETs, BJTs, or other switching devices. It is to be understood that the operation of the series connected full bridge circuit 5000 takes into account the inherent parasitic capacitance of the particular device used to realize the switches S5110, S5112, S5130, and S5132. Accordingly, each switch S5110, S5112, S5130, and S5132 is thus bypassed by the inherent capacitance of the device used to realized the switch. Furthermore, depending on the capacitance of the switching devices used, separate bypass capacitors may also be added across the switches to increase ZVS performance. The phantom capacitors C5110, C5112, C5130, and C5132 in FIGS. 24-26 are thus to be understood to represent either the inherent parasitic capacitance of their corresponding switches, or to represent separate parallel capacitors.

An exemplary controller for the switches S5110, S5112, S5130 and S5132 is a UC3879 Phase-Shifted PWM Controller manufactured by Unitrode Corporation/Texas Instruments. The UC3879 integrated circuit provides control, decoding, protection and drive functions for operation of a DC/DC converter with phase-shifted control. During operation of the series connected split full bridge circuit 5000, the switches S5110, S5112, S5130 and S5132 are switched on and off according to the following transition table:

| Switch State | Switch S5110 Status | Switch S5112 Status | Switch S5130 Status | Switch S5132 Status |
|---|---|---|---|---|
| 1 | ON | ON | OFF | OFF |
| 2 | OFF | ON | OFF | OFF |
| 3 | OFF | ON | ON | OFF |
| 4 | OFF | OFF | ON | OFF |
| 5 | OFF | OFF | ON | ON |
| 6 | OFF | OFF | OFF | ON |
| 7 | ON | OFF | OFF | ON |
| 8 | ON | OFF | OFF | OFF |
| 9 | ON | ON | OFF | OFF |

FIGS. 25A-25E provide the equivalent circuit diagram for the circuit of FIG. 24 when the switches are in the Switch States 1–5, respectively.

Figure 25A:
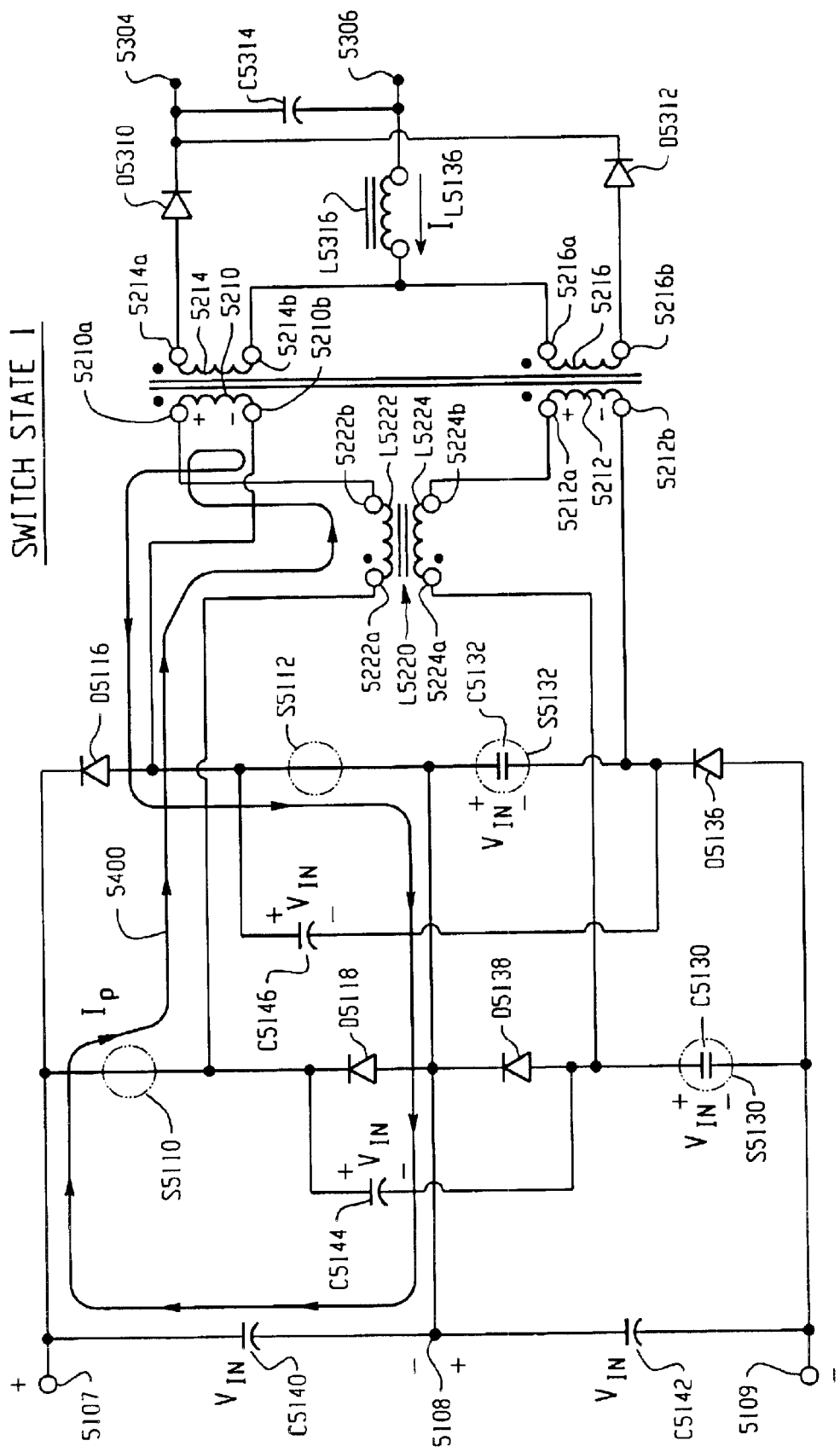
FIG. 25A is a schematic diagram of the series connected full bridge circuit during a first switch state.
Figure 26:
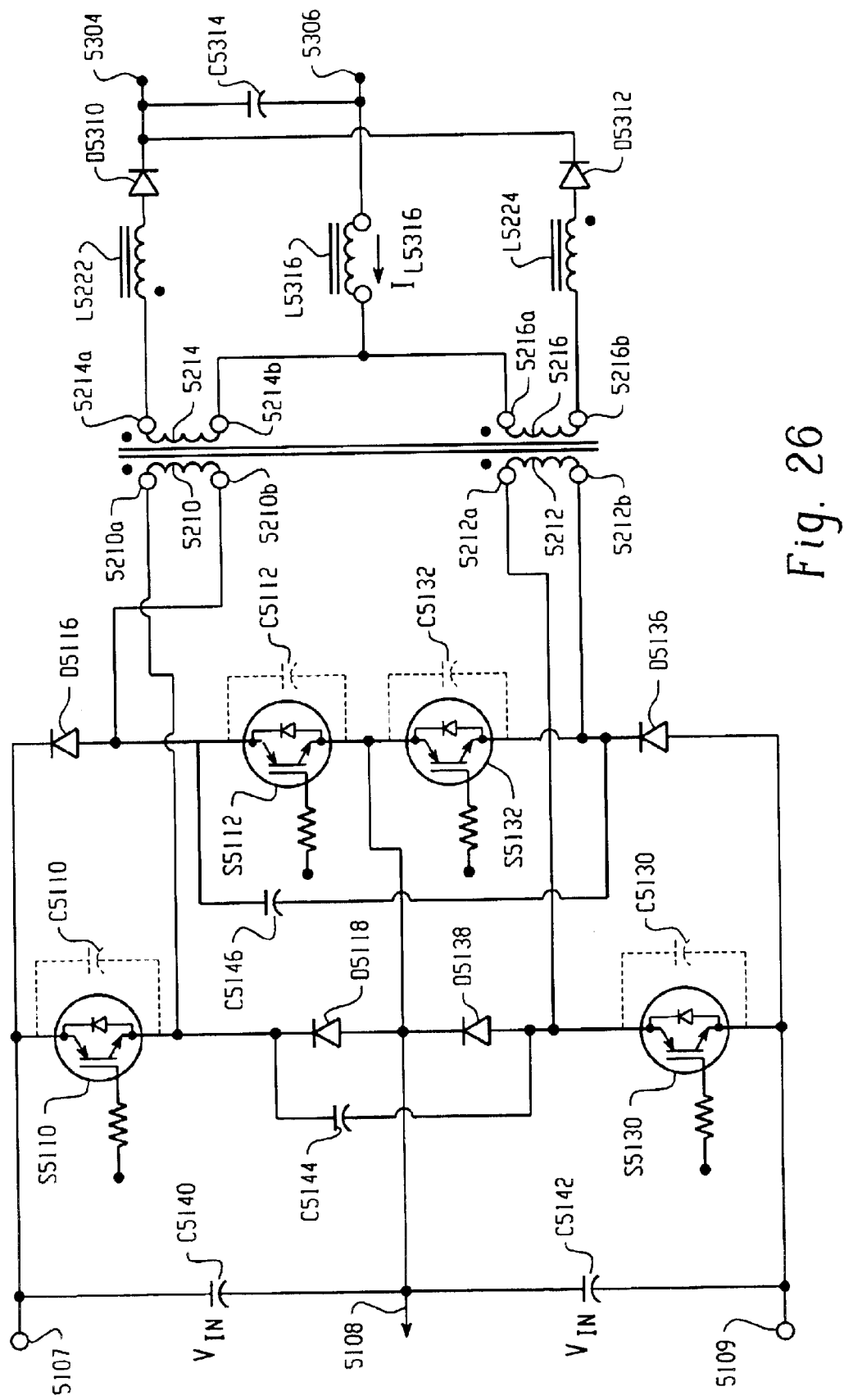
FIG. 26 is a schematic diagram of another embodiment of the series connected full bridge circuit of FIG. 23.

During Switch State 1, shown in FIG. 25A, switches S5110 and S5112 are closed, and an voltage of $V_{IN}$ is applied across the first primary winding terminals 5210a and 5210b. Accordingly, an equal voltage is forced across the primaries 5212a and 5212b, as the primary windings 5210 and 5212 share the same transformer core. A current $I_p$ flowing through the first primary winding 5210 conducts through the path 5400 as shown. Because the switches S5130 and S5132 are open, very little current flows through the second bridge 5140, and the capacitors C5130 and C5132 are each charged to a magnitude of approximately $V_{IN}$. Thus, the voltages on the first and second bridges 5102 and 5104 match as in a conventional full bridge converter.

Figure 25B:
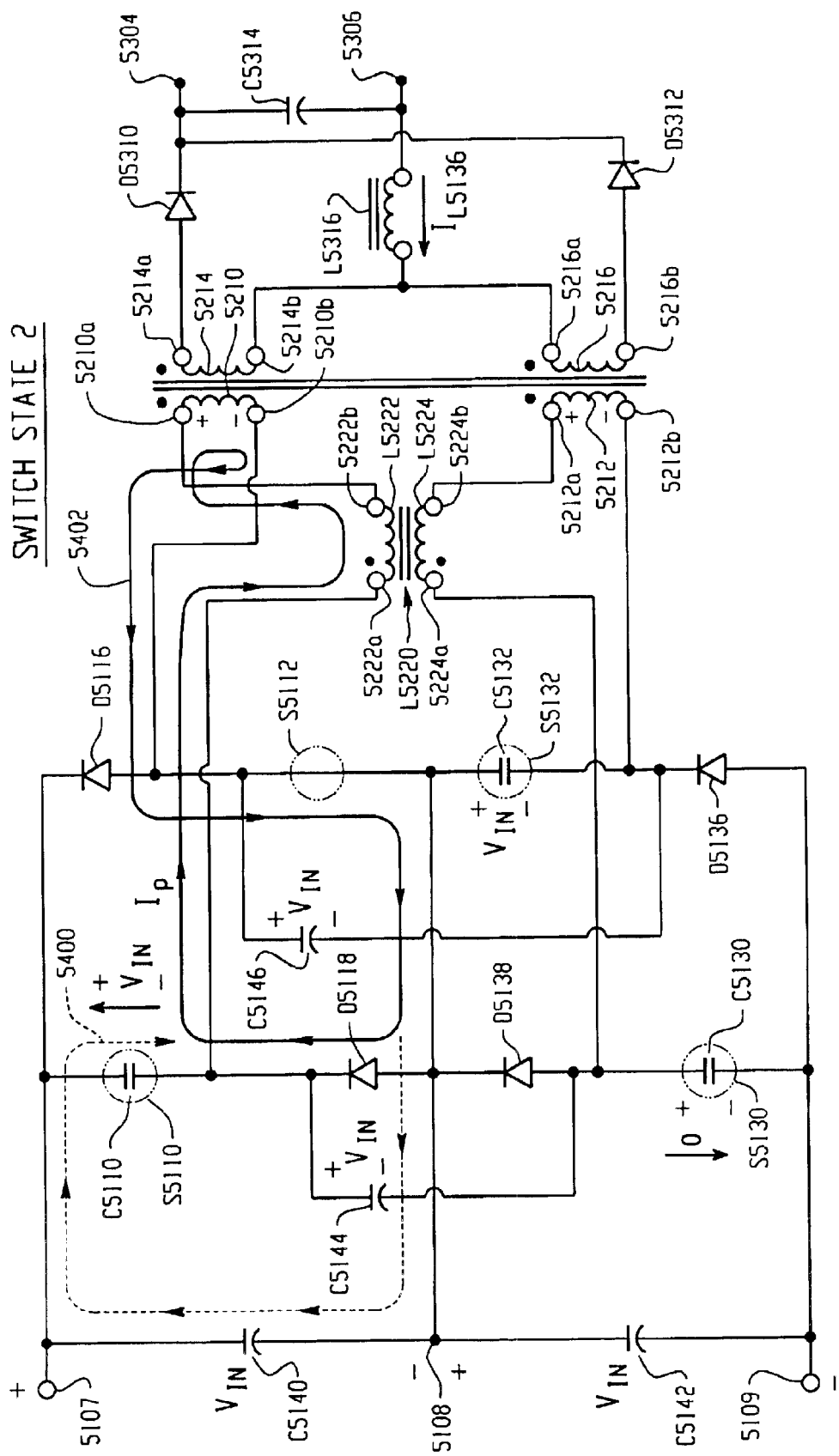
FIG. 25B is a schematic diagram of the series connected full bridge circuit during a second switch state.
Figure 25C:
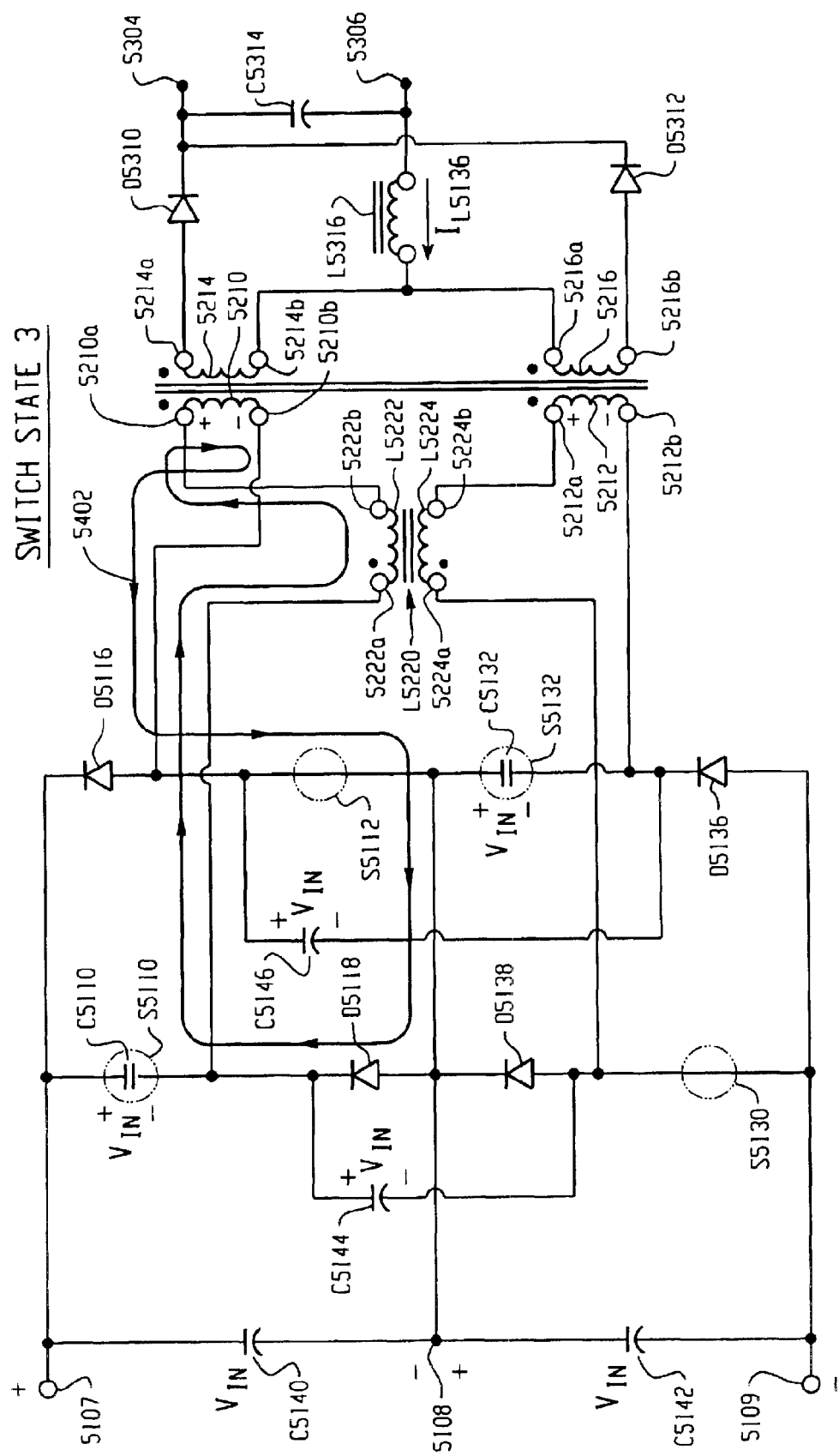
FIG. 25C is a schematic diagram of the series connected full bridge circuit during a third switch state.

During the transition to Switch State 2, as shown in FIG. 25B, S5110 is turned off, and the voltage across the primary terminals 5210a and 5210b rapidly collapses to zero. Likewise, the voltage across the primary terminals 5212a and 5212b also collapses to zero. The output inductor L5316 provides energy to the output load through the current $I_{L5316}$. The current $I_{L5316}$ decreases as the inductor L5316 continues to provide power to the output load. As the current $I_{L5316}$ freewheels through diode D5310, the primary current $I_p$ is induced in the primary winding 5210. However, as the voltage across the primary winding 5210 collapses, the current $I_p$ charges the capacitor C5110 up to a voltage of $V_{IN}$. This causes the voltage across the capacitor C5130 to discharge to zero volts. Once the voltage across the open switch S5110 is at $V_{IN}$, the current $I_p$ conducts through the diode D5118 and through the path 5402 as shown. The switch S5130 is then turned on when the voltage across the capacitor C5130 is at zero volts, resulting in the equivalent circuit of FIG. 25C.

Figure 25D:
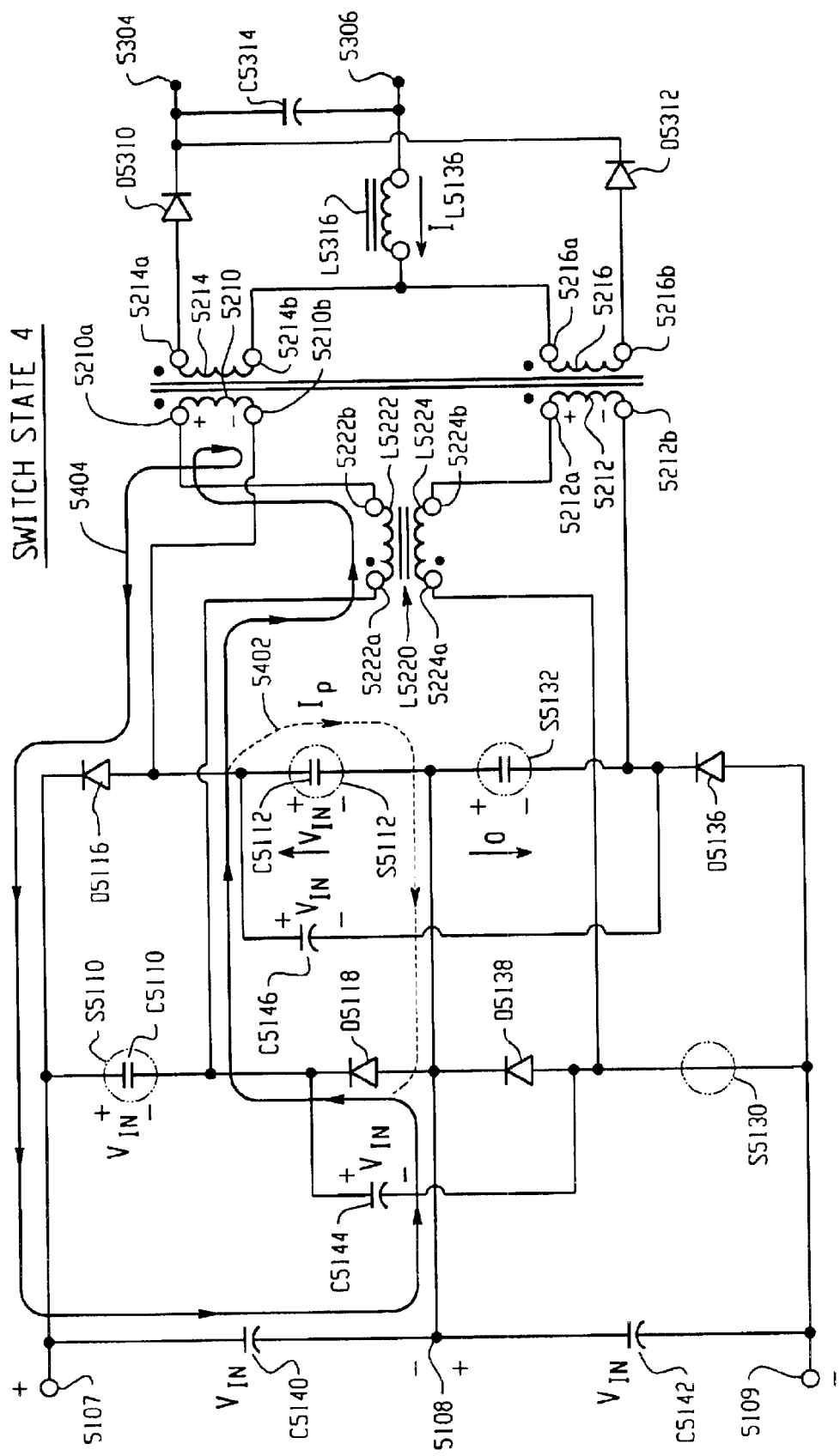
FIG. 25D is a schematic diagram of the series connected full bridge circuit during a fourth switch state.
Figure 25E:
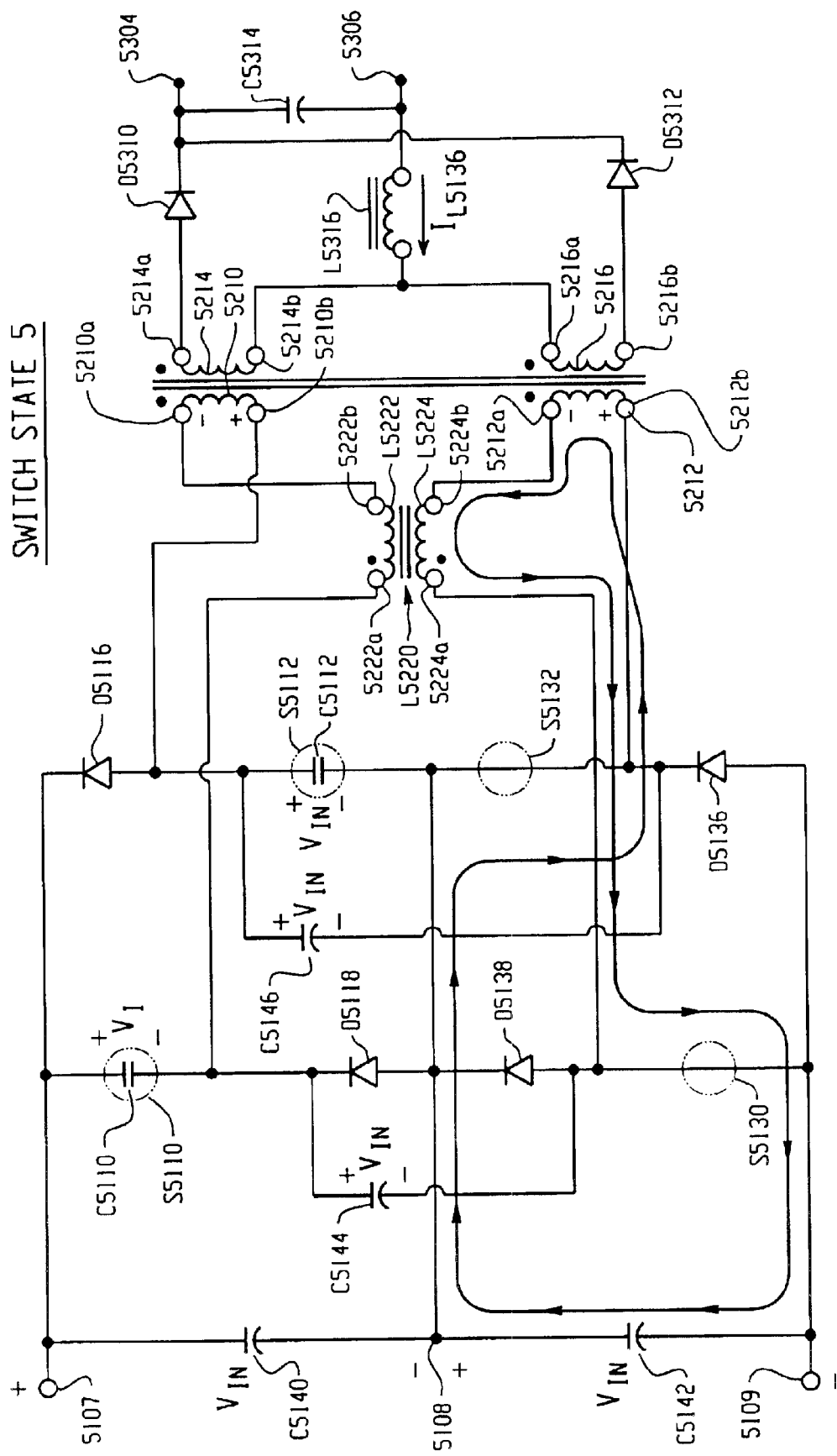
FIG. 25E is a schematic diagram of the series connected full bridge circuit during a fifth switch state.

Switch S5112 is then turned off, resulting in the equivalent circuit of FIG. 25D. During this transition, the coupled inductor L5220 provides energy to induce the primary current $I_p$. The current $I_p$ charges the capacitor C5112 up to a voltage of $V_{IN}$. Once the voltage across the across the capacitor C5112 is at $V_{IN}$, the current $I_p$ conducts through the diode, D5116 and D5118, through the path 5404 as shown. Thus, the voltage across the capacitor C5112 is clamped to the voltage across the capacitor C5146, which is equal to $V_{IN}$. Therefore, the voltage across the capacitor C5132 is at zero volts. The switch S5132 is then turned on, resulting in the equivalent circuit of FIG. 25E.

Transition through the remaining Switch States 6–9 is substantially similar to transition through Switch States 2–5, except that the polarities of the voltages across the primary windings 5210 and 5212 are reversed. Thus, ZVS switching is provided for all switches S5110, S5112, S5130 and S5132.

It is to be appreciated that the windings L5222 and L5224 may also be separate on separate inductors that are not coupled. However, this tends to reduce the coupling between the transformer primary windings 5210 and 5212 provided by the coupled inductor L5220, which impedes ZVS performance. Thus, a coupled inductor L5220 comprising the windings L5222 and L5224 is preferred. Illustratively, the windings L5222 and L5224 share a toroidal core and are tightly coupled.

An alternative embodiment is shown in FIG. 26. In this embodiment, the coupled inductor L5220 is connected to the secondary windings 5214 and 5216 of the transformer 5202. The first inductor winding L5222 is connected between the first terminal 5214a of the first secondary winding 5214 and the diode D5310, and the second inductor winding L5224 is connected between the second terminal 5216b of the second secondary winding 5216 and the diode D5312. ZVS switching occurs in the same manner as described with respect to FIGS. 25A-25E.

Power Supply Unit and Control System

Figure 27:
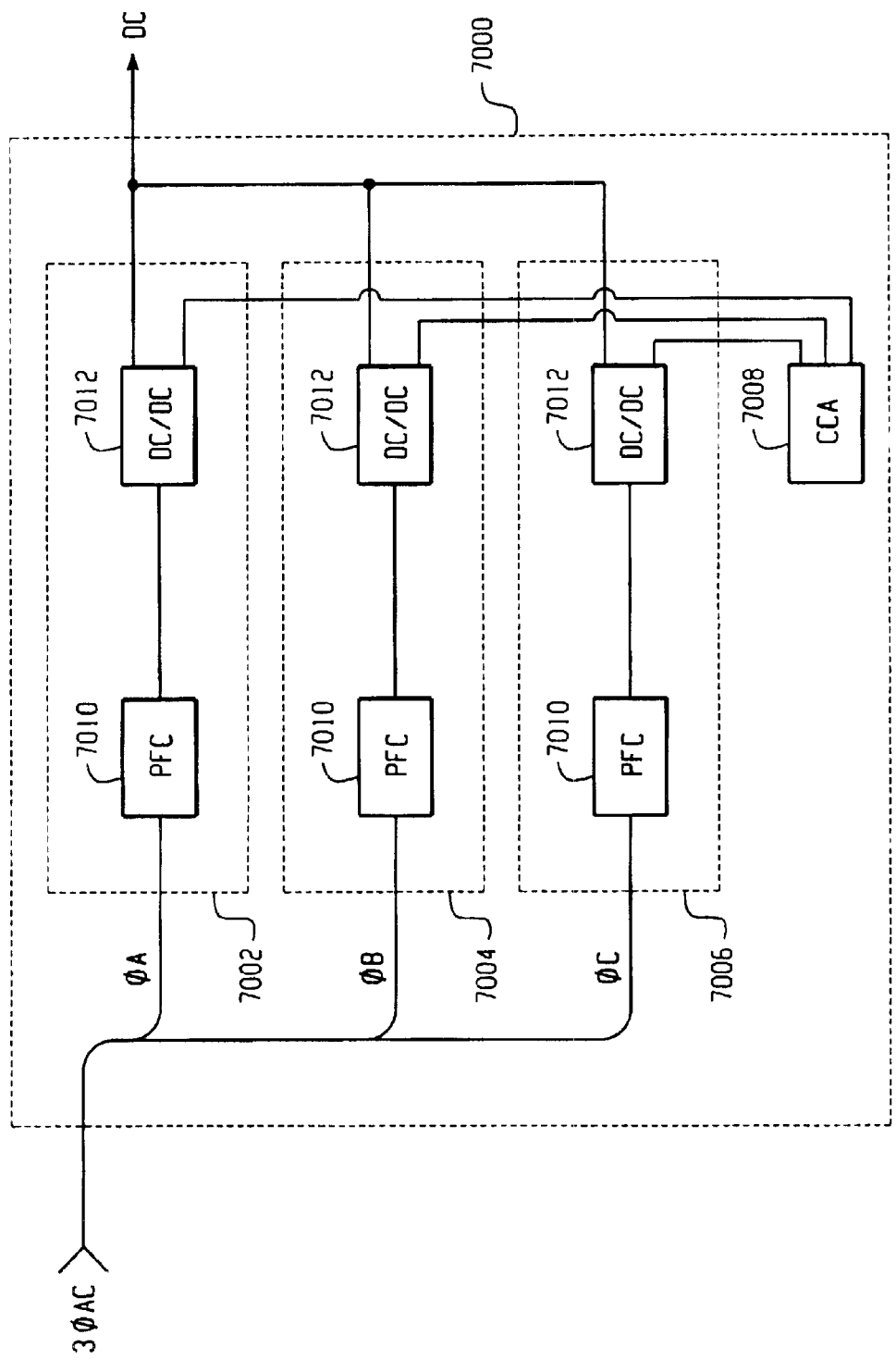
FIG. 27 is a block diagram illustrating a preferred arrangement of components within a preferred power supply unit.

Shown in FIG. 27 is a block diagram of a preferred power supply unit ("PSU") 7000 that comprises a plurality of power trains 7002, 7004, and 7006 (three in this example) that receive AC input power and generate a combined DC output voltage. In the example shown in FIG. 27, each power train receives power from a different phase of a 3 phase AC power source, but, in other embodiments some or all of the power trains could receive power from the same phase of a multi-phase AC power source, all of the power trains could receive power from a single phase AC power source, or some or all of the power trains could receive power from other AC power source configurations. The preferred PSU 7000 further comprises a combined control assembly ("CCA") 7008 that preferably is a digital control assembly ("DCA"). The CCA 7008, among other things, takes power measurements from the output of each power train and generates control signals that are supplied to the power trains to affect the output generated by each power train.

The power trains 7002, 7004, 7006 preferably are of similar architecture wherein each power train comprises a power factor correction ("PFC") circuit 7010 and a DC/DC converter circuit 7012. The PFC circuit 7010 could be of any suitable topology known by those skilled in the art such as boost circuit, or alternatively could be of a configuration similar to the preferred PFC circuit 2000 described earlier in this detailed description.

Figure 28:
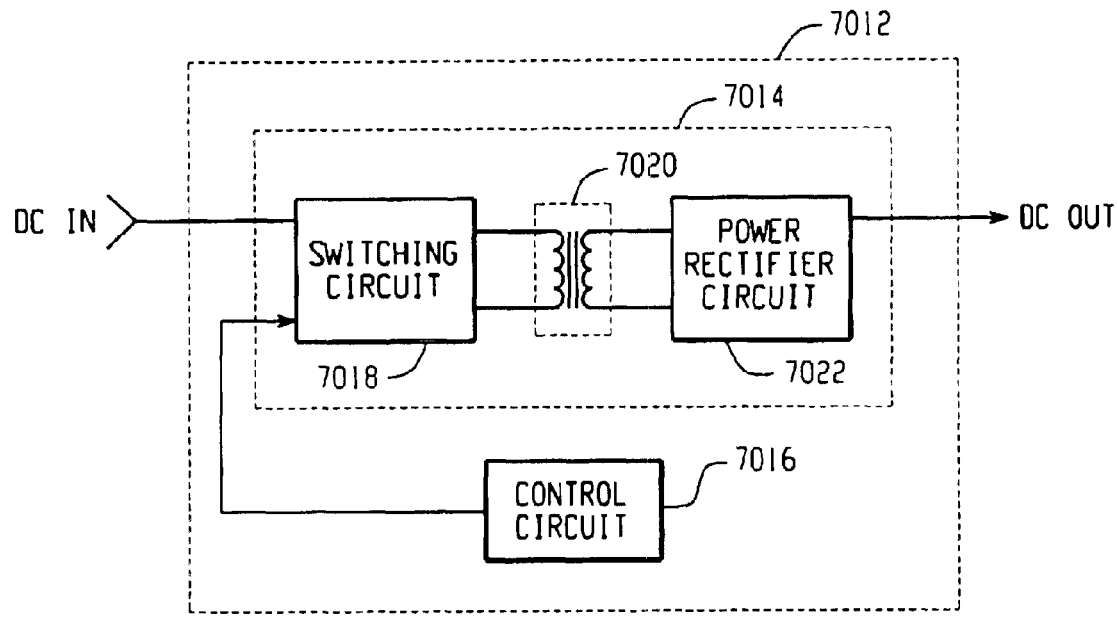
FIG. 28 is a block diagram illustrating a preferred DC/DC converter.

The DC/DC converter circuit 7012 could be of any suitable topology known by those skilled in the art such as a half bridge converter, full bridge converter, forward converter, resonant transition converter, PWM converter, buck converter, boost converter, or other switching converter topologies, or alternatively could be of a topology similar to the preferred series connected full bridge circuit 5000 described earlier in this detailed description. As illustrated in FIG. 28, the preferred DC/DC converter 7012 comprises a power generation circuit 7014 and a control circuit 7016. The power generation circuit 7014 preferably comprises a switching circuit 7018, a transformer circuit 7020, and a power rectifier circuit 7022. The control circuit 70160 comprises circuitry to generate control signals to drive switches in the switching circuit 7018 based, at least in part, on feedback from the power rectifier circuit 7022.

Figure 29:
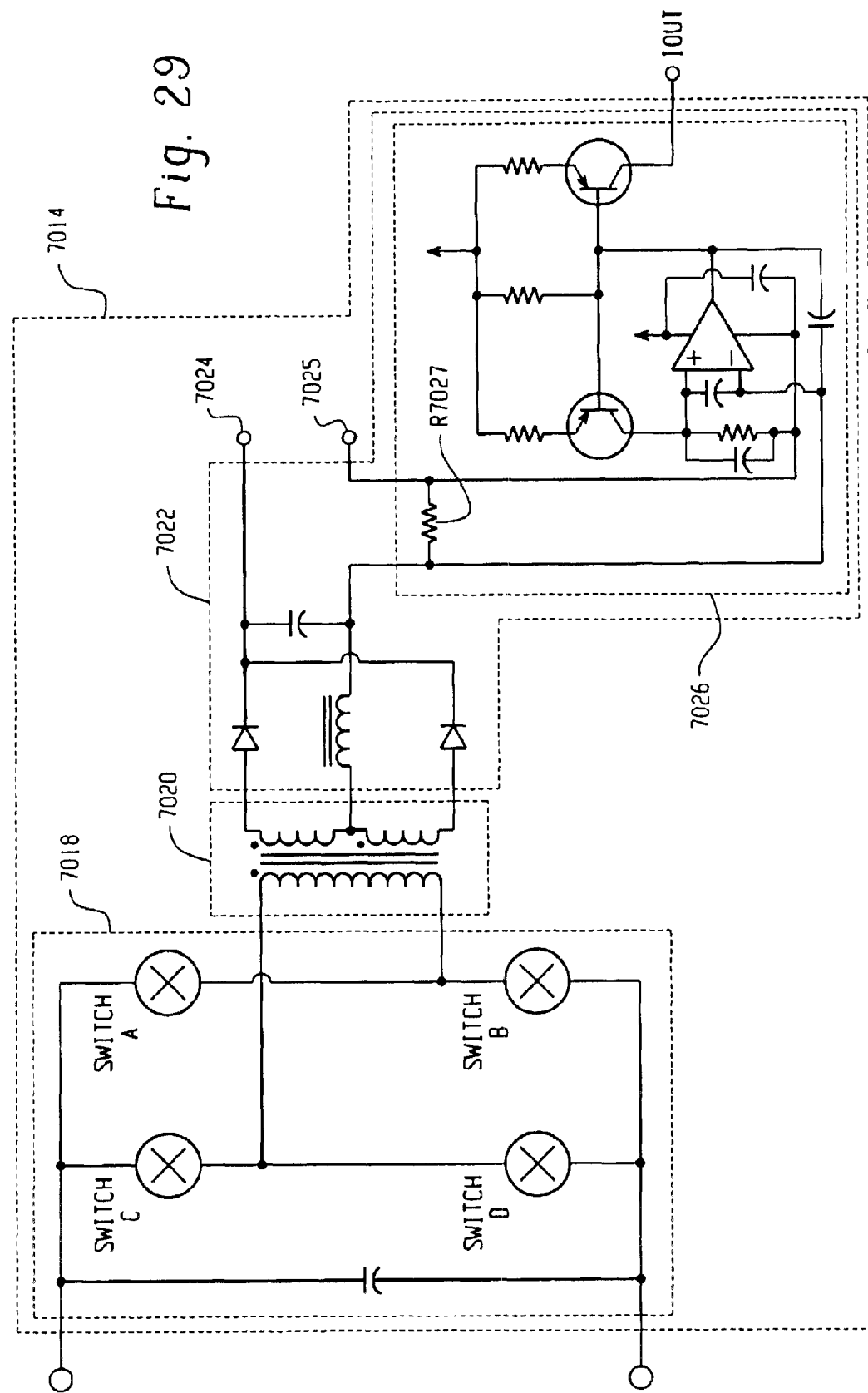
FIG. 29 is a schematic diagram of an exemplary DC/DC converter with a current sense circuit.

Shown in FIG. 29 is a more detailed schematic of an exemplary power generation circuit 7014. The switching circuit 7018, comprises a plurality of switches, switch A, switch B, switch C, and switch D, that are controlled by a control circuit 7016, which causes a regulated DC output to be generated at output terminals 7024, 7025. The power rectifier circuit 7022 preferably includes a current sense circuit 7026 that provides an output current signal $I_{out\_i}$ (e.g. $I_{out\_1}$, $I_{out\_2}$, or $I_{out\_3}$) that indicates the amount of D.C. current the DC/DC converter 7012 provides to a load.

Figure 30:
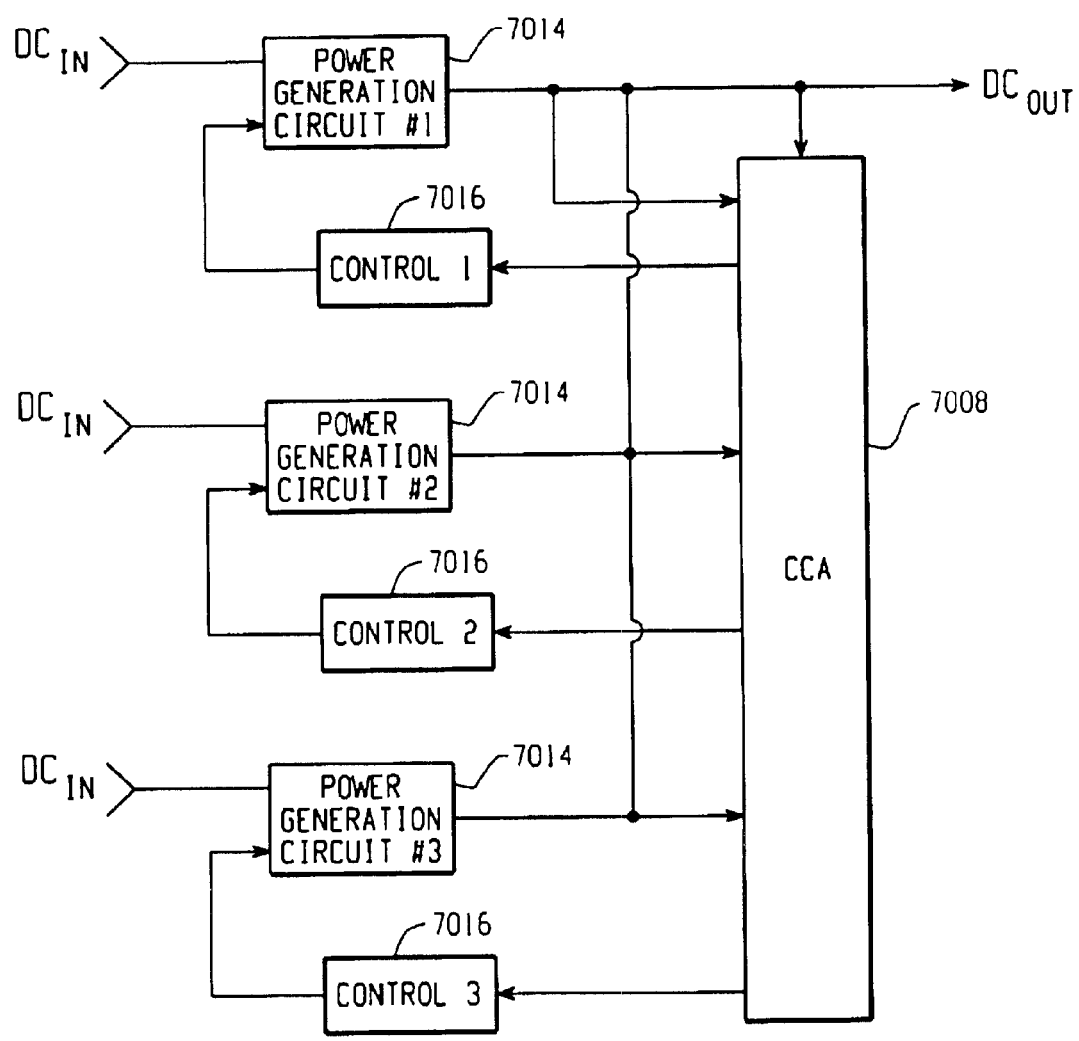
FIG. 30 is a block diagram that illustrates a preferred control topology in a power supply unit.

As illustrated in FIG. 30, each control circuit 7016 in the preferred PSU 7000 preferably is included in an overall PSU feedback loop. The preferred PSU feedback loop comprises the combined control assembly ("CCA") 7008 and a control circuit 7016 for each power generation circuit 7014. The CCA 7008 takes measurements from the output of each power generation circuit 7014 and measurements from the PSU's combined D.C. output and generates error signals that are provided to each control circuit 7016. Each control circuit 7016, based on the error signals provided to it by the CCA 7008, generates control signals to drive the switches in the switching circuits.

Figure 31:
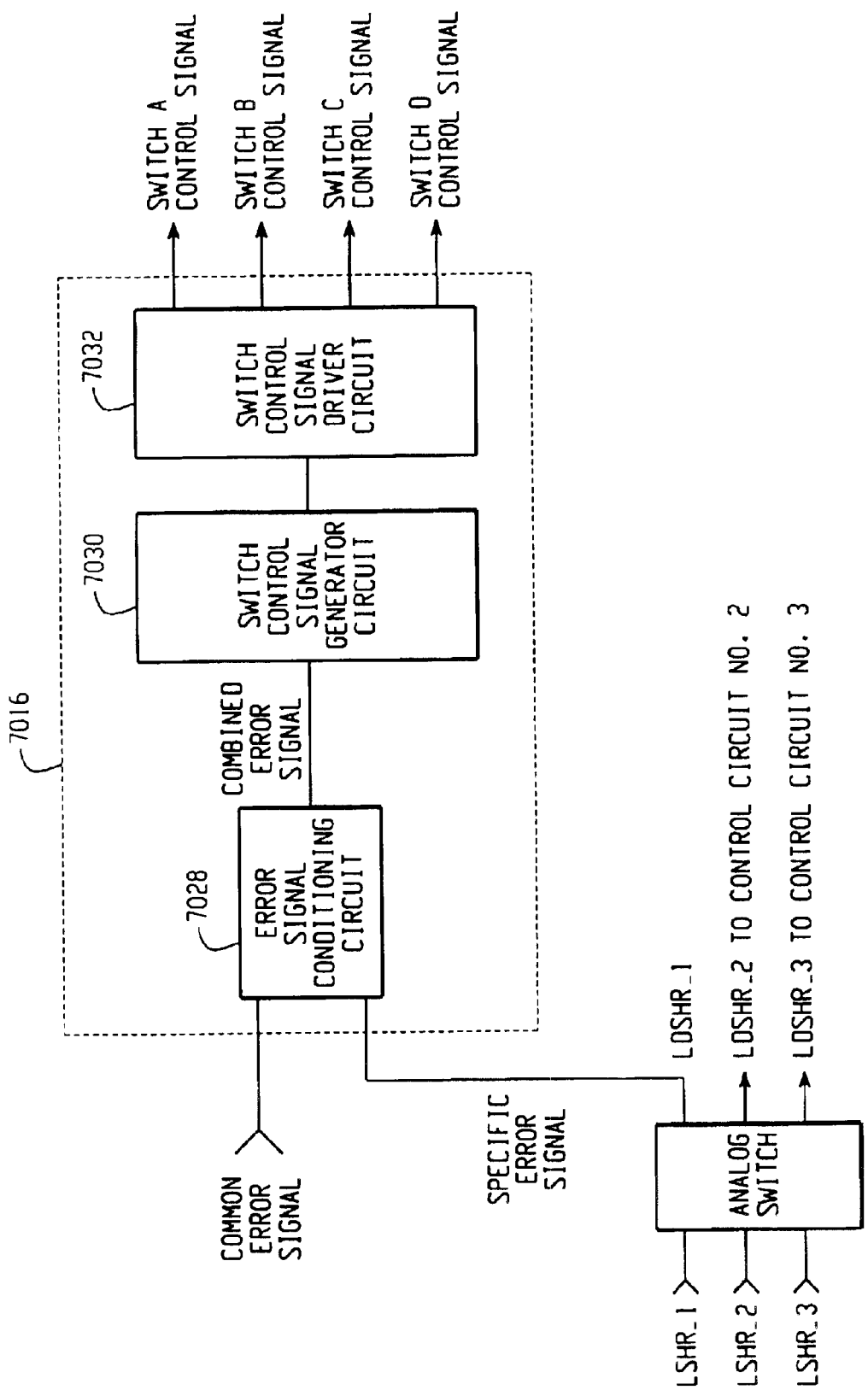
FIG. 31 is a block diagram that illustrates a preferred control circuit in a DC/DC converter.

A preferred control circuit 7016 is illustrated in FIG. 31. The preferred control circuit comprises an error signal conditioning circuit 7028, a switch control signal generator circuit 7030, and a switch control signal driver circuit 7032. The preferred error signal conditioning circuit 7028 receives a common error signal and a specific error signal from the CCA 7008, combines the two error signals, and transmits a combined error signal to the switch control signal generator circuit 7030. The common error signal is preferably a pulse width modulated ("PWM") signal that represents the correction needed to drive the overall output of the PSU to a desired level. The common error signal is a signal that is commonly provided to each control circuit 7016. The specific error signal is preferably a PWM signal that represents the correction that a specific power generation circuit 7014 should make. Each specific error signal is specific to each control circuit 7016. A more detailed schematic of an exemplary error signal conditioning circuit 7028 is shown in FIG. 32 wherein the common error signal comprises $^+V_{ERROR}$ and $^-V_{ERROR}$, the specific error signal comprises LDSHR_i, and the combined error signal comprises EA-.

Figure 32:
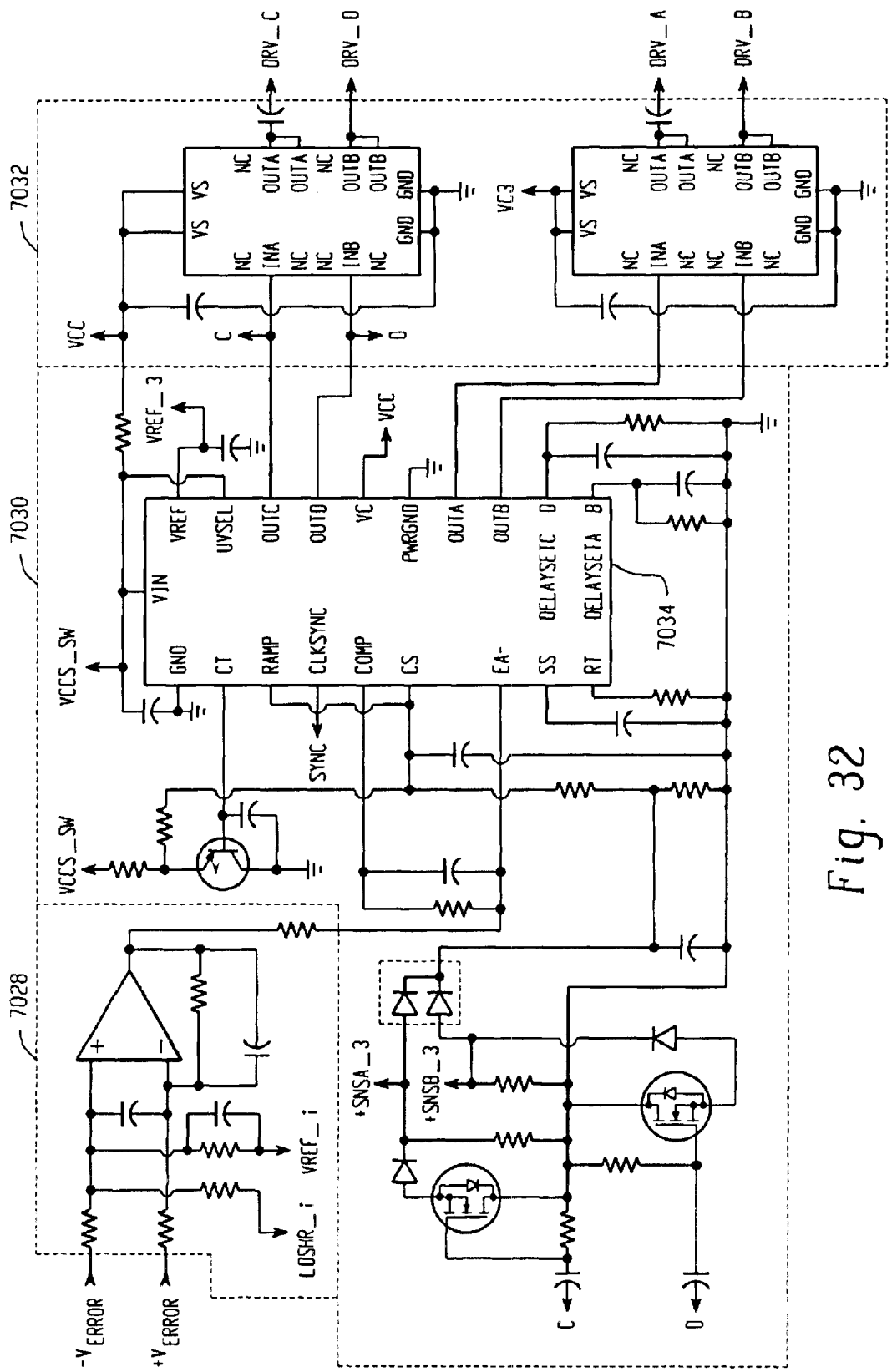
FIG. 32 is schematic diagram of a preferred control circuit in a DC/DC converter.

As illustrated in FIG. 32, the preferred switch control signal generator circuit 7030 comprises a phase-shifted PWM controller 7034. In the embodiment shown, the phase-shifted PWM controller 7034 utilizes a UC 3879 integrated circuit phase-shifted PWM controller. The phase-shifted PWM controller 7034 generates control signals to drive switch A, switch B, switch C, and switch D in the associated power generation circuit 7014.

Also, illustrated in FIG. 32 is the preferred switch control signal driver circuit 7032. The switch control signal driver circuit 7032 conditions the control signals generated by the switch control signal generator circuit 7030 so that the control signals can be coupled to the switches in the associated power generation circuit 7014.

Figure 33:
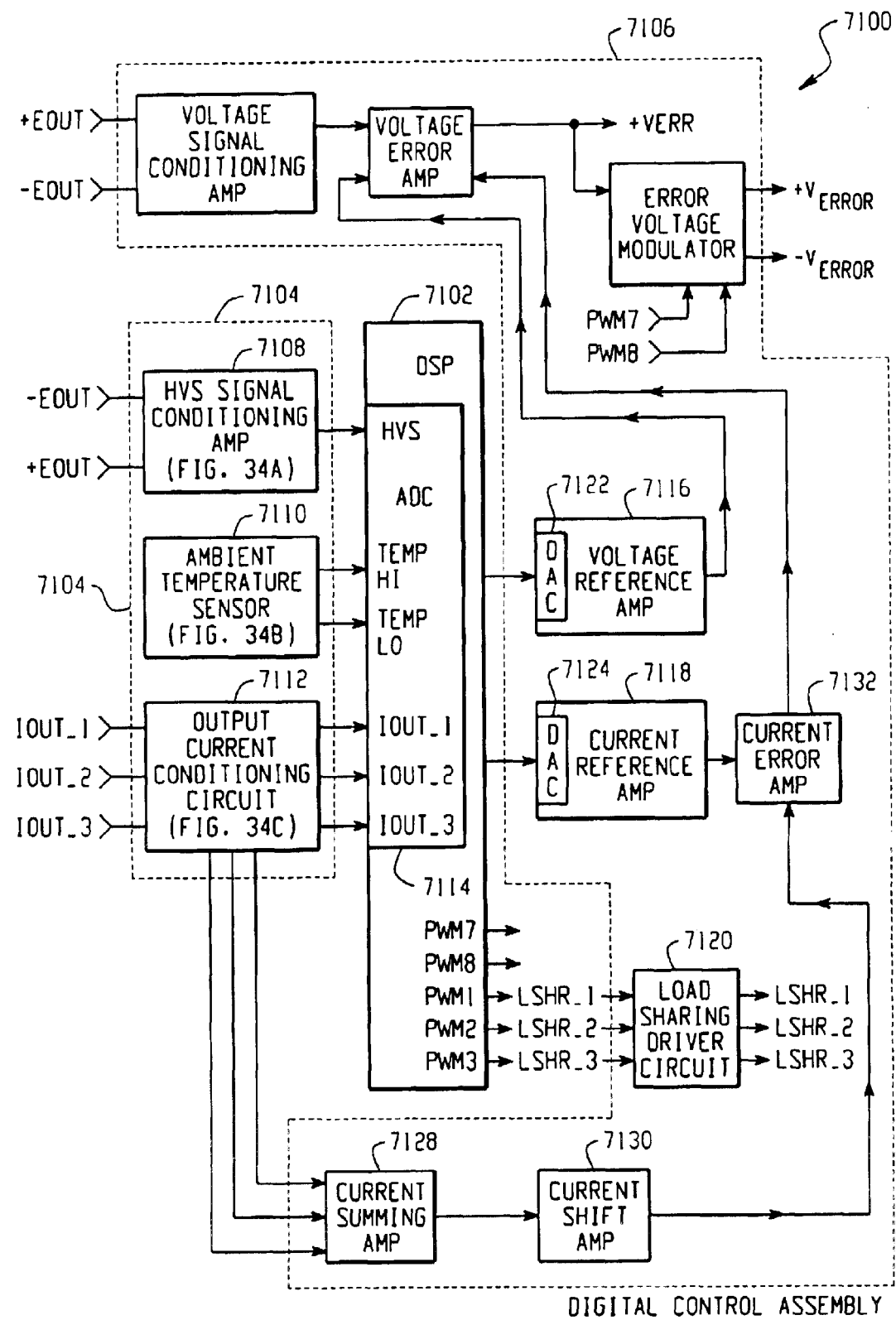
FIG. 33 is a block diagram that illustrates a preferred digital control assembly in a power supply unit.

The CCA 7008 is preferably a digital control assembly ("DCA") 7100 that is illustrated in FIG. 33. The DCA 7100 preferably comprises a processor and more preferably a digital signal processor ("DSP") 7102, although other processors such as a microprocessor or controller could be used. The preferred DSP 7102 is a DSP in the motor control class such as the TMS320LF2406. The DCA 7100 further comprises input conditioning circuits 7104 and output circuits 7106. The input conditioning circuits 7104 comprise circuits that measure characteristics relating to the PSU, such as the PSU output voltage $^+E_{out}$ and $^-E_{out}$, the output current $I_{out\_1}$, $I_{out\_2}$, and $I_{out\_3}$ provided by each DC/DC converter, and the ambient temperature within the PSU, and generate output voltage representations of the characteristics that can be sampled by the DSP 7102. The output circuits 7106, based at least in part on processing occurring within the DSP 7102, the PSU output voltage $^+E_{out}$ and $^-E_{out}$, and the PSU output current $I_{out}$ (wherein $I_{out}=I_{out\_1}+I_{out\_2}+I_{out\_i}$), generate the common error signal $^+V_{ERROR}$ and $^-V_{ERROR}$ and the specific error signals LSHR_1, LSHR_2 and LSHR_3 that are specific to each DC/DC converter 7012.

Figure 34A:
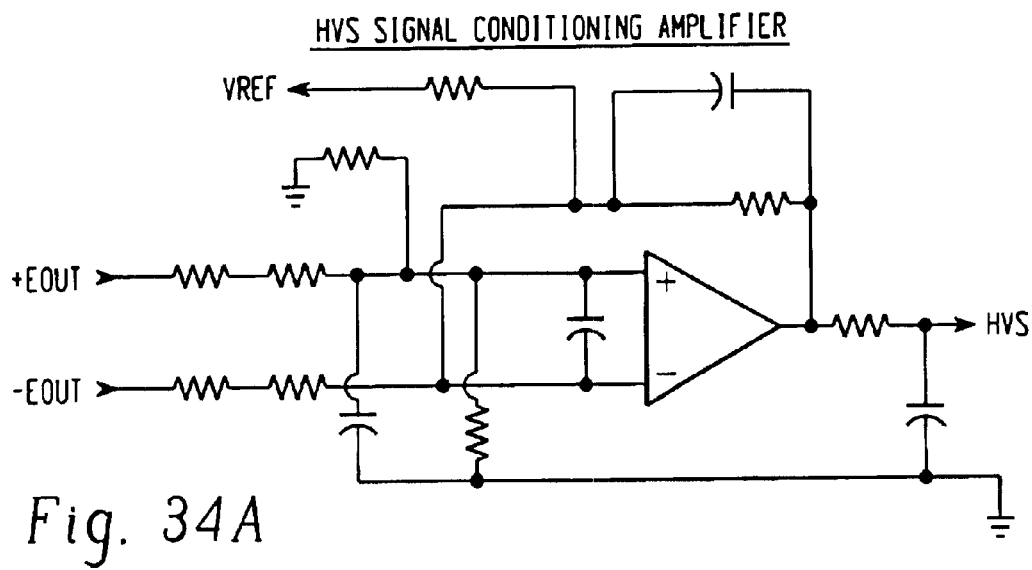
FIGS. 34A, 34B, 34C, 34D, 34E, 34F, 34G, and 34H are schematic diagrams of exemplary circuits depicted in the block diagram of FIG. 33.
Figure 34B:
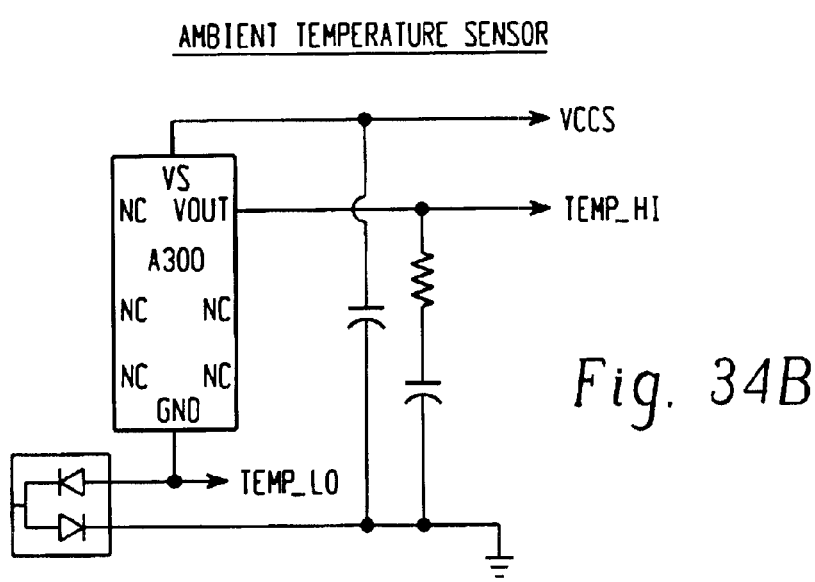
Figure 34C:
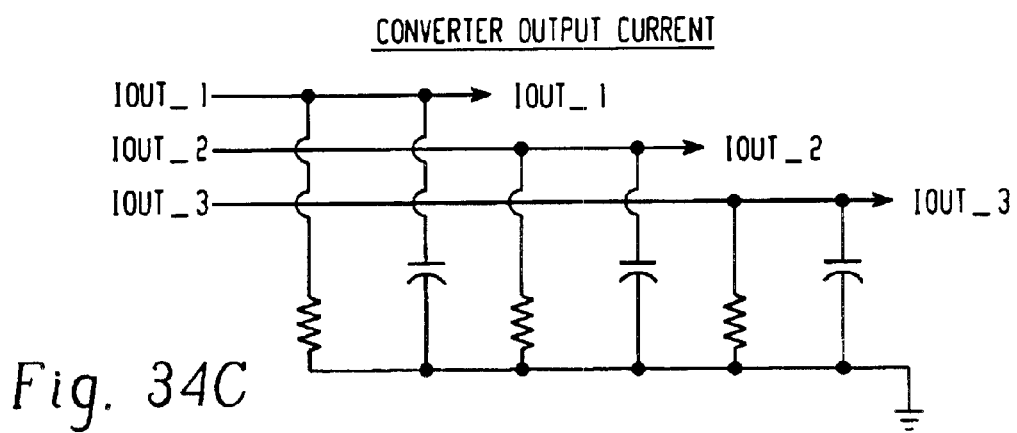

The preferred input conditioning circuits 7104 include a HVS signal conditioning amplifier circuit 7108, an ambient temperature sensor circuit 7110, and an output current conditioning circuit 7112. A more detailed schematic view of an exemplary HVS signal conditioning amplifier circuit 7108 is shown in FIG. 34A, a more detailed schematic view of an exemplary ambient temperature sensor circuit 7110 is shown in FIG. 34B, and a more detailed schematic view of an exemplary output current conditioning circuit 7112 is shown in FIG. 34C. The HVS signal conditioning amplifier circuit 7108 converts the PSU output voltage $^+E_{out}$ and $^-E_{out}$ to a proportional voltage level that can be sampled by the DSP 7102. The ambient temperature sensor circuit 7110 measures the ambient temperature within the PSU and provides a voltage that is proportional to the PSU temperature to the DSP 7102. The output current conditioning circuit 7112 converts the output current from each DC/DC converter to proportional voltages that can be sampled by the DSP 7102.

Figure 34D:
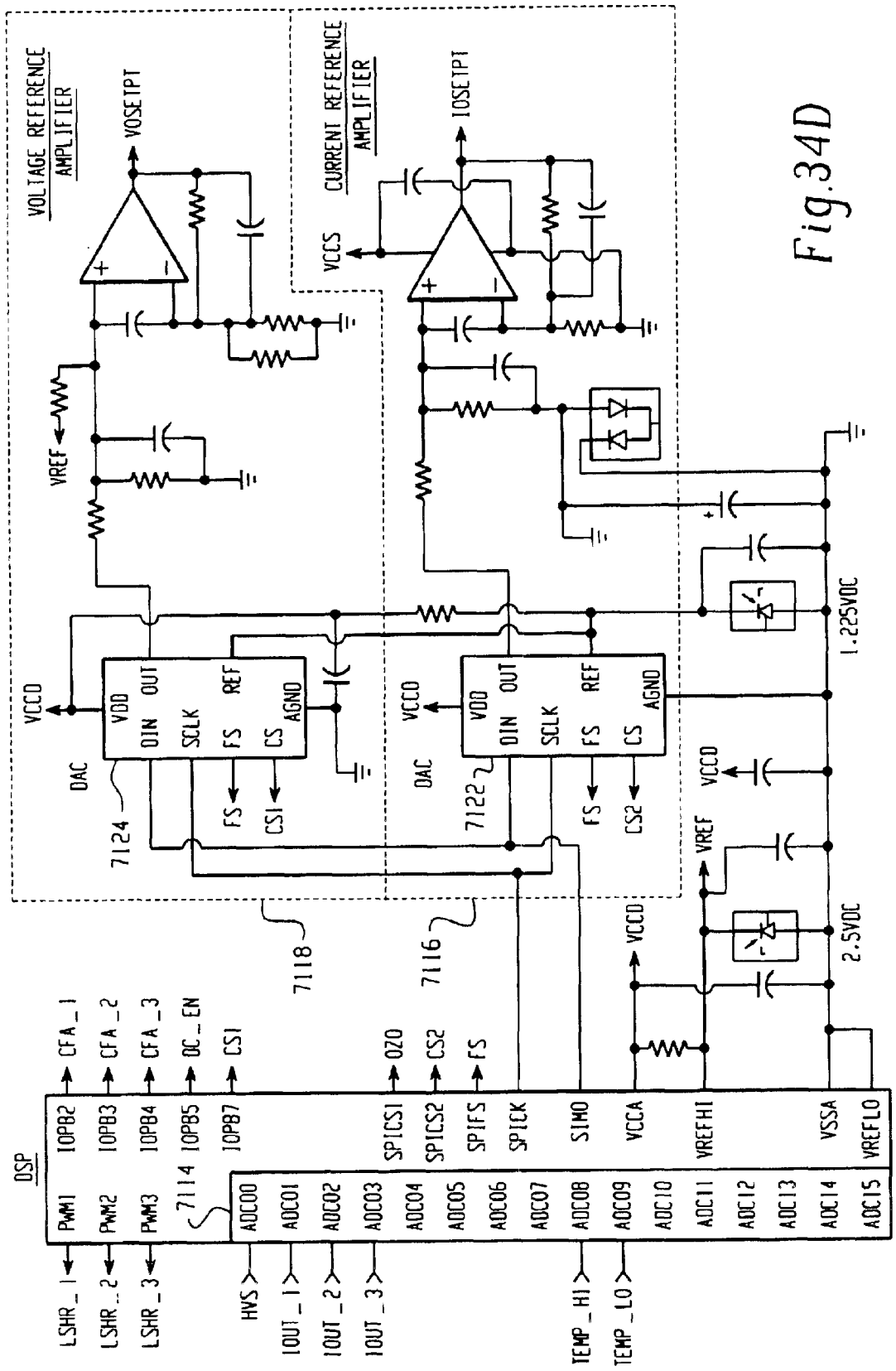

With reference to FIGS. 33 and 34D, the DSP 7102 preferably includes an analog-to-digital converter ("ADC") section 7114 that is used to sample voltages provided at inputs to the DSP 7102. The DSP 7102 executes algorithms that cause it to perform computations using the sampled voltages and allow the DSP 7102 to provide output signals to the output circuits 7106. Two of the output signals the DSP 7102 is preferably programmed to generate are a digital current set point signal and a digital voltage set point signal. Other output signals include the specific error signals LSHR_1, LSHR_2 and LSHR_3 that are utilized by each DC/DC converter 7012 and two PWM signals PWM_7 and PWM_8 that are used for modulating the common error signal $^+V_{ERROR}$ and $^-V_{ERROR}$.

Figure 34E:
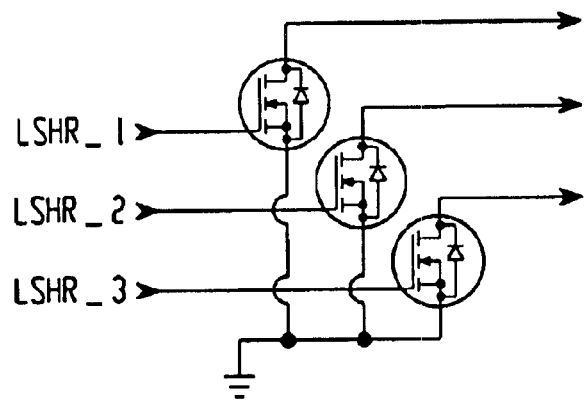

The preferred output circuits 7106 comprise a current reference amplifier 7116, a voltage reference amplifier 7118, and a load sharing driver circuit 7120. The current reference amplifier 7116 comprises a digital-to-analog converter ("DAC") 7122 and converts the digital current set point signal provided by the DSP to an analog current set point signal IOSETPT that is used by other output circuits. The voltage reference amplifier 7118 also comprises a digital-to-analog converter ("DAC") 7124 and converts the digital voltage set point signal provided by the DSP to an analog voltage set point signal VOSETPT that is used by other output circuits. The load sharing driver circuit 7120, as illustrated in FIG. 34E preferably comprises a plurality of gates 7126 that provides the specific error signals LSHR_1, LSHR_2 and LSHR_3 that are generated by the DSP with greater drive capability.

Figure 34F:
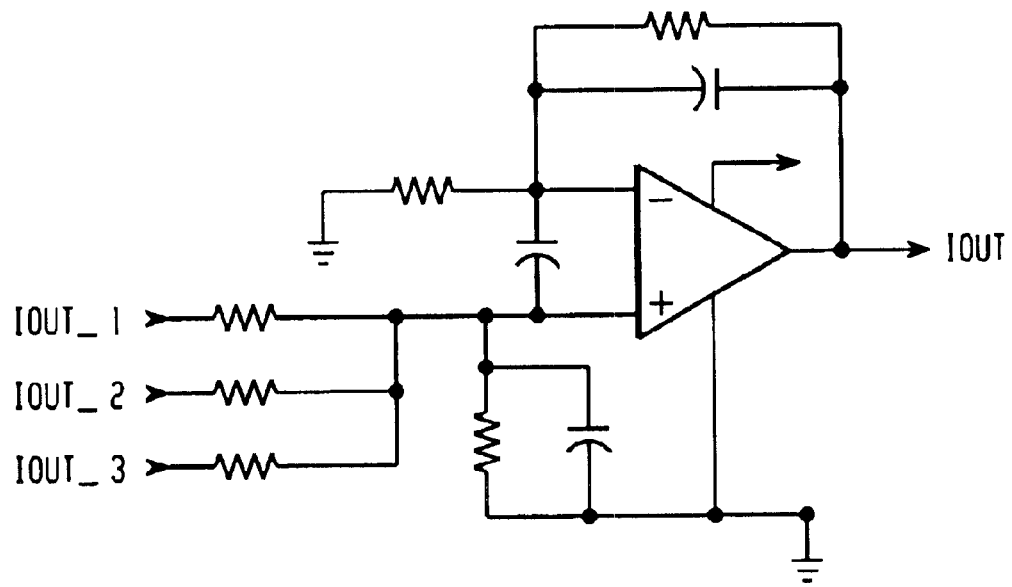
Figure 34G:
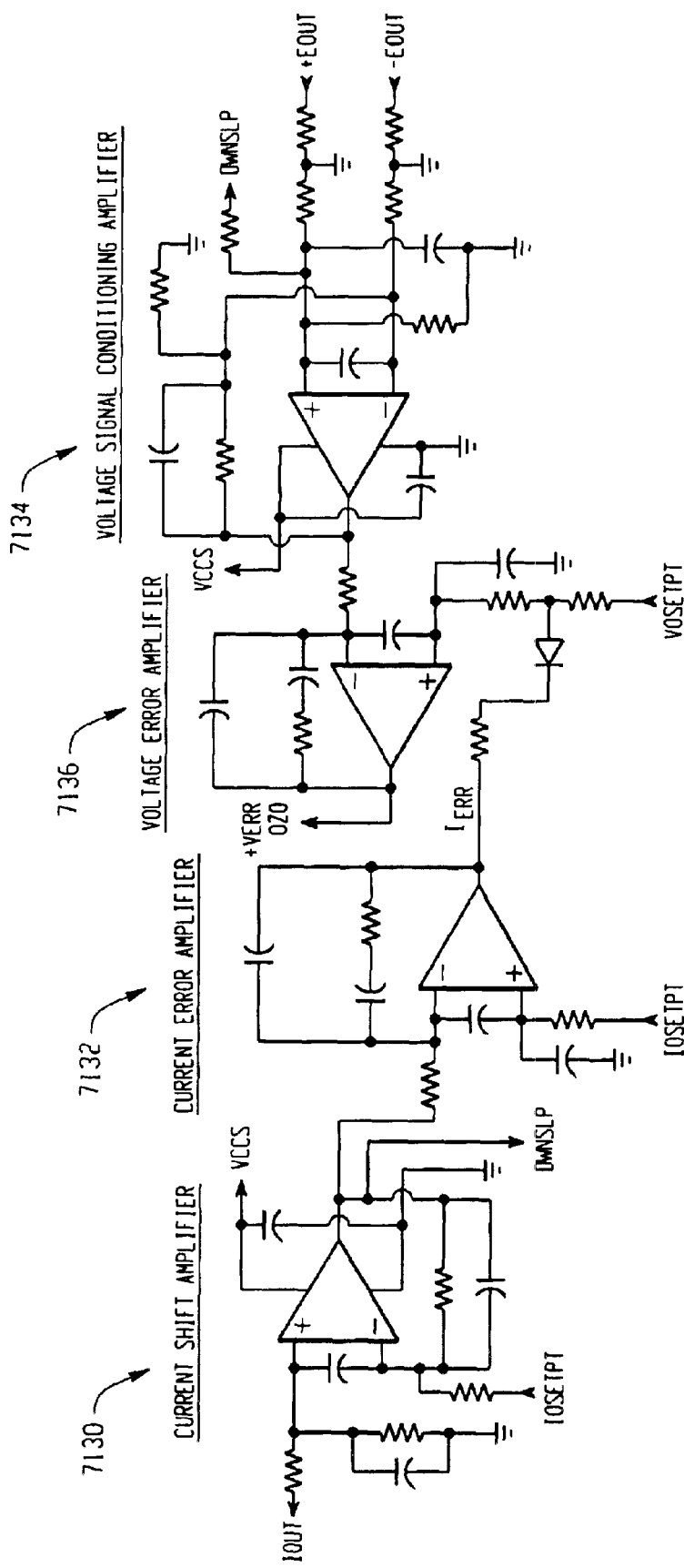

The preferred output circuits 7106 further comprise a current summing amplifier circuit 7128, a current shift amplifier circuit 7130, and a current error amplifier 7132. As illustrated by the exemplary embodiment in FIG. 34F, the current summing amplifier 7128 receives the voltage signals generated by the output current conditioning circuit 7112 that are representative of the output current $I_{out\_1}$, $I_{out\_2}$, $I_{out\_3}$ provided by each DC/DC converter and sums the voltage signals to produce an output voltage signal that is representative of the PSU output current $I_{out}$. The output voltage signal that is representative of the PSU output current signal $I_{out}$ is transmitted to the current shift amplifier 7130 which further conditions the signal and transmits the conditioned signal to the current error amplifier 7132, as illustrated in FIG. 34G. The current error amplifier 7132 compares the conditioned PSU output current signal to the current set point signal IOSETPT. As the conditioned PSU output current signal increases to a level at which it begins to exceed the current set point signal IOSETPT, the current error signal amplifier 7132 starts generating a current error signal $I_{ERR}$ that causes the PSU output voltage $^+E_{out}$ and $^-E_{out}$ to decrease.

Figure 34H:
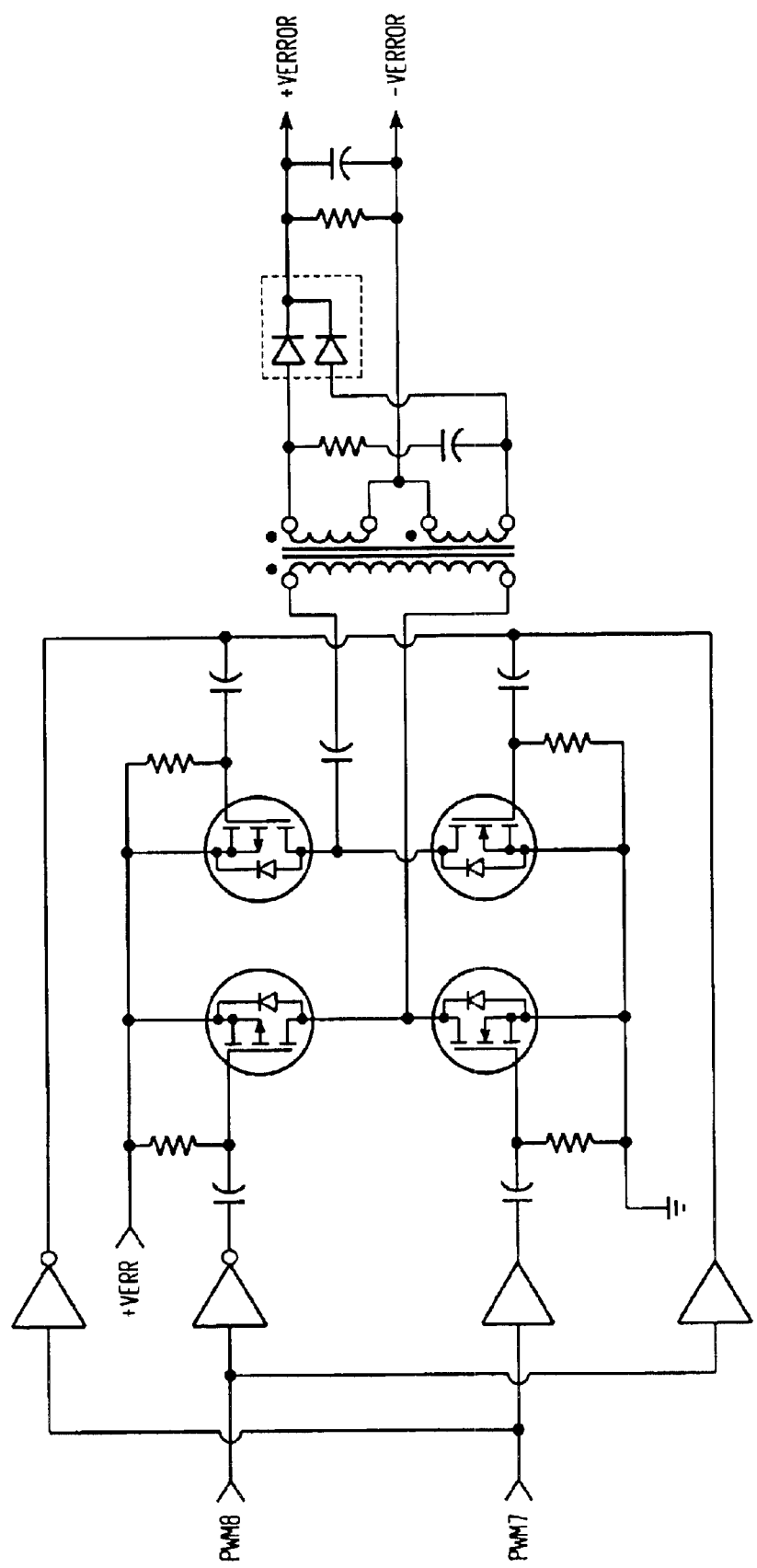

The preferred output circuits 7106 further include a voltage signal conditioning amplifier circuit 7134, a voltage error amplifier circuit 7136, and a voltage error modulator circuit 7138. The voltage signal conditioning amplifier circuit 7134 receives the PSU output voltage $^+E_{out}$ and $^-E_{out}$ and generates a conditioned representative voltage signal that is transmitted to the voltage error amplifier circuit 7136. The voltage error amplifier circuit 7136 compares the conditioned voltage signal to the voltage set point signal VOSETPT. As the conditioned representative PSU output voltage signal increases to a level at which it begins to exceed the voltage set point signal VOSETPT, the voltage error amplifier circuit 7136 starts generating a voltage error signal $V_{ERR}$ that causes the PSU output voltage $^+E_{out}$ and $^-E_{out}$ to decrease. The voltage error signal $V_{ERR}$ is transmitted to the voltage error modulator circuit 7138, which modulates the voltage error signal $V_{ERR}$ using a pair of complementary PWM signals PWM_7 and PWM_8 to generate the common error signal $^+V_{ERROR}$ and $^-V_{ERROR}$ that is used by each DC/DC converter control circuit. An exemplary embodiment of the voltage error modulator circuit is shown in FIG. 34H. The voltage error amplifier circuit 7136 also receives the current error signal $I_{ERR}$, which is used to further adjust the voltage error signal $V_{ERR}$.

The DSP 7102, therefore, has the ability to control the output of each individual DC/DC converter in the PSU through the generation of the specific error signals LSHR_1, LSHR_2 and LSHR_3. The DSP 7102 also has the ability to control the overall PSU output through the generation of the current set point signal IOSETPT and the generation of the voltage set point signal VOSETPT.

Active AC Current Balance

The preferred PSU 7000 has the ability to actively balance the AC current drawn amongst the power trains 7002, 7004 and 7006 in the PSU 7000. To balance the AC current drawn by the power trains, the preferred PSU 7000 utilizes the DSP 7102 in the DCA 7100. The DSP 7102, through the generation of the specific error signals LSHR_1, LSHR_2 and LSHR_3, affects the level of output current $I_{out\_1}$, $I_{out\_2}$, and $I_{out\_3}$ provided by each DC/DC converter circuit in the PSU 7000. After sampling the output currents $I_{out\_1}$, $I_{out\_2}$, and $I_{out\_3}$ provided by the current sense circuit 7026 in each DC/DC converter, the DSP 7102 can generate appropriate specific error signals LSHR_1, LSHR_2 and LSHR_3 that will cause each DC/DC converter circuit 7012 in the PSU 7000 to generate an equal level of output current $I_{out\_1}$, $I_{out\_2}$, and $I_{out\_3}$. When all of the DC/DC converters 7012 are generating an equal level of output current $I_{out\_1}$, $I_{out\_2}$, and $I_{out\_3}$, they will draw an equal level of current from the PFC circuits 7010 to which they are coupled. If all of the PFC circuits 7010 are providing an equal level of current to the DC/DC converters 7012, then the PFC circuits 7010 will draw an equal level of AC current from the AC supply assuming the AC voltage is balanced in the AC supply. Consequently, by balancing the DC/DC converter output currents $I_{out\_1}$, $I_{out\_2}$, and $I_{out\_3}$ AC current balance can be achieved in the PSU 7000.

The preferred AC current balance circuit, therefore, comprises the current sense circuit 7026 (shown in FIG. 29) in each DC/DC converter 7012 and the circuitry within the DCA 7100 that generates the specific error signals LSHR_1, LSHR_2 and LSHR_3. The DSP 7102 preferably generates the specific error signals LSHR_1, LSHR_2 and LSHR_3 through its use of a current balancing algorithm 7200.

The preferred current sense circuit 7026 comprises a therein resistor R7027 that is coupled into the output path of the DC/DC converter 7012 and associated circuitry that generates a current measurement that is proportional to the output current $I_{out\_i}$ flowing through the DC/DC converter.

Figure 35:
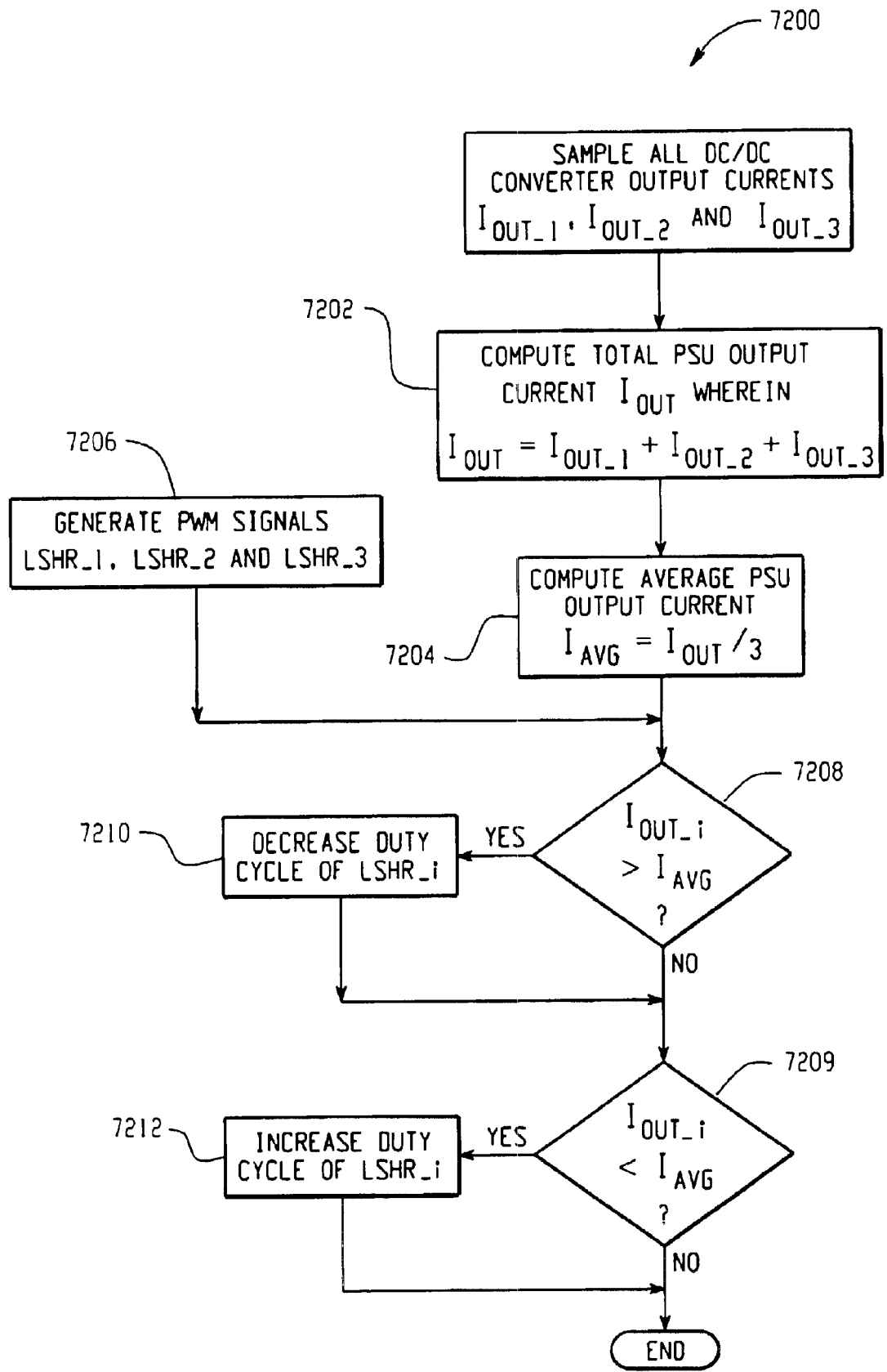
FIG. 35 is a flow chart of a preferred current balance algorithm executed by the digital control assembly.

The preferred current balance algorithm 7200, as illustrated in FIG. 35, instructs the DSP to compute the total PSU output current $I_{out}$ by summing the DC/DC converter output currents $I_{out\_1}$, $I_{out\_2}$, and $I_{out\_3}$ wherein the total PSU output current $I_{out}=I_{out\_1}+I_{out\_2}+I_{out\_3}$ (step 7202). The average output current for each DC/DC converter $I_{avg}$ is computed wherein $I_{avg}=I_{out}/3$ (step 7204). PWM signals (LSHR_1, LSHR_2 or LSHR_3) are generated wherein each PWM signal corresponds to a DC/DC converter output current signal $I_{out\_1}$, $I_{out\_2}$, and $I_{out\_3}$ (step 7206). Each PWM signal preferably is initially a 150 Khz signal with a 50% duty cycle. Each DC/DC converter output current signal $I_{out\_1}$, $I_{out\_2}$, and $I_{out\_3}$ is compared to the average output current for each DC/DC converter $I_{avg}$ (steps 7208 and 7209). If a DC/DC converter output current signal $I_{out\_i}$ is greater than the average output current signal $I_{avg}$, then preferably the duty cycle of the corresponding PWM signal LSSHR_i (wherein LSSHR_i=LSHR_1, LSHR_2 or LSHR_3) is decreased (step 7210) by an appropriate amount to cause the DC/DC converter output current to decrease appropriately. If a DC/DC converter output current signal $I_{out\_i}$ is less than the average output current signal $I_{avg}$, then preferably the duty cycle of the corresponding PWM signal LSSHR_i is increased (step 7212) by an appropriate amount to cause the DC/DC converter output current to increase appropriately. For example, if $I_{out\_1}$ was 10% greater than $I_{avg}$, $I_{out\_2}$ was equal to $I_{avg}$ and $I_{out\_3}$ was 10% less than $I_{avg}$, the duty cycle of LSHR_1 and LSHR_3 would be adjusted appropriately. The duty cycle of LSHR_1 could be decreased 10% and the duty cycle of LSHR_3 could be increased 10%. The amount of increase or decrease of the duty cycle can be determined by one of ordinary skill in the art. Preferably the current balance algorithm is executed once per second to adjust the PWM signals (LSHR_1, LSHR_2 and LSHR_3).

Adaptive Control Circuit

Figure 36A:
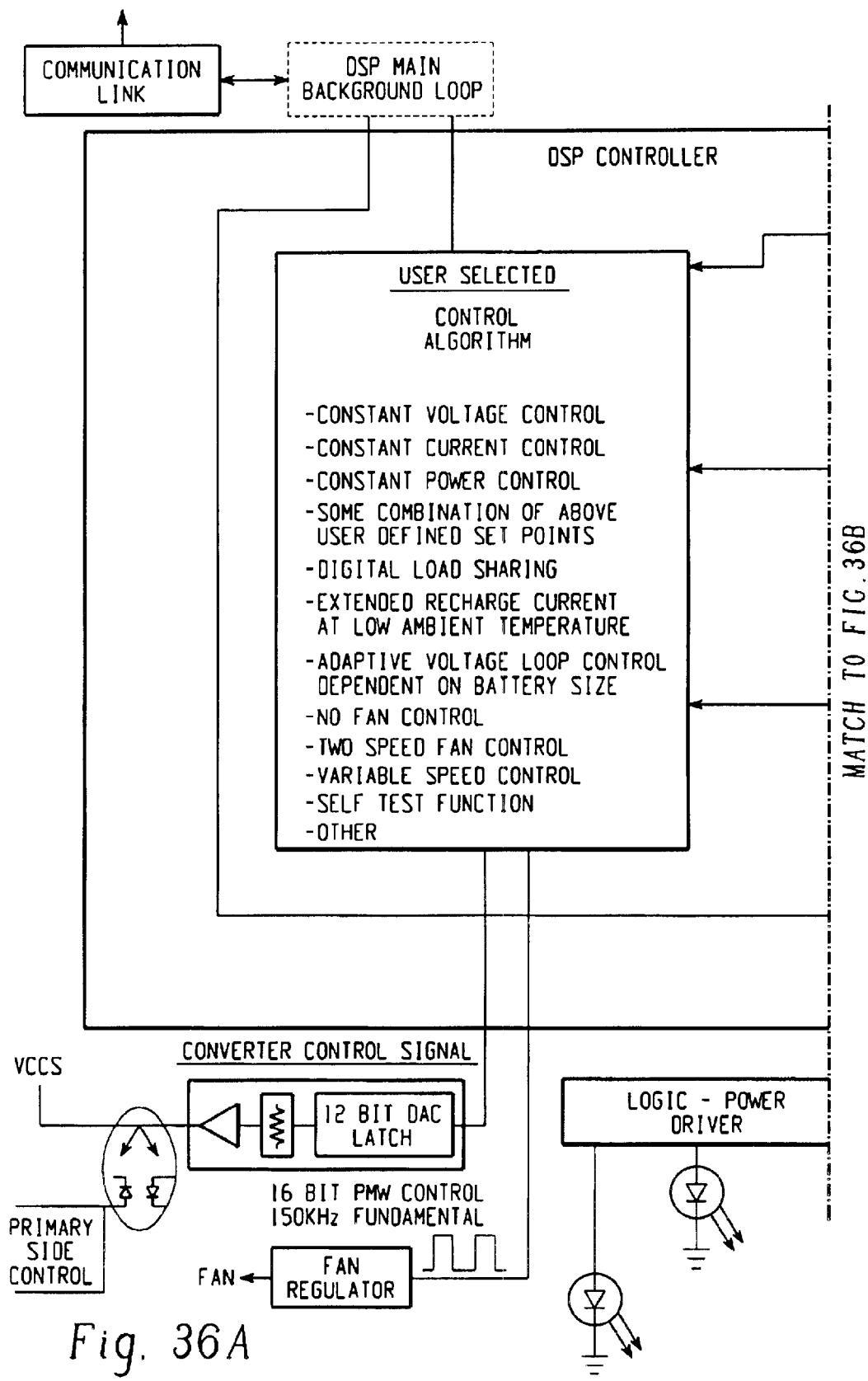
FIGS. 36A & 36B are a block diagram of a preferred DSP circuit.

The preferred DCA 7100 preferably functions as an adaptive control circuit 7300 as illustrated in FIG. 36A. For example, when used with a telecom rectifier the adaptive control circuit 7300 adaptively controls a PSU 7000 by preferably monitoring input such as the PSU input voltage, ambient temperature in the PFC and DC/DC converter circuits, individual component temperatures, plant size (amp-hour rating of batteries), PSU output voltage and PSU output current to optimize the PSU's control algorithms.

Figure 37:
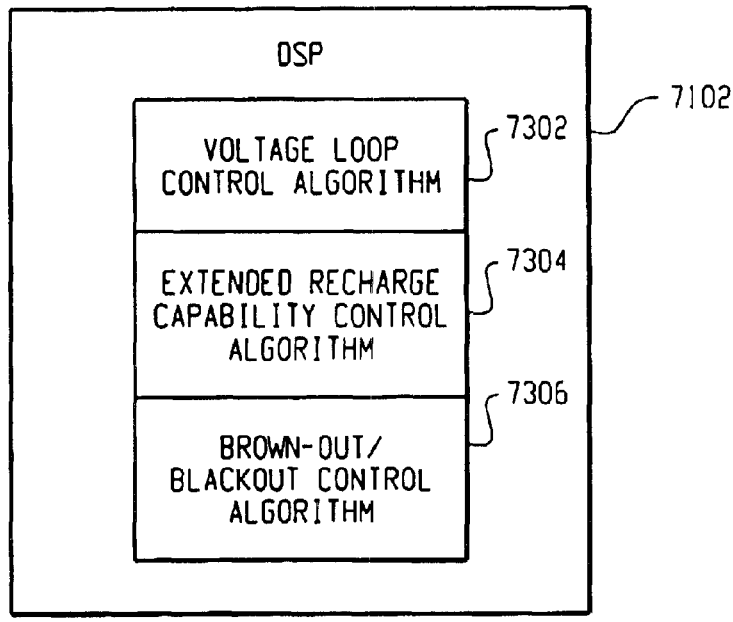
FIG. 37 is a block diagram of a preferred DSP circuit.
Figure 36B:
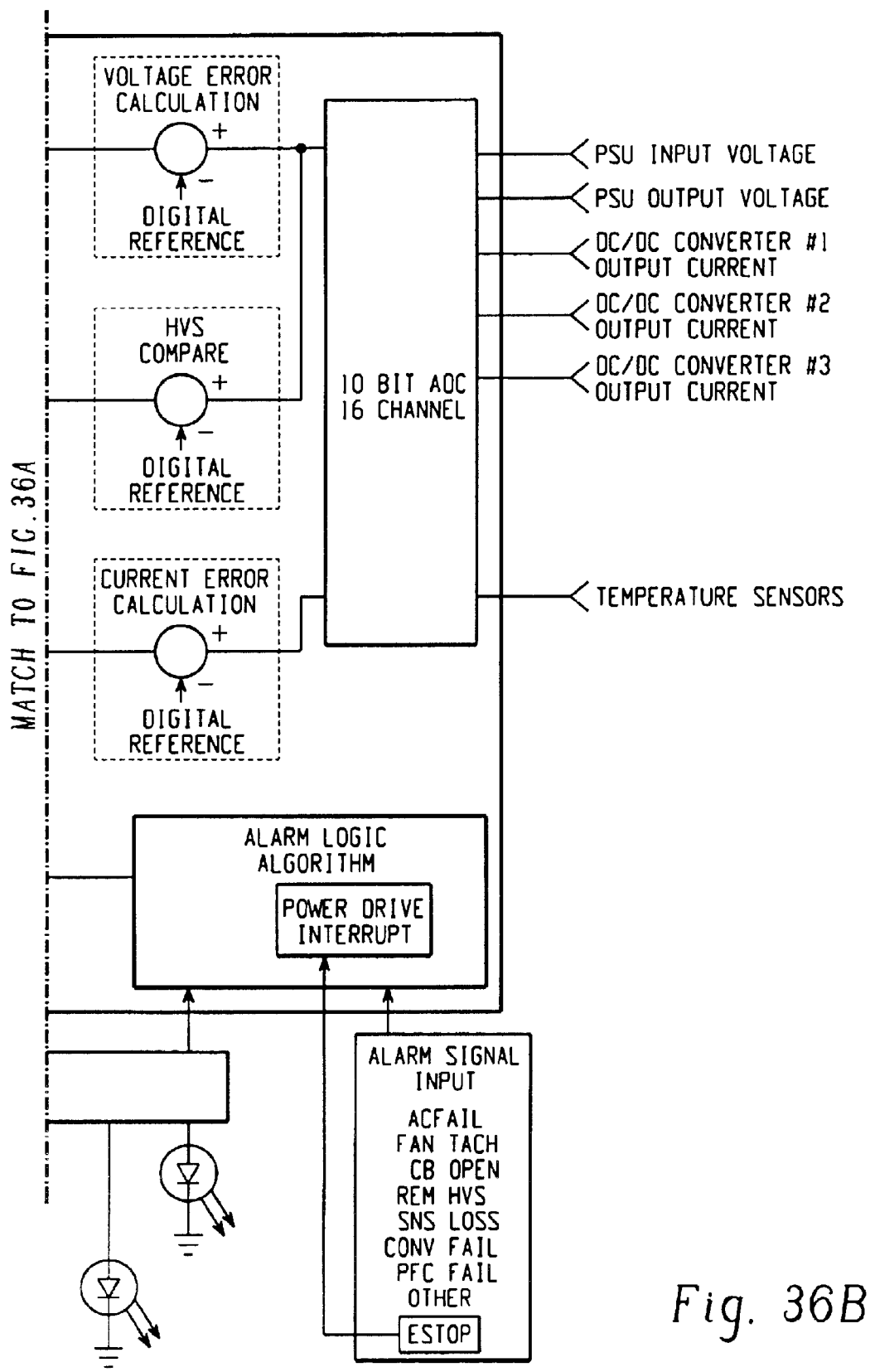

As illustrated in FIGS. 36A and 36B, the adaptive control circuit 7300 comprises the DSP 7102 in operation with a plurality of control algorithms. Preferably the control algorithms include a voltage loop control algorithm 7302 in which output load current, temperature, and battery plant size are control variables, an extended recharge capability control algorithm 7304, and a brown-out/black-out control algorithm 7306, as shown in FIG. 37.

The voltage loop control algorithm 7302 eliminates closed loop instability in a rectifier such as the PSU 7000 that can occur, for example, due to the different size battery plants that can be applied to the rectifier, changes in ambient temperature, and changes in output load current. The voltage loop control algorithm 52 preferably adds inputs for plant size, output current, and ambient temperature into the voltage loop computation in addition to the output voltage input. Adding these inputs can prevent the rectifier from becoming unstable under extreme temperature, load, and/or plant size situations.

The extended recharge capability control algorithm 7304 can adjust the maximum output current of the PSU 7000 to beyond the nominal rating preferably depending on the ambient temperature. This greatly reduces the time or number of PSUs 7000 needed to recharge batteries in a power system. The extended recharge algorithm 54 preferably monitors the ambient temperature in a select number of individual components and adjusts the maximum allowable output current to a level beyond the nominal rating of the rectifier if the ambient temperature is below a threshold. For example, in a tightly controlled environment, such as a central office, a 200 AMP rectifier could provide 250 or 275 Amps in a battery recharge situation. The DSP could accomplish this by increasing the current set point value by an appropriate amount. This would reduce the number of rectifiers needed and/or the time required to recharge the system's batteries.

The brown-out/black-out control algorithm 7306 allows the PSU to operate at a reduced output current level when the AC input voltage is below the nominal voltage range. This will allow the PSU 7000 to supply some of the load during a low AC input voltage condition thereby reducing or eliminating battery discharge. The brown-out/black-out control algorithm 7306 preferably monitors the input voltage and reduces the maximum output current of the rectifier based on the input voltage. This allows a power system to provide some power where existing systems would have shut down due to, for example, input voltages that are too low. For example, the DSP can accomplish this by reducing the current set point value by an appropriate amount if the input AC voltage is below a threshold level.

Conclusion

Other variations from these systems and methods should become apparent to one of ordinary skill in the art without departing from the scope of the invention defined by the claims. The embodiments described herein and shown in the drawings are examples of structures, systems or methods having elements corresponding to the elements of the invention recited in the claims. This written description and drawings may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims. Although some of the embodiments have been described with reference to a telecommunication rectifier, it is understood that the invention is applicable to other power systems. It is also to be understood that the invention is not limited to use with a telecommunication rectifier unless explicitly limited by the claims.

What is claimed is:

1. A power factor correction circuit comprising:
   a power circuit comprising first and second input capacitors forming a bank node; first and second inductors, the first and second inductors inductively coupled, the first inductor connected to the first input capacitor and the second inductor connected to the second input capacitor; first and second switches, the first switch connected to the first inductor and the bank node, the second switch connected to the second inductor and the bank node; and an output circuit connected to the first and second inductors and the bank node, the output circuit operable to produce an output voltage;
   a control circuit operable to monitor the output voltage and produce a switch signal at a switching frequency; and
   a drive circuit coupled to the control circuit and the first and second switches, the drive circuit operable to operate the first and second switches based on the switch signal.

2. The power factor correction circuit of claim 1, wherein the drive circuit and control circuit are connected to a flying node, the flying node at a common voltage at the switching frequency.

3. The power factor correction circuit of claim 2, wherein the drive circuit is a high side driver.

4. The power factor correction circuit of claim 2, wherein the control circuit comprises a difference amplifier connected to the output circuit to measure an output circuit voltage, the difference amplifier rejecting the common voltage at the switching frequency and producing an output voltage based on the output circuit voltage.

5. The power factor correction circuit of claim 4, further comprising a third inductor, the third inductor inductively coupled to the first and second inductors and connected to the control circuit, and wherein the third inductor bucks the common voltage at the switching frequency.

6. The power factor correction circuit of claim 5, wherein the output circuit comprises:
first and second output capacitors, the first and second output capacitors connected to the bank node;
a first diode interposed between the first output capacitor and the first switch; and
a second diode interposed between the second output capacitor and the second switch.

7. The power factor correction circuit of claim 6, wherein the first and second switches are IGBT switches.

8. The power factor correction circuit of claim 6, wherein the first and second switches are MOSFET switches.

9. The power factor correction circuit of claim 6, wherein the first and second inductors are moderately coupled.

10. The power factor correction circuit of claim 2, wherein the drive circuit operates the first and second switches simultaneously.

11. The power factor correction circuit of claim 10, wherein the drive circuit comprises:
a first drive circuit providing a first drive signal for the first switch, the first drive signal referenced to the bank node; and
a second drive circuit providing a second drive signal for the second switch, the second drive signal referenced to the flying node.

12. The power factor correction circuit of claim 11, wherein the first and second drive circuits include first and second gate transformers, respectively.

13. The power factor correction circuit of claim 11, wherein the first and second switches are optical switching devices, and the first and second drive circuits are optically coupled to the first and second switches, respectively.

14. The power factor correction circuit of claim 10, further comprising a rectifier for receiving an input power signal and generating an output power signal, the rectifier coupled to the first and second input capacitors.

15. The power factor correction circuit of claim 14, wherein the first and second input capacitors are matched capacitors, and wherein the input power signal is substantially divided across the first and second input capacitors.

16. A power factor correction circuit comprising:
a power circuit comprising an input bank and a switched output bank, the input bank and the switched output bank symmetric about a bank node and connected to the bank node, the input bank operable to receive a rectified input power signal and the switched output bank operable to switch symmetrically about the bank node and generate an output power signal symmetrical about the bank node;
a control circuit coupled to the input bank and the switched output bank, the control circuit referenced to a flying node at a common voltage at a switching frequency, the control circuit operable to measure the input power signal and the output power signal and generate a switching signal at the switching frequency; and
a drive circuit coupled to the switched output bank, the drive circuit operable to receive the switching signal and generate a first drive signal referenced to the bank node and a second drive signal referenced to the flying node, the first and second drive signals causing the switched output bank to switch symmetrically about the bank node.

17. The power factor correction circuit of claim 16, wherein the input bank comprises:
first and second input capacitors connected to the bank node; and
first and second inductors, the first and second inductors inductively coupled, the first inductor connected to the first input capacitor and the second inductor connected to the second input capacitor.

18. The power factor correction circuit of claim 17, wherein the switched output bank comprises:
first and second switches, the first switch connected to the first inductor and the bank node, the second switch connected to the second inductor and the bank node;
first and second output capacitors, the first and second output capacitors connected to the bank node; and
first and second diodes, the first diode interposed between the first output capacitor and the first switch, and the second diode interposed between the second output capacitor and the second switch.

19. The power factor correction circuit of claim 18, wherein the control circuit comprises a difference amplifier connected to the switched output bank to measure an output bank voltage, the difference amplifier rejecting the common voltage at the switching frequency and producing an output voltage based on the output bank voltage.

20. The power factor correction circuit of claim 19, further comprising a third inductor, the third inductor inductively coupled to the first and second inductors and connected to the control circuit, and wherein the third inductor bucks the common voltage at the switching frequency.

21. The power factor correction circuit of claim 20, wherein the first and second switches are IGBT switches.

22. The power factor correction circuit of claim 20, wherein the first and second switches are MOSFET switches.

23. The power factor correction circuit of claim 18, wherein the drive circuit operates the first and second switches simultaneously.

24. The power factor correction circuit of claim 23, wherein the drive circuit comprises:
a first drive circuit providing a first drive signal for the first switch, the first drive signal referenced to the bank node; and
a second drive circuit providing a second drive signal for the second switch, the second drive signal referenced to the flying node.

25. The power factor correction circuit of claim 18, wherein the first and second input capacitors are matched capacitors, and wherein the input power signal is substantially divided across the first and second input capacitors.

26. A power factor correction circuit comprising:
a power circuit comprising an input circuit, a first switch, and a second switch; the input circuit symmetric about a bank node; the first switch and the second switch symmetrically coupled to the bank node and the input circuit; the input circuit operable to receive a rectified input power signal and divide the rectified power signal evenly about the bank node when the first and second switches are in a closed state; and a drive circuit coupled to the first and second switches, the drive circuit operable to receive a switching signal and generate a first drive signal referenced to the bank node and a second drive signal referenced to a flying node;

wherein the flying node is at a common voltage at a switching frequency.

27. The power factor correction circuit of claim 26, further comprising an output circuit symmetric about the bank node, the output circuit operable to generate an output power signal divided about the bank node.

28. The power factor correction circuit of claim 27, further comprising a control circuit, the control circuit coupled to the input circuit and the output circuit, the control circuit referenced to the flying node, the control circuit operable to measure the input power signal and output power signal and generate a switching signal at the switching frequency.

29. The power factor correction circuit of claim 28, wherein the control circuit comprises a difference amplifier connected to the output circuit to measure an output circuit voltage, the difference amplifier rejecting the common voltage at the switching frequency and producing an output reference voltage based on the output circuit voltage.

30. A power system comprising a plurality of power supply units ("PSUs"), each PSU having an output that is coupled to the output of other PSUs in the power system, each PSU comprising:

a power factor correction ("PFC") assembly for receiving an AC input and generating a first DC output, the PFC assembly comprising:

a power circuit comprising an input circuit, a first switch, and a second switch; the input circuit symmetric about a bank node; the first switch and the second switch symmetrically coupled to the bank node and the input circuit; the input circuit operable to receive a rectified input power signal and divide the rectified power signal evenly about the bank node when the first and second switches are in a closed state; and a drive circuit coupled to the first and second switches, the drive circuit operable to receive a switching signal and generate a first drive signal referenced to the bank node and a second drive signal referenced to a flying node;

wherein the flying node is at a common voltage at a switching frequency;

a DC/DC converter assembly that is coupled to the PFC assembly, the DC/DC converter assembly receiving the first DC output and generating a second regulated DC output; and a control assembly that is coupled to the DC/DC converter assembly, the control assembly being operative to monitor the DC/DC converter assembly output and in response thereto to provide control signals to the DC/DC converter assembly, the control assembly comprising, a plurality of control assembly input circuits, the control assembly input circuits being operative to measure characteristics relating to the DC/DC converter assembly and operative to generate a measured characteristics output;

a signal processor having a signal path to the control assembly input circuits, the signal processor being operative to receive the measured characteristics output, perform computations wherein the measured characteristics output is used in the computations, and generate a signal processor output; and a plurality of control assembly output circuits, the control assembly output circuits being operative to generate error signals based on the signal processor output.

31. A method of converting AC power to DC power in a converter circuit, comprising:

defining a bank node in a converter circuit;

defining a flying node in a converter circuit;

generating an bank voltage across the bank node and a pair of output terminals so that the bank node is at a half-bank voltage, the half-bank voltage approximately equal to one-half the magnitude of the bank voltage;

generating first and second states in the converter circuit;

changing the potential of the flying node by a magnitude equal to the half-bank voltage during a transition from the first state to the second state and during a transition from the second state to the first state.

32. The method of claim 31, wherein:

generating first and second states in the converter circuit comprises:

creating two symmetric converter topologies during the first state; and releasing energy in each symmetric converter topology to maintain the bank voltage during the first state.

33. A system for converting AC power to DC power in a converter circuit, comprising:

means for defining a bank node in a converter circuit;

means for defining a flying node in a converter circuit;

means for generating an bank voltage across the bank node and a pair of output terminals so that the bank node is at a half-bank voltage, the half-bank voltage approximately equal to one-half the magnitude of the bank voltage;

means for generating first and second states in the converter circuit; and means for changing the potential of the flying node by a magnitude equal to the half-bank voltage during a transition from the first state to the second state and during a transition from the second state to the first state.

* * * * *

UNITED STATES PATENT AND TRADEMARK OFFICE
CERTIFICATE OF CORRECTION

PATENT NO. : 6,809,941 B2
APPLICATION NO. : 10/646849
DATED : October 26, 2004
INVENTOR(S) : Joseph F. Elek et al.

It is certified that error appears in the above-identified patent and that said Letters Patent is hereby corrected as shown below:

At column 7, line 16, replace "connect" with --connected--;
At column 13, line 5, replace "C3518" with --C3500--;
At column 13, line 14, replace "D3100" with --D3200--;
At column 13, line 14, replace "C3518" with --C3500--;
At column 13, line 18, replace "C3518" with --C3500--;
At column 13, line 20, replace "C3518" with --C3500--;
At column 17, line 46, replace "5104" with --5102--;
At column 17, line 46, replace "5106" with --5104--;
At column 18, line 68 and column 19, line 1, replace "stage while" with --stage. While--;
At column 19, line 35, replace "realized" with --realize--; and
At column 21, line 14, replace "70160" with --7016--.

Signed and Sealed this

Nineteenth Day of February, 2008

JON W. DUDAS
*Director of the United States Patent and Trademark Office*